United States Patent
Son et al.

(10) Patent No.: US 10,692,622 B2
(45) Date of Patent: *Jun. 23, 2020

(54) COMPOSITE, CARBON COMPOSITE INCLUDING THE COMPOSITE, ELECTRODE, LITHIUM BATTERY, ELECTROLUMINESCENT DEVICE, BIOSENSOR, SEMICONDUCTOR DEVICE, AND THERMOELECTRIC DEVICE INCLUDING THE COMPOSITE AND/OR THE CARBON COMPOSITE

(71) Applicant: SAMSUNG ELECTRONICS CO., LTD., Suwon-si, Gyeonggi-do (KR)

(72) Inventors: Inhyuk Son, Yongin-si (KR); Hyunjae Song, Hwaseong-si (KR); Inyong Song, Suwon-si (KR); Jaeman Choi, Hwaseong-si (KR); Seungsik Hwang, Seongnam-si (KR); Junhwan Ku, Seoul (KR); Jonghwan Park, Yongin-si (KR); Yeonji Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,397

(22) Filed: Mar. 22, 2018

(65) Prior Publication Data

US 2018/0226169 A1    Aug. 9, 2018

Related U.S. Application Data

(63) Continuation of application No. 14/499,624, filed on Sep. 29, 2014, now Pat. No. 9,959,947.

(30) Foreign Application Priority Data

Sep. 30, 2013   (KR) .......................... 10-2013-0116892
Sep. 5, 2014    (KR) .......................... 10-2014-0119376

(51) Int. Cl.
    *H01B 1/04*     (2006.01)
    *H01M 4/134*    (2010.01)
    (Continued)

(52) U.S. Cl.
    CPC ................ *H01B 1/04* (2013.01); *B82Y 30/00* (2013.01); *B82Y 40/00* (2013.01);
    (Continued)

(58) Field of Classification Search
    CPC . H01B 1/04; H01B 1/24; B82Y 30/00; B82Y 40/00; H01M 4/665; H01M 4/134; H01M 4/386
    (Continued)

(56) References Cited

U.S. PATENT DOCUMENTS 6,911,767 B2    6/2005   Takai
6,976,897 B2    12/2005  Choi et al.
(Continued)

FOREIGN PATENT DOCUMENTS

CN    103022453 A   *  4/2013    ............. H01M 4/38
JP    2007123255 A     5/2007
(Continued)

OTHER PUBLICATIONS

Hu "Superior Storage Performance of a Si@SiOx/C Nanocomposite as Anode Material for Lithium-Ion Batteries." Angew. Chem. Int. Ed. 2008, 47, 1645-1649 (Year: 2008).*

(Continued)

*Primary Examiner* — Tri V Nguyen
(74) *Attorney, Agent, or Firm* — Cantor Colburn LLP

(57) ABSTRACT

A composite including: silicon (Si); a silicon oxide of the formula SiOx, wherein $0<x<2$; and a graphene disposed on the silicon oxide.

35 Claims, 46 Drawing Sheets

(51) Int. Cl.
| | |
|---|---|
| *B82Y 30/00* | (2011.01) |
| *B82Y 40/00* | (2011.01) |
| *H01M 4/36* | (2006.01) |
| *H01M 4/38* | (2006.01) |
| *H01M 4/48* | (2010.01) |
| *H01M 4/587* | (2010.01) |
| *H01B 13/00* | (2006.01) |
| *H01M 4/04* | (2006.01) |
| *H01M 4/1393* | (2010.01) |
| *H01M 4/62* | (2006.01) |

(52) U.S. Cl.
CPC ..... *H01B 13/0016* (2013.01); *H01B 13/0026* (2013.01); *H01M 4/0428* (2013.01); *H01M 4/134* (2013.01); *H01M 4/1393* (2013.01); *H01M 4/366* (2013.01); *H01M 4/386* (2013.01); *H01M 4/48* (2013.01); *H01M 4/587* (2013.01); *H01M 4/625* (2013.01); *Y10T 428/292* (2015.01)

(58) Field of Classification Search
USPC ..... 252/182.1, 502, 506, 500, 503; 977/788, 977/810
See application file for complete search history.

(56) References Cited

U.S. PATENT DOCUMENTS

| | | |
|---|---|---|
| 7,009,331 B2 | 3/2006 | Sheu et al. |
| 7,816,031 B2 | 10/2010 | Cui et al. |
| 7,939,218 B2 | 5/2011 | Niu |
| 8,241,793 B2 | 8/2012 | Zhamu et al. |
| 8,753,545 B2 | 6/2014 | Obrovac et al. |
| 8,999,583 B2 | 4/2015 | Hirose et al. |
| 9,070,942 B2 | 6/2015 | Liu et al. |
| 9,325,028 B2 | 4/2016 | Kwon et al. |
| 9,331,338 B2 | 5/2016 | Hwang et al. |
| 9,444,085 B2 | 9/2016 | Kwon et al. |
| 9,536,735 B2 | 1/2017 | Son et al. |
| 9,548,490 B2 | 1/2017 | Ku et al. |
| 9,564,631 B2 | 2/2017 | Kim et al. |
| 9,972,833 B2 | 5/2018 | Jung et al. |
| 2006/0066217 A1 | 3/2006 | Son |
| 2006/0134516 A1 | 6/2006 | Im et al. |
| 2008/0160409 A1 | 7/2008 | Ishida et al. |
| 2008/0187838 A1 | 8/2008 | Le |
| 2008/0261116 A1 | 10/2008 | Burton et al. |
| 2009/0057649 A1 | 3/2009 | Sutter et al. |
| 2010/0081057 A1 | 4/2010 | Liu et al. |
| 2010/0176337 A1* | 7/2010 | Zhamu ................ H01M 4/1391 252/182.1 |
| 2010/0193731 A1 | 8/2010 | Lee et al. |
| 2010/0273058 A1 | 10/2010 | Lee et al. |
| 2010/0288077 A1 | 11/2010 | Le |
| 2010/0297502 A1 | 11/2010 | Zhu et al. |
| 2010/0330421 A1 | 12/2010 | Cui et al. |
| 2011/0159368 A1* | 6/2011 | Hirose ................ H01M 4/134 429/219 |
| 2011/0183169 A1 | 7/2011 | Bhardwaj et al. |
| 2012/0021250 A1 | 1/2012 | Lee et al. |
| 2012/0064409 A1 | 3/2012 | Zhamu et al. |
| 2012/0121977 A1 | 5/2012 | Xu et al. |
| 2012/0244428 A1 | 9/2012 | Park et al. |
| 2013/0040201 A1 | 2/2013 | Manthiram et al. |
| 2013/0045385 A1 | 2/2013 | Kim et al. |
| 2013/0052537 A1 | 2/2013 | Takeuchi et al. |
| 2013/0083496 A1 | 4/2013 | Franklin et al. |
| 2013/0108907 A1 | 5/2013 | Bhardwaj et al. |
| 2013/0130115 A1 | 5/2013 | Park et al. |
| 2013/0134361 A1 | 5/2013 | Lee et al. |
| 2013/0149605 A1 | 6/2013 | Kakehata et al. |
| 2013/0273433 A1 | 10/2013 | Jouanneau-Si Larbi et al. |
| 2014/0255781 A1 | 9/2014 | Son et al. |
| 2014/0255785 A1 | 9/2014 | Do et al. |
| 2014/0287315 A1 | 9/2014 | Troegel et al. |
| 2014/0315086 A1 | 10/2014 | Put et al. |
| 2014/0370387 A1 | 12/2014 | Anguchamy et al. |
| 2015/0072204 A1 | 3/2015 | Kwon et al. |
| 2016/0006024 A1 | 1/2016 | Xiao et al. |
| 2016/0013481 A1 | 1/2016 | Jeong et al. |
| 2016/0093879 A1 | 3/2016 | Song et al. |
| 2016/0256873 A1 | 9/2016 | Do et al. |
| 2017/0317352 A1 | 11/2017 | Lee et al. |
| 2017/0324097 A1 | 11/2017 | Lee et al. |
| 2017/0358797 A1 | 12/2017 | Son et al. |
| 2018/0040882 A1 | 2/2018 | Kim et al. |
| 2018/0040898 A1 | 2/2018 | Lee et al. |
| 2018/0083272 A1 | 3/2018 | Son et al. |
| 2018/0090802 A1 | 3/2018 | Kwon et al. |
| 2018/0115006 A1 | 4/2018 | Lee et al. |
| 2018/0145316 A1 | 5/2018 | Moon et al. |

FOREIGN PATENT DOCUMENTS

| | | |
|---|---|---|
| JP | 2011233497 A | 11/2011 |
| KR | 1020070026699 A | 3/2007 |
| KR | 1020110039568 A | 4/2011 |
| KR | 1020110124728 A | 11/2011 |
| KR | 1020120027369 A | 3/2012 |
| KR | 1020130004536 A | 1/2013 |
| KR | 1020130005102 A | 1/2013 |
| KR | 1020130016727 A | 2/2013 |
| KR | 1020130033733 A | 4/2013 |
| KR | 1020140035689 A | 3/2014 |
| KR | 1020140036495 A | 3/2014 |
| KR | 101396521 B1 | 5/2014 |
| KR | 1020140061955 A | 5/2014 |
| KR | 1020140077622 A | 6/2014 |
| KR | 1020140110703 A | 9/2014 |
| KR | 1020140111548 A | 9/2014 |
| KR | 1020150063620 A | 6/2015 |
| KR | 1020160008041 A | 1/2016 |
| KR | 1020160085834 A | 7/2016 |
| KR | 101818813 B1 | 1/2018 |

OTHER PUBLICATIONS

Liu et al, "A Yolk-Shell Design for Stabilized and Scalable Li-Ion Battery Alloy Anodes", NANO Letters, American Chemical Society, 2012. p. 1-7.

Choi et al., "Fading mechanisms of carbon-coated and disproportionated Si/SiOx nagative electrode (Si/SiOx/C) in Li-ion secondary batteries: Dynamics and component analysis by TEM", Electrochimica Acta 85, 2012, 369-376.

H. Medina, et al., "Metal-Free Growth of Nanographene on Silicon Oxides for Transparent Conducting Applications," Advanced Functional Materials 2012, 22, pp. 2123-2128.

Hu, "Superior Storage Performance of a Si@SiOx/C Nanocomposite as Anode Material for Lithium-Ion Batteries", Angrew, Chem. Int. Ed, 2008, 47, 1645-1649.

Hui Wu, et al., "Stable cycling of double-walled silicon nanotube battery anodes through solid-electrolyte interphase control," Nature Nanotechnology, vol. 7, May 2012, pp. 310-315.

Hyung Mo Jeong, et al., "Silicon@porous nitrogen-doped carbon spheres through a bottom-up approach are highly robust lithium-ion battery anodes," RSC Advances, 2012, 2, pp. 4311-4317.

J. Luo et al., Crumpled Graphene-Encapsulated Si Nanoparticles for Lithium Ion Battery Anodes, Journal of Physical Chemistry Letters, vol. 3, Issue 13, Jul. 5, 2012, pp. 824-1829.

Jianyi Chen, et al., "Oxygen-Aided Synthesis of Polycrystalline Graphene on Silicon Dioxide Substrates," Journal of the American Chemical Society 2011, 133, pp. 17548-17551.

K-S Kim et al., Chemical Vapor Deposition-Grown Graphene: The thinnest solid lubricant, ACS NANO, vol. 5, Issue 6, Jun. 2011, pp. 5107-5114.

Li et al., "Flexible graphene-based lithium ion batteries with ultrafast charge and discharge rates", PNAS, vol. 109, No. 43, Oct. 23, 2012, 17360-17365.

(56) References Cited

OTHER PUBLICATIONS

S. Kataria et al., Raman imaging on high-quality graphene grown by hot-filament chemical vapor deposition, Journal of Raman Spectroscopy, vol. 43, Aug. 1, 2012, pp. 1864-1867.
Shao-long Wu, et al., "Tunable synthesis of carbon nanosheet/silicon nanowire hybrids for field emission applications," Diamond & Related Materials 26 (2012) pp. 83-88.
Sim et al., Critical Thickness of SiO2 Coating Layer on Core@Shell Bulk@ Nanowire Si Anode Materials for Li-Ion Batteries, Advanced Materials, 2013, 25, 4498-4503.
Son et al., "Silicon carbide-free graphene growth on silicon for lithium-ion battery with high volumetric energy density", Nature Communications, 2015, p. 1-8.
Tae Park et al., "Controlled growth of core-shell Si-SiOx and amorphous SiO2 Nanowires directly from NiO/Si", Nanotechnology, 145, 2004 S365-S370.
Wu et al., "Graphene/metal oxide composite electrode materials for energy storage", Nano Energy, 1, 2012, 107-131.
Yan Yao, "Interconnected Silicon Hollow Nanospheres for Lithium-Ion Battery Anodes with Long Cycle Life," Nano Letters 2011, 11, pp. 2949-2954.
Yao et al., "Interconnected Silicon Hollow Nanospheres for Lithium-Ion Battery Anodes with Long Cycle Life", Nano Letters, 11, 2011, 2949-2954.
Yuanhua Zhu, et al., "Directing Silicon-Graphene Self-Assembly as a Core/Shell Anode for High-Performance Lithium-Ion Batteries," Langmuir 2013, 29, pp. 744-749.

\* cited by examiner

LITHIATED Si

LITHIATED Si

COMPOSITE, CARBON COMPOSITE INCLUDING THE COMPOSITE, ELECTRODE, LITHIUM BATTERY, ELECTROLUMINESCENT DEVICE, BIOSENSOR, SEMICONDUCTOR DEVICE, AND THERMOELECTRIC DEVICE INCLUDING THE COMPOSITE AND/OR THE CARBON COMPOSITE

CROSS-REFERENCE TO RELATED APPLICATIONS

This application is a continuation application of application Ser. No. 14/499,624, filed Sep. 29, 2014, which claims priority to and the benefit of Korean Patent Application Nos. 10-2013-0116892, filed on Sep. 30, 2013, and 10-2014-0119376, filed on Sep. 5, 2014, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite, a carbon composite including the composite, and an electrode, a lithium battery, an electroluminescent device, a biosensor, a semiconductor device, and a thermoelectric device including the composite or the carbon composite.

2. Description of the Related Art

Silicon, among negative electrode active materials for a lithium ion battery, has been studied for use as a negative electrode material since silicon has a high theoretical capacity of 4200 milliampere-hours per gram (mAh/g) and a low cost. However, silicon undergoes a large volume expansion when alloyed with lithium during discharge of a battery to form $Li_{4.4}Si$. The silicon active material is understood to become electrically isolated from the electrode as a result of pulverization due to the large volume expansion. Also, an electrolyte dissociation reaction is increased as a specific surface area of the silicon increases due to the volume expansion. In this regard, a structure that reduces the volume expansion of the silicon and has less of the pulverization phenomenon during the volume expansion has been developed.

However, when an available silicon material is used, a volume expansion and battery charging/discharging efficiency are still not satisfactory. Thus there remains a need for an improved silicon negative electrode active material.

SUMMARY

Provided is a composite.

Provided is a method of manufacturing the composite.

Provided is a carbon composite including the composite and a carbon-based material.

Provided is an electrode including the composite and/or the carbon composite including the composite and a carbon-based material.

Provided is a lithium battery including the electrode.

Provided is an electroluminescent device including the composite and/or the carbon composite including the composite and a carbon-based material.

Provided is a biosensor including the composite and/or the carbon composite including the composite and a carbon-based material.

Provided is a semiconductor device including the composite and/or the carbon composite including the composite and a carbon-based material.

Provided is a thermoelectric device including the composite and/or the carbon composite including the composite and a carbon-based material.

Additional aspects will be set forth in part in the description which follows and, in part, will be apparent from the description.

According to an aspect, a composite includes: silicon (Si); a silicon oxide of the formula SiOx disposed on the silicon, wherein 0<x<2; and a graphene disposed on the silicon oxide.

According to another aspect, a method of manufacturing a composite includes: supplying a reaction gas to a structure including a silicon and a silicon oxide of the formula SiOx, wherein 0<x<2; and heat-treating the reaction gas and the structure to manufacture the composite.

According to another aspect, a carbon composite includes the composite and a carbonaceous material.

According to another aspect, an electrode includes the composite.

According to another aspect, an electrode includes the carbon composite including the composite and the carbonaceous material.

According to another aspect, a lithium battery includes the electrode.

According to another aspect, a device includes the composite.

According to another aspect, a device includes the carbon composite including the composite and the carbonaceous material.

The device is one of an electroluminescent device, a biosensor, a semiconductor device and a thermoelectric device.

BRIEF DESCRIPTION OF THE DRAWINGS

These and/or other aspects will become apparent and more readily appreciated from the following description of the embodiments, taken in conjunction with the accompanying drawings in which:

FIGS. 20A and 20B illustrate the results of TEM-EDAX analysis performed on the composite prepared in Preparation Example 1, in which FIG. 20B is a graph of intensity (counts) versus location (nanometers, nm);

FIGS. 21A and 21B illustrate the results of Energy Dispersive X-ray microanalysis (TEM-EDAX) analysis performed on the material prepared in Comparative Preparation Example 1, in which FIG. 21B is a graph of intensity (counts) versus location (nanometers, nm);

FIGS. 22A and 22B illustrate the results of TEM-EDAX analysis performed on the material prepared in Comparative Preparation Example 2, in which FIG. 22B is a graph of intensity (counts) versus location (nanometers, nm);

DETAILED DESCRIPTION

Figure 1A:
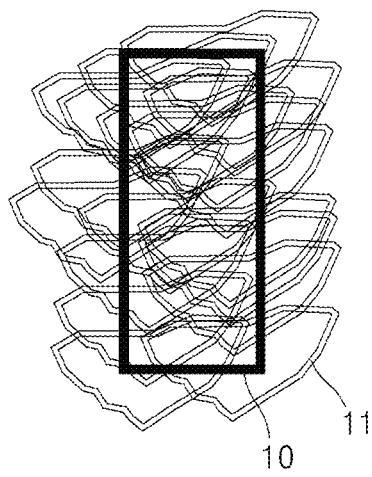
FIGS. 1A and 1B are each a schematic illustration of an embodiment in which graphene in the form of a nanosheet is disposed on a silicon oxide which is disposed on silicon wires.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

"Rare earth" means the fifteen lanthanide elements, i.e., atomic numbers 57 to 71, plus scandium and yttrium.

The term "graphene" as used in the present specification means a polycyclic aromatic molecule formed from a plurality of carbon atoms which are covalently bound to each other. The covalently bound carbon atoms may form a six-membered ring as a repeating unit, and may further include at least one of a five-membered ring and a seven-membered ring. Accordingly, graphene comprises a single layer of covalently bonded carbon atoms having $sp^2$ hybridization. A plurality of graphene layers is often referred to in the art as graphite. However, for convenience, "graphene" as used herein may be a single layer, or also may comprise a plurality of layers of carbon. Thus graphene, as used herein, may have a multiply layered structure formed by stacking single layers of graphene.

By referring to the accompanying drawings, a composite, a method of manufacturing the composite, a carbon composite including the composite and a carbon-based material, an electrode active material including the composite and/or the carbon composite, a lithium battery including the electrode active material, and an device including the composite and/or the carbon composite including the composite and a carbon-based material, will be disclosed in further detail.

The device is one of an electroluminescent device, a biosensor, a semiconductor device and a thermoelectric device.

Provided is a composite comprising silicon (Si); a silicon oxide of the formula SiOx, wherein 0<x<2, disposed on the silicon; and graphene disposed on the silicon oxide.

When silicon nanowires are used as an electrode active material, the silicon nanowires are disposed on, e.g., attached to, a surface of a conducting material, such as graphite. A volume expansion of the silicon occurs as the silicon is lithiated. As a result, and while not wanting to be bound by theory, it is understood that when the battery is repeatedly charged and discharged, lithium is consumed to form a new solid electrolyte interface (SEI) layer as the silicon is pulverized, and thus durability of the battery is degraded due to a decrease in a capacity of the battery, e.g., due to loss of lithium to the SEI layer and disconnection of the silicon nanowires.

The composite comprises graphene disposed on, e.g., grown on, the silicon oxide of the formula SiOx, wherein 0<x<2. The silicon oxide may be a natural oxide layer, which is present on the silicon. While not wanting to be bound by theory, it is understood that the silicon oxide resolves the degradation of durability of a battery described above. The composite allows the graphene, which has excellent conductivity and flexibility, to suppress and/or accommodate the volume expansion of the silicon. The graphene can be grown directly on a surface of the silicon, and thus volume expansion may be suppressed, and the pulverizing of the silicon may be reduced. Also, opportunities for the silicon to directly contact an electrolyte may be reduced by using the graphene, and thus generation of the SEI layer may be reduced.

When graphene is formed on silicon by an alternative method, silicon oxide, which is a natural oxide layer on the silicon, is first reduced to form silicon, and then the silicon is contacted with a carbon-containing gas to form the graphene. According to the alternative method, a carbide material, such as silicon carbide (SiC), may be formed on the silicon, and the graphene is formed thereon. However, when graphene is formed on surface on which a carbide material, such as SiC, is formed directly on the surface of the silicon, SiC does not react with Li. Thus, when a composite including SiC is used as an electrode material, capacity development is deteriorated, and thus a capacity is reduced. Also, since a temperature of 1400° C. or higher may be used to form the graphene on the SiC, a Si crystallinity increases, and thus silicon pulverization is accelerated during charging and discharging of a battery using an electrode including the electrode material. It has been surprising discovered that a shape, a structure, and a thickness of graphene may be controlled when the graphene on the silicon is formed by using a silicon oxide of the formula SiOx, wherein 0<x<2, as a seed layer for forming the graphene, rather than removing the silicon oxide, which is a natural oxide formed on the silicon.

The silicon oxide (SiOx, wherein 0<x<2), is an unstable material which lacks oxygen, as compared to silica (i.e., $SiO_2$), and has a tendency to form a stable material by reacting with another reactive material, such as carbonaceous source gas. By applying this tendency of the silicon oxide, the silicon oxide (SiOx, wherein 0<x<2) may be used as a seed layer for forming graphene.

A thickness of the silicon oxide (SiOx, wherein 0<x<2) formed on the silicon significantly affects a shape and/or a structure of the graphene.

A thickness of the silicon oxide (SiOx, where 0<x<2) may be selected by using a manufacturing process used in formation of graphene, for example, by using a carbonaceous source gas suitable for formation of graphene. A thickness of the silicon oxide (SiOx, wherein 0<x<2) may be about 300 μm or less.

According to an embodiment, a thickness of the silicon oxide (SiOx, wherein 0<x<2), where the composite is included in a battery, may be about 10 nm or less, for example, in a range of about 0.1 nm to about 10 nm, or about 0.1 nm to about 5 nm. When a battery includes a composite having a layer of the silicon oxide (SiOx, wherein 0<x<2) with a thickness within these ranges above, the battery may have excellent capacity characteristics.

According to an embodiment, the graphene is formed on the silicon oxide (SiOx, wherein 0<x<2) of the silicon by gaseous carbon deposition that does not use a catalyst.

The gaseous carbon deposition is performed by heat-treating silicon that is covered with a silicon oxide (SiOx) under gas atmosphere, wherein the gas is at least one selected from a compound represented by Formula 1, a compound represented by Formula 2, and an oxygen-containing gas represented by Formula 3.

$$C_nH_{(2n+2-a)}[OH]_a \quad \text{Formula 1}$$

In Formula 1, n is an integer of 1 to about 20, and a is an integer of 0 or 1.

$$C_nH_{(2n)} \quad \text{Formula 2}$$

In Formula 2, n is an integer of about 2 to about 6.

$$C_xH_yO_z \quad \text{Formula 3}$$

In Formula 3, x is 0 or an integer of 1 to about 20, y is 0 or an integer of 1 to about 20, and z is an integer of about 1 or about 2.

The gaseous carbon deposition is not limited to the theory that is disclosed herein. The coating formed by the gaseous carbon deposition is related to reforming of the silicon covered with the silicon oxide (SiOx) using $CO_2$. For example, when the compound represented by Formula 1 is methane (i.e., n is 1 and a is 0 in Formula 1), it is understood that carbon deposition may occur on a composite oxide on the basis of a reaction (e.g., a Boudouard reaction of Reaction Scheme 2) that occurs as a side reaction of a modification reaction of Reaction Scheme 1. Also, it may be understood that carbon deposition generated by a decomposition reaction of the compound represented by Formula 1, for example, in the case of methane, the reaction of Reaction Scheme 3.

$$CH_4+CO_2 \leftrightarrow 2H_2+2CO \quad \text{Reaction Scheme 1}$$

$$2CO \leftrightarrow CO_2+C \quad \text{Reaction Scheme 2}$$

$$CH_4 \leftrightarrow 2H_2+C \quad \text{Reaction Scheme 3}$$

However, the reaction that may occur during the heat-treating of the carbon coating method is not limited to the reaction described above, and reactions other than the foregoing reaction may occur.

According to the gaseous carbon deposition, graphene is grown directly on silicon, which is covered partially or entirely with silicon oxide (SiOx), and thus silicon and graphene are highly adhered to each other. The silicon oxide may cover about 1 to 100%, about 5% to about 95%, or about 10% to about 90% of an area of the silicon.

According to another embodiment, even when an SiOx layer is not present on the silicon, an SiOx layer may be first formed on the silicon by reaction with an oxygen containing gas or gas mixture, and then graphene may be formed thereon by reaction of reaction gas and the oxygen containing gas, for example.

An adherency between the silicon and the graphene may be evaluated by using a distance between the silicon and the graphene as determined with a scanning electron microscope (SEM). The distance between the graphene and the silicon may be about 10 nm or less, for example, or about 0.5 nm to about 10 nm. In some embodiments, the graphene is a distance of about 1 nm or less, for example, about 0.5 nm to about 1 nm, from the silicon. In another embodiment, an adherency between the silicon oxide and the graphene may be evaluated by using a distance between the silicon oxide and the graphene as determined with a scanning electron microscope (SEM). The distance between the graphene and the silicon oxide may be about 10 nm or less, for example, or about 0.5 nm to about 10 nm. In some embodiments, the graphene is a distance of about 1 nm or less, for example, about 1 nm or less, for example, about 0.5 nm to about 1 nm, from the silicon oxide. Also, the graphene may be oriented at an angle in a range of about 0° to about 90°, or about 5° to about 80°, for example about 10° to about 70°, with respect to a main axis of the silicon. The graphene may comprise one to 20 layers of graphene, and the total thickness of the graphene may be about 0.6 nm to about 12 nm, for example about 1 nm to about 10 nm, or about 2 nm to about 8 nm.

A shape of the silicon is not limited, and may be rectilinear and/or curvilinear, and may be for example, at least one selected from nanowires, particles, nanotubes, nanorods, wafers, and nanoribbons.

In an embodiment, the silicon may have a shape of a nanowire. Here, a cross-sectional diameter of a silicon nanowire may be less than about 500 nm, for example, from about 10 nm to about 300 nm, for example about 25 nm to about 200 nm. Alternatively, a diameter of the nanowires may be greater than about 50 nm, for example from about 50 nm to about 100 nm, or about 60 nm to about 90 nm. A length of the nanowires may be about 100 nm to about 100 micrometers (μm), or about 200 nm to about 10 μm. An aspect ratio (length/width) of the nanowires may be 2 to about 1,000,000, for example about 4 to about 500,000, or about 8 to about 250,000.

In an embodiment, a silicon oxide (SiOx, wherein 0<x<2) layer is formed on silicon nanowires, and graphene may be formed thereon.

In some embodiments, a silicon oxide (SiOx, wherein 0<x<2) layer is formed on silicon nanoparticles, and graphene may be formed thereon. Here, an average particle diameter of the silicon nanoparticles may be from about 40 nm to about 40 μm, or about 40 nm to about 100 nm. An aspect ratio of the nanoparticles may be about 1 to 2, specifically about 1.05 to about 1.9, for example about 1.1 to about 1.8, or about 1.2 to about 1.7.

When the silicon is a wafer type, a thickness of the silicon wafer may be 2 mm or less, for example, about 0.001 mm to about 2 mm.

The graphene is a polycyclic aromatic molecule comprising a plurality of carbon atoms that are covalently bonded to one another, and the covalently bonded plurality of carbon atoms form a 6-membered ring as a basic repeating unit, but a 5-membered ring and/or a 7-membered ring may be included in the graphene. As a result, the graphene may appear as a single layer of the covalently bonded carbon atoms (in general, having a $sp^2$ bond). The graphene may be a single layer or multiple layers of carbon, e.g., 1 layer to about 100 layers, for example, about 2 layers to about 100 layers or about 3 layers to about 50 layers that are stacked on each other.

The graphene may be in the form of a nanosheet or a layer.

The term "nanosheet" and "layer" used herein are defined as follows.

The term "nanosheet" denotes a structure having an irregular form.

The term "layer" denotes a structure that is continuously and uniformly disposed on a surface, e.g., formed on a silicon oxide surface.

Figure 1B:
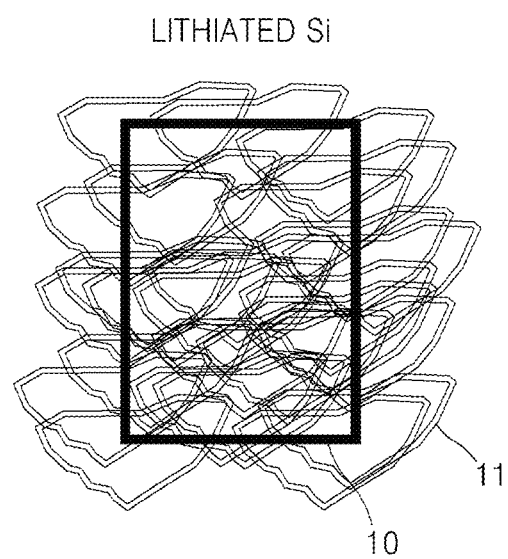
Figure 1C:
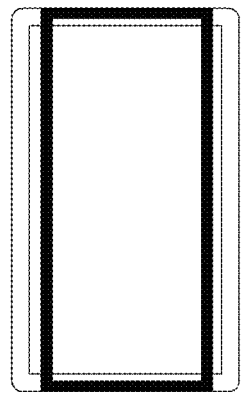
FIGS. 1C and 1E illustrates a method of implementing a clamping effect as a graphene layer helps silicon particles to expand and lithium ions to diffuse during a lithiation process.

The FIG. 1A schematically illustrates an embodiment of a composite in which a graphene nanosheet 11 is formed on a sil2 icon wire 10 covered with a silicon oxide, and FIG. 1C schematically illustrates an embodiment of a composite on which a graphene layer 12 is formed on a silicon wire 10 covered with a silicon oxide.

Figure 1D:
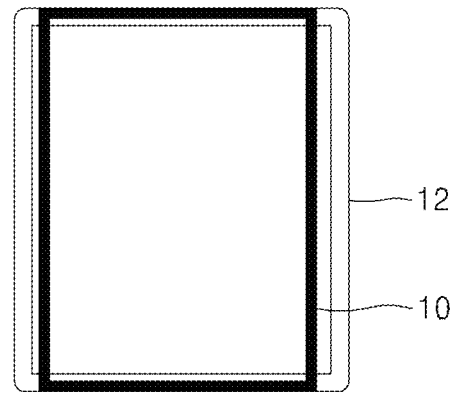
FIG. 1D illustrates a composite that may be used as a negative electrode active material and is lithiated.
Figure 1E:
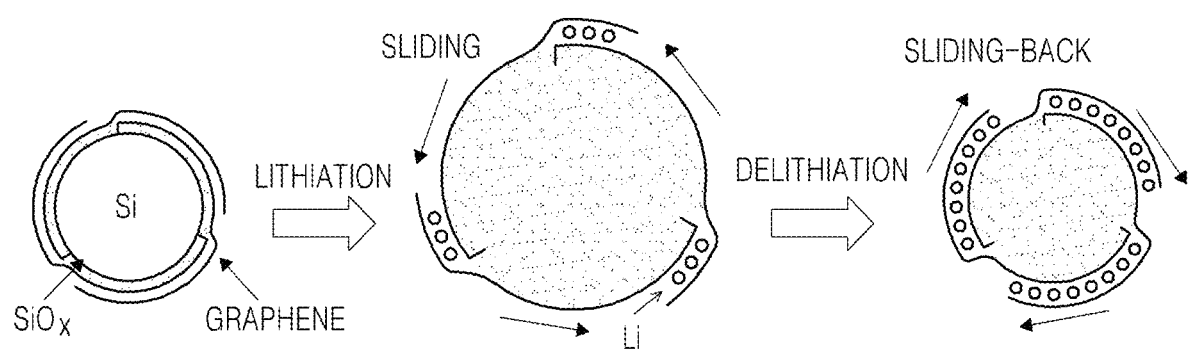

The FIGS. 1B and 1D each schematically illustrate a composite that may be used as a negative electrode active material and is lithiated.

A content of graphene in a composite in an embodiment is, about 0.001 part to about 90 parts by weight, for example, about 0.01 part to about 20 parts by weight, or for example, about 0.01 part to about 10 parts by weight, based on 100 parts by weight of the composite. When a content of the graphene is within the range above, volume change is substantially suppressed, and improved conductivity characteristics are provided.

The composite may further include a metal oxide. In this regard, when a metal oxide is further included in the composite, formation of a SEI layer may be prevented due to suppression of side reaction. The metal oxide may be disposed on at least one selected from the silicon nanowire, the silicon oxide, and the graphene.

The metal oxide may comprise at least one selected from a magnesium oxide, a manganese oxide, an aluminum oxide, a titanium oxide, a zirconium oxide, a tantalum oxide, a tin oxide, and a hafnium oxide.

The composite may further include a metal fluoride. The metal fluoride may comprises an aluminum fluoride (e.g., $AlF_3$).

In the composite according to an embodiment, graphene may serve as an SEI stabilization clamping layer. Also, the composite has a high specific surface area, and thus when a battery includes the composite, deterioration of an initial efficiency and a volume energy density may be prevented.

Graphene may suppress disintegration or pulverization of an active material, such as silicon, and may improve conductivity of the composite.

FIG. 1C illustrates a method of implementing a clamping effect as a graphene layer helps silicon particles to expand and lithium ions to diffuse during a lithiation process.

A graphene encapsulation layer prevents disintegration or pulverization of particles which typically occurs with conventional silicon particles. A graphene sliding layer serves as a clamping layer which prevents disintegration of the silicon particles while still allowing for the alloying reaction of lithium ions with silicon to yield a significant specific capacity, and provide a continuous conduction pathway between the particles.

The graphene layers slide over each other during silicon particles swelling, and then slide back to their relaxed positions during the delithiation process. This is because the van der Walls force is greater than the friction force between layers.

The clamping effect of the graphene layers may be confirmed to serve as a clamping layer that prevents disintegration of silicon particles by examining whether the graphene layer is maintained the same after 200 lithiation/delithiation cycles.

In another aspect, a carbon composite including the composite and a carbonaceous, e.g., carbon-based, material is provided. The carbon composite has an initial efficiency, cycle properties, and durability, which are improved compared to those of the composite.

The carbon-based material includes at least one selected from graphite, graphene, and carbon nanotubes (CNTs).

A content of the carbon-based material is about 50 parts by weight or less, for example, from about 0.0001 part to about 50 parts by weight, based on 100 parts by weight of the carbon composite. In an embodiment, a content of the carbon-based material may be from about 0.0001 part to 30 parts by weight, for example, from about 0.0001 part to about 20 parts by weight, based on 100 parts by weight of the carbon composite.

In another embodiment, a content of the carbon-based material is from about 0.001 part to about 10 parts by weight, for example, from about 0.01 part to about 5 parts by weight. When a content of the carbon-based material is within the range above, a carbon composite having an improved capacity and conductivity may be obtained.

The carbon composite comprises, for example, graphite and a composite formed on the graphite. The composite has a structure including silicon nanowires covered with a silicon oxide ($SiO_x$, where $0<x<2$) layer and a graphene film or a graphene nanosheet formed on the silicon oxide layer of the silicon.

The graphite may be, for example, SFG6 graphite, available from TIMCAL Graphite and Carbon of Bodio, Switzerland, and may have an average particle diameter of about 6 μm. The silicon nanowires may have a diameter in a range of about 50 nm to about 400 nm, for example about 100 nm to about 300 nm.

When the electrode is formed by using the carbon composite, a content of the carbon composite in the electrode may be, for example, from about 68 parts to about 87 parts by weight, for example about 70 parts to about 85 parts by weight, and a content of a binder may be, for example, from about 13 parts to about 32 parts by weight, for example about 15 parts to about 30 parts by weight, based on a 100 parts by weight of the carbon composite and the binder. In the carbon composite, a content of the graphite may be, for example, from about 1 part to about 20 parts by weight, based on 100 parts by weight of the carbon composite.

Any suitable binder may be used. Examples of the binder may include at least one selected from a vinylidene fluoride/ hexafluoropropylene copolymer, polyvinylidene fluoride (PVDF), polyacrylonitrile, polymethylmethacrylate, polytetrafluoroethylene, a styrene butadiene rubber-based polymer, polyacrylic acid, polyamideimide, and polyimide. The binder is not limited thereto, and any suitable material available as a binder in the art may be used. The binder may be, for example, lithium-substituted polyacrylate.

Hereinafter, a method of manufacturing a composite according to another embodiment will be disclosed in further detail.

The method includes disposing a carbonaceous gas, e.g., supplying a carbon source gas, on a structure including a silicon and a silicon oxide of the formula SiOx, wherein 0<x<2 and the silicon oxide is disposed on the silicon; and heat-treating the reaction gas and the structure to manufacture the composite.

The carbon source gas may be at least one compound selected from a compound represented by Formula 1, a compound represented by Formula 2, and an oxygen-containing gas represented by Formula 3.

$$C_nH_{(2n+2-a)}[OH]_a \quad \text{Formula 1}$$

In Formula 1, n is an integer of 1 to about 20, for example 1 to about 10, and a is an integer of 0 or 1.

$$C_nH_{(2n)} \quad \text{Formula 2}$$

In Formula 2, n is an integer of 2 to about 6, for example about 3 to about 5.

$$C_xH_yO_z \quad \text{Formula 3}$$

In Formula 3, x is an integer of 0 or 1 to about 20, for example about 2 to about 15; y is an integer of 0 or 1 to about 20, for example about 2 to about 15; and z is an integer of 1 or 2.

The compound represented by Formula 1 and the compound represented by Formula 2 may be least one selected from methane, ethylene, propylene, methanol, ethanol, and propanol.

The oxygen-containing gas represented by Formula 3 may include, for example, at least one selected from carbon dioxide ($CO_2$), carbon monoxide (CO), and water ($H_2O$).

The method may further include disposing, e.g., supplying, an inert gas that is at least one selected from nitrogen, helium, and argon in addition to the carbonaceous source gas.

The oxygen-containing gas may be at least one selected from carbon monoxide, carbon dioxide, and water vapor.

When the carbon source gas is the oxygen-containing gas, a thickness of the silicon oxide may be formed thicker than a thickness of a natural silicon oxide. For example, a thickness of the silicon oxide may be selected to be about 10 nm or less, for example, from about 0.1 nm to about 10 nm, or about 0.5 nm to about 5 nm. When a thickness of the silicon oxide is within the range above, a shape and a thickness of the graphene may be suitable. In particular, when a thickness of the silicon oxide layer is formed thicker than a thickness of a natural oxide layer, a graphene layer having a compact structure, as compared to a graphene nanosheet formed on the silicon oxide layer, may be obtained. Here, the graphene layer has, for example, a 5- or 10-layered structure.

When the gas mixture includes water vapor, the composite obtained as a result may have a greater conductivity than when water vapor is not included. Although not limited to a particular theory, it is understood that carbon with a high degree of crystallinity is deposited on the silicon covered with a silicon oxide by the reaction of the gas mixture in the presence of water vapor, and thus the composite may have a high conductivity even when the silicon is coated with a small amount of carbon. A content of water vapor in the gas mixture may be, for example, from about 0.01 volume percent (vol %) to about 10 vol %, for example about 0.05 vol % to about 5 vol %, or about 0.1 vol % to about 1 vol %, based on a total volume of the carbon source gas, but is not limited thereto.

The carbon source gas may comprise, for example, at least one selected from methane, a gas mixture including methane and an inert gas, an oxygen-containing gas, and a gas mixture including methane and an oxygen-containing gas.

In an embodiment, the carbon source gas may be a gas mixture of $CH_4$ and $CO_2$, or a gas mixture of $CH_4$, $CO_2$, and $H_2O$.

The gas mixture of $CH_4$ and $CO_2$ may be provided at a molar ratio of about 1:0.20 to 0.50, for example, about 1:0.30 to 0.40, for $CH_4$:$CO_2$.

The gas mixture of $CH_4$, $CO_2$, and $H_2O$ may be provided at a molar ratio of about 1:0.20 to 0.50:0.01 to 1.45, for example, about 1:0.25 to 0.45:0.10 to 1.35, for example, about 1:0.30 to 0.40:0.50 to 1.0, for $CH_4$:$CO_2$:$H_2O$.

In another embodiment, the carbon source gas may comprise carbon monoxide and/or carbon dioxide ($CO_2$).

In another embodiment, the carbon source gas is a gas mixture of $CH_4$ and $N_2$.

The gas mixture of $CH_4$ and $N_2$ may be provided at a molar ratio of about 1:0.20 to 0.50, for example, about 1:0.25 to 0.45, for $CH_4$:$N_2$. For example, the gas mixture of $CH_4$ and $N_2$ may be provided at a molar ratio of about 1:0.30 to 0.40, for $CH_4$:$N_2$. In another embodiment, the carbon source gas may not include an inert gas, such as nitrogen.

The heat-treating of the structure may be performed at a temperature in a range of about 700° C. to about 1100° C., for example, in a range of about 700° C. to about 1000° C.

In the heat-treating, a pressure is not limited and may be selected in consideration of a heat-treating temperature, a composition of a gas mixture, and a desired amount of carbon coating. The pressure for the heat-treating may be selected by changing an amount of supply and discharge of the gas mixture from the reactor. For example, the pressure for the heat-treating may be about 1 atmosphere (atm) or higher, for example, about 2 atm or higher, about 3 atm or higher, about 4 atm or higher, or about 5 atm or higher, for example about 1 to about 10 atm, but is not limited thereto.

A heat-treating time is not particularly limited but may be appropriately selected depending on a heat-treating temperature, a heat-treating pressure, a composition of a gas mixture, and a desired amount of carbon coating. For example, the reaction time may be in a range of about 10 minutes to about 100 hours, for example, in a range of about 30 minutes to about 90 hours, for example, in a range of about 50 minutes to about 40 hours, but is not limited thereto. Although not limited to a particular theory, since an amount of graphene (carbon) being deposited increases as time passes, electrical properties of the composite may be improved accordingly. However, such tendency is not always in direct proportion to time. For example, no further graphene deposition may occur or a deposition rate of the graphene may decrease after a selected period of time.

The method of manufacturing a composite may provide a uniform coating of graphene on the silicon covered with the silicon oxide (SiOx) even at a relatively low temperature though a gas phase reaction of the carbon source gas. Also, dropout, e.g., delamination, of the graphene formed on the silicon covered with the silicon oxide (SiOx) layer does not substantially occur. When a thickness of the silicon oxide layer is suitable, dropout of the graphene may be even further suppressed. In this regard, a thickness of the silicon oxide layer that may efficiently suppress elimination of the graphene is about 10 nm or less, for example, from about 0.1 nm to about 10 nm, for example, from about 0.1 nm to about 5 nm.

Also, since the graphene is coated on the silicon through the gas phase reaction, a coating layer with a high degree of crystallinity may be formed, and thus when the composite is used as a negative electrode active material, a conductivity of the negative electrode active material may be increased without changing a structure of the composite.

A process of manufacturing a carbon composite using the composite according to an embodiment may be as follows.

The process includes combining, e.g., mixing, the composite in which graphene is formed on silicon covered with a silicon oxide, and a carbon-based material and heat-treating the mixture to manufacture the carbon composite.

The heat-treating is performed at a temperature in a range of about 700° C. to about 1000° C., for example about 750° C. to about 900° C. When a temperature of the heat-treating is in this range, the carbon composite may have improved capacity characteristics.

The composite or the carbon composite according to an embodiment may be used in a battery, an illuminant for display, a thermoelectric device, or a biosensor.

According to another aspect, an electrode including the composite or the carbon composite is provided. The electrode may be an electrode for a lithium battery.

The electrode may be a negative electrode.

The composite or the carbon composite may be used as an electrode active material, for example, a negative electrode active material. In this regard, when the composite or the carbon composite is used as a negative electrode active material, volume expansion and pulverization of silicon may be decreased or effectively eliminated. Also, a conductivity of the negative electrode active material may be improved, and thus a high rate capability of a lithium battery using the negative electrode active material may be improved. Moreover, an amount of graphene coated on the silicon, which is covered with a silicon oxide, may be minimized, and thus the negative electrode active material having an improved energy density per volume may be obtained.

A lithium battery containing the composite or a carbon composite including the composite and a carbon-based material is provided.

The negative electrode may be manufactured by using the method described as follows.

The negative electrode may be formed by molding a negative electrode active material composition including, for example, a composite or a carbon composite that is a negative electrode active material, a conducting agent, and a binder in a predetermined shape or coating the negative electrode active material composition on a current collector, such as a copper foil. The conducting agent may be omitted in the composition. Also, the negative electrode active material may be formed as a film on a separator without the current collector.

In particular, the negative electrode active material composition is prepared by mixing the negative electrode active material, a conducting agent, a binder, and a solvent. A negative electrode plate is prepared by directly coating the negative electrode active material composition on a metal current collector. Alternatively, a negative electrode plate may be prepared by casting the negative electrode active material composition on a separate support and then laminating a film detached from the support on a metal current collector. The negative electrode active material may additionally include a second carbon-based negative electrode active material which is different from the negative electrode active material described above. For example, the second carbon-based negative electrode active material may be at least one selected from natural graphite, artificial graphite, expansion graphite, graphene, carbon black, fullerene soot, carbon nanotubes, and carbon fibers, but is not limited thereto, and any suitable carbon-based negative electrode active material available in the art may be used.

Also, the conducting agent may be acetylene black, ketjen black, natural graphite, artificial graphite, carbon black, carbon fibers, or a metal powder of copper, nickel, aluminum, or silver. The conducting agent may be a conductive material of one type, such as, a polyphenylene derivative, or a mixture of at least two types of conductive materials, but the conducting agent is not limited thereto, and any suitable conducting agent available in the art may be used.

The binder may be a vinylidene fluoride/hexafluoropropylene copolymer, polyvinylidenefluoride (PVDF), polyacrylonitrile, polymethylmethacrylate, polytetrafluoroethylene, a styrene-butadiene rubber-based polymer, polyacrylic acid, polyamidimide, polyimide or a mixture thereof, but is not limited thereto, and any suitable binder available in the art may be used.

The solvent may be at least one selected from N-methylpyrrolidone, acetone, and water, but the solvent is not limited thereto, and any suitable solvent available in the art may be used.

Contents of the negative electrode active material, the conducting agent, the binder, and the solvent are at levels which can be determined by one of skill in the art without undue experimentation. At least one of the binder and the solvent may be omitted depending on use and configuration of a lithium battery, if desired.

A lithium battery according to another embodiment includes the negative electrode. The lithium battery may be prepared by using the method as follows.

First, a negative electrode is prepared by using the method of manufacturing the negative electrode.

Next, a positive electrode active material, a conducting agent, a binder, and a solvent are combined to prepare a positive electrode active material composition. The positive electrode active material composition is coated directly on a metal current collector and dried to prepare a positive electrode plate. Alternatively, a positive electrode plate may be prepared by casting the positive electrode active material composition on a separate support and then laminating a film detached from the support on a metal current collector.

The positive electrode active material may include at least one selected from the group consisting of a lithium cobalt oxide, a lithium nickel cobalt manganese oxide, a lithium nickel cobalt aluminum oxide, a lithium iron phosphate, and a lithium manganese oxide, but the positive electrode active material is not limited thereto, and any positive electrode active material available in the art may be used.

For example, the positive electrode active material may be a compound represented by any of following formulas.

$Li_aA_{1-b}R_bD_2$ (where, $0.90 \leq a \leq 1.8$, and $0 \leq b \leq 0.5$); $Li_aE_{1-b}R_bO_{2-c}D_c$ (where, $0.90 \leq a \leq 1.8$, $0 \leq b \leq 0.5$, and $0 \leq c \leq 0.05$); $LiE_{2-b}R_bO_{4-c}D_c$ (where, $0 \leq b \leq 0.5$ and $0 \leq c \leq 0.05$); $Li_aNi_{1-b-c}Co_bR_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}X_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}X_2$ (where, $0.90 \leq a \leq 1.8$, $\leq 0 \leq b$ $0.5$, $0 \leq c \leq 0.05$, and $0 < \alpha < 2$); $Li_aNi_{1-b-c}Mn_bR_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}X_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}X_2$ (where, $0.90 \leq a \leq 1.8$, $0 \leq b \leq 0.5$, $0 \leq c \leq 0.05$, and $0 < \alpha < 2$); $Li_aN$-$i_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ In the formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; M' is Cr, V, Fe, Sc, Y, or a combination thereof; and J is V, Cr, Mn, Co, Ni, Cu, or a combination thereof.

The compound may have a coating layer on a surface thereof or the compound may be combined with a compound having a coating layer. The coating layer may include a coating element compound of an oxide or a hydroxide of a coating element, an oxyhydroxide of a coating element, an oxycarbonate of a coating element, or a hydroxycarbonate of a coating element. The compound forming the coating layer may be amorphous or crystalline. The coating element included in the coating layer may be at least one selected from Mg, Al, Co, K, Na, Ca, Si, Ti, V, Sn, Ge, Ga, B, As, and Zr. A process of forming the coating layer may be any suitable coating method capable of coating the compound by using the elements in a manner that does not negatively affect desirable physical properties of the positive electrode active material (e.g., spray coating or immersion), and since the details of the coating process may be determined by those of skill in the art without undue experimentation, additional detailed description of the coating process is omitted.

For example, the compound may be at least one selected from $LiNiO_2$, $LiCoO_2$, $LiMn_xO_{2x}$ (where, x is 1 or 2), $LiNi_{1-x}Mn_xO_2$ (where, $0 < x < 1$), $LiNi_{1-x-y}Co_xMn_yO_2$ (where, $0 \leq x \leq 0.5$ and $0 \leq y \leq 0.5$), $LiFeO_2$, $V_2O_5$, TiS, and MoS.

In the positive electrode active material composition, the same conducting agent, binder, and solvent used in the case of the negative electrode active material composition may be used. Also, a plasticizer may be further added to the positive electrode active material composition and/or the negative electrode active material composition to form pores in the electrode plate.

Contents of the positive electrode active material, the conducting agent, the binder, and the solvent are at levels which may be determined by those of skill in the art without undue experimentation. At least one of the conducting agent, the binder, and the solvent may be omitted if desired depending on use and configuration of a lithium battery.

Next, a separator to be inserted between the positive electrode and the negative electrode is provided. The separator may be any separator suitable for a lithium battery. The separator may have a low resistance with respect to ion movement and an excellent electrolyte containing ability. For example, the separator may be at least one selected from glass fibers, polyester, Teflon, polyethylene, polypropylene, and polytetrafluoroethylene. The separator may be a non-woven type or a woven type. For example, a rollable separator, such as polyethylene or polypropylene, is used in a lithium ion battery, and a separator having an excellent organic electrolyte containing ability may be used in a lithium ion polymer battery. For example, the separator may be manufactured by using the method as follows.

A separator composition is prepared by mixing a polymer resin, a filler, and a solvent. A separator may be formed as the separator composition is directly coated and dried on an electrode. Alternatively, the separator composition may be cased and dried on a support, and a film detached from the support may be laminated on an electrode to prepare the separator.

The polymer resin used in the preparation of the separator is not particularly limited, and any suitable material used as a binder for electrode plates may be used. For example, the polymer resin may be at least one selected from a vinylidenefluoride/hexafluoropropylene copolymer, polyvinylidenefluoride (PVDF), polyacrylonitrile, and polymethylmethacrylate.

The separator may include a ceramic composition to improve function of the separator as a membrane. For example, the separator may be coated by an oxide or include ceramic particles.

Next, an electrolyte is prepared.

For example, the electrolyte may be an organic electrolyte. Also, the electrolyte may be solid. For example, the electrolyte may be a boron oxide or lithiumoxynitride, but is not limited thereto, and any suitable solid electrolyte available in the art may be used. The solid electrolyte may be formed on the negative electrode by using a method, such as, sputtering.

For example, an organic electrolyte may be prepared. The organic electrolyte may be prepared by dissolving a lithium salt in an organic solvent.

The organic solvent may be any suitable organic solvent available in the art. For example, the organic solvent may be at least one selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahyerofuran, γ-butylolactone, dioxolane, 4-methyldioxolane, N,N-dimehtylformamide, N,N-dimethylacetamide, dimethylsulfoxide, dioxane, 1,2-dimethyoxyethane, sulfolane, dichloroethane, chlorobenzene, nitrobenzene, diethyleneglycol, and dimethylether.

The lithium salt may be any lithium salt available in the art. For example, the lithium salt may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are a natural number), LiCl, and LiI.

Figure 2A:
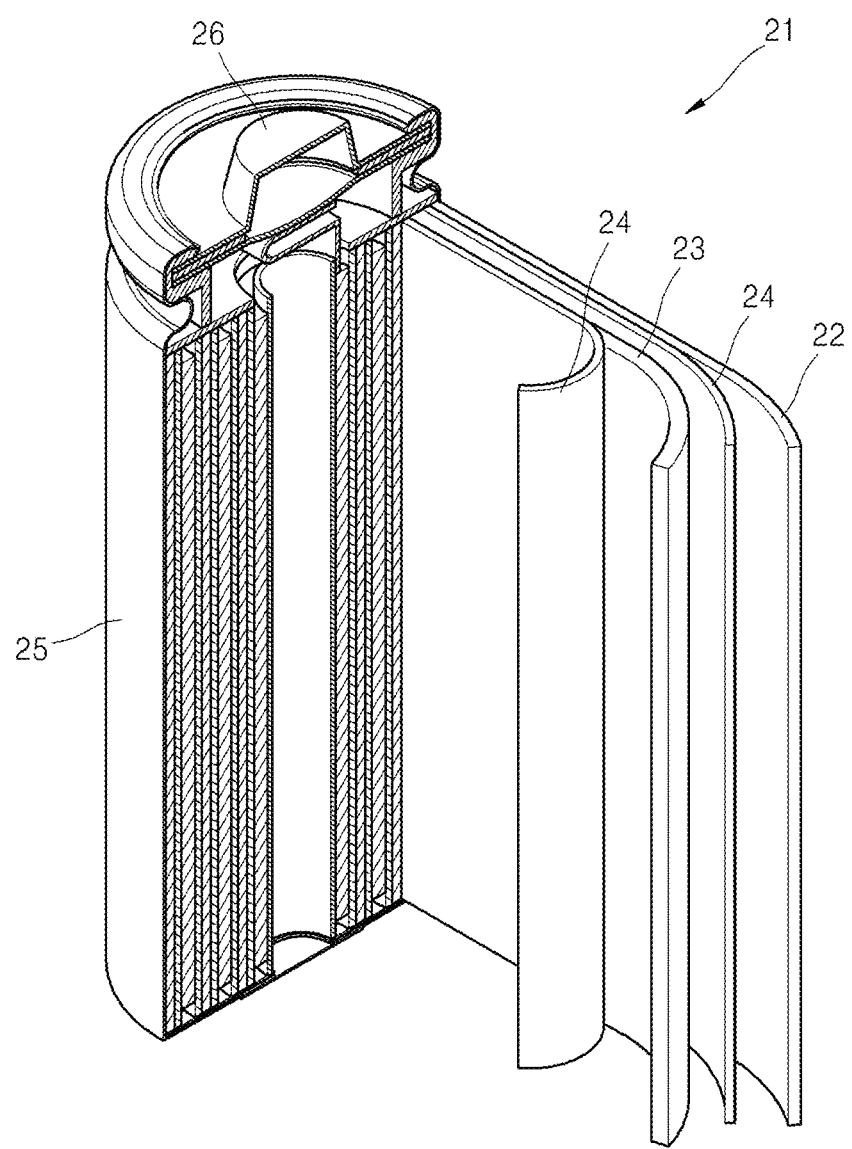
FIG. 2A is a schematic view of an embodiment of a lithium battery.

As shown in FIG. 2A, a lithium battery 21 includes a positive electrode 23, a negative electrode 22, and a separator 24. The positive electrode 23, negative electrode 22, and separator 24 are wound or folded and accommodated in a battery case 25. Then, an organic electrolyte is injected into the battery case 25, and the battery case 25 is sealed with a cap assembly 26, thereby completing the lithium battery 21. The battery case may have a shape of a cylinder, a box, or a thin film. For example, the lithium battery may be a thin film type battery. The lithium battery may be a lithium ion battery.

The separator 24 may be disposed between the positive electrode 23 and the negative electrode 22 to form a battery structure. The battery structures may be stacked in a by-cell structure and immersed in an organic electrolyte, and the resultant is accommodated in a pouch and sealed therein, thereby completing a lithium ion polymer battery.

Also, a plurality of the battery structures may be stacked and form a battery pack, and the battery pack may be used in any device requiring a high capacity and a high output. For example, the battery pack may be used in a laptop, a smartphone, or an electric vehicle.

The lithium battery has an excellent high rate capability and life characteristics and thus may be used in an electric vehicle (EV). For example, the lithium battery may be used in a hybrid vehicle, such as, a plug-in hybrid electric vehicle (PHEV).

In another aspect, an electroluminescent device containing the composite or the carbon composite that includes the composite and a carbon-based material.

The electroluminescent device is a device using movement of electrons. A electroluminescent device includes at least one of a cathode, an emitter tip, and an anode distanced apart from the cathode (see, for example, U.S. Pat. No. 7,009,331; U.S. Pat. No. 6,976,897; U.S. Pat. No. 6,911,767; and U.S. 2006/0066217, the content of each of which is incorporated herein by reference). Electrons are emitted when a voltage is applied between the cathode and the anode. The electrons move in a direction from the cathode to the anode. The device is not limited to but may be used for various purposes, such as in an ultrasound vacuum tube device (e.g., an X-ray tube), a power amplifier, an ion gun, a high-energy accelerator, a free electron laser, and an electron microscope, particularly in a flat panel display. The flat panel display may be used as an alternative for a cathode tube. Thus, the flat panel display may be applied to a television and a computer monitor.

The emitter tip may be a composite according to an embodiment of a carbon composite using the composite.

An emitter tip is formed with a semiconductor, which may be a metal such as molybdenum or a silicon. One of interested areas regarding use of a metal emitter tip is that a control voltage for emission of the electrons is relatively high as it is about 100 V. Also, since the emitter tip does not have uniformity, a current density between pixels is not uniform.

When the emitter tip using the composite or the carbon composite is used, electroluminescent emitting characteristics are improved.

In another aspect, a biosensor containing a composite according to an embodiment or a carbon composite including the composite and a carbon-based material is provided.

The composite according to an embodiment or the carbon composite may be used when an electrode for the biosensor is formed.

Figure 2B:
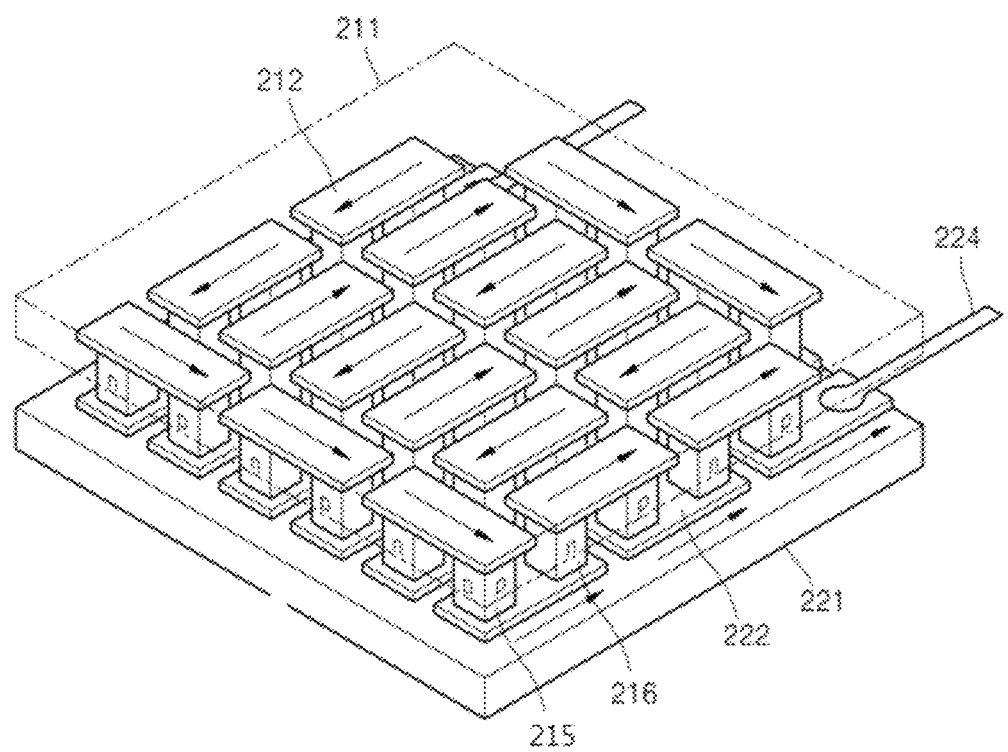
FIG. 2B is a schematic diagram of an embodiment of a thermoelectric module.
Figure 2C:
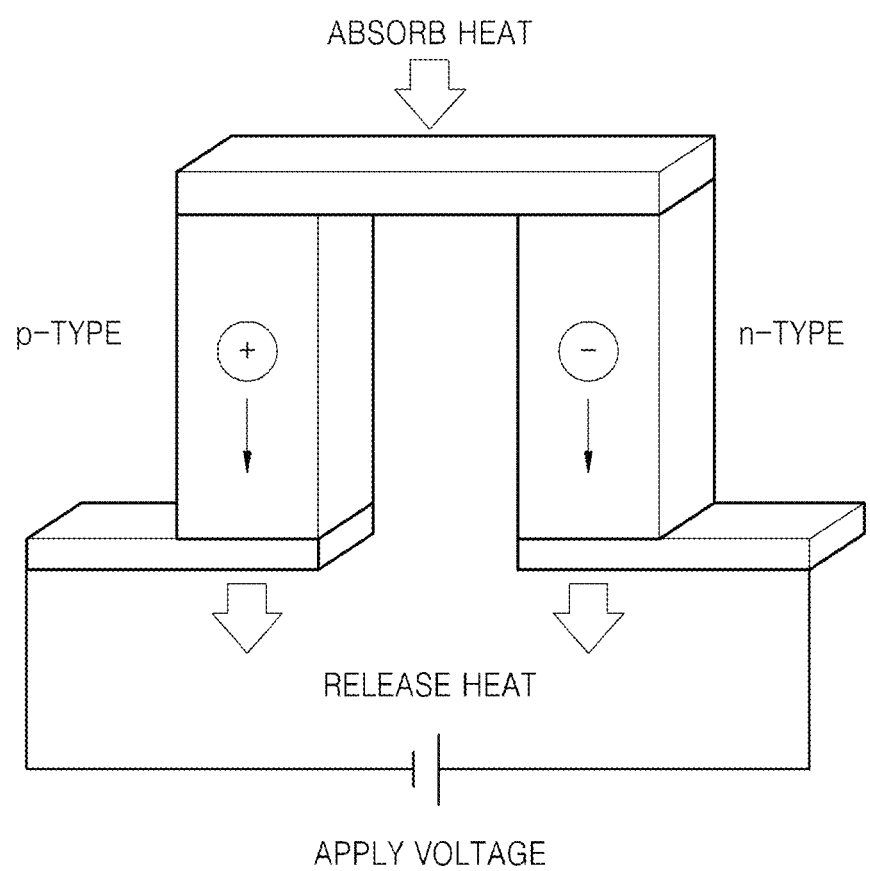
FIG. 2C is a schematic diagram illustrating an embodiment of a thermoelectric cooler that uses the Peltier effect.
Figure 2D:
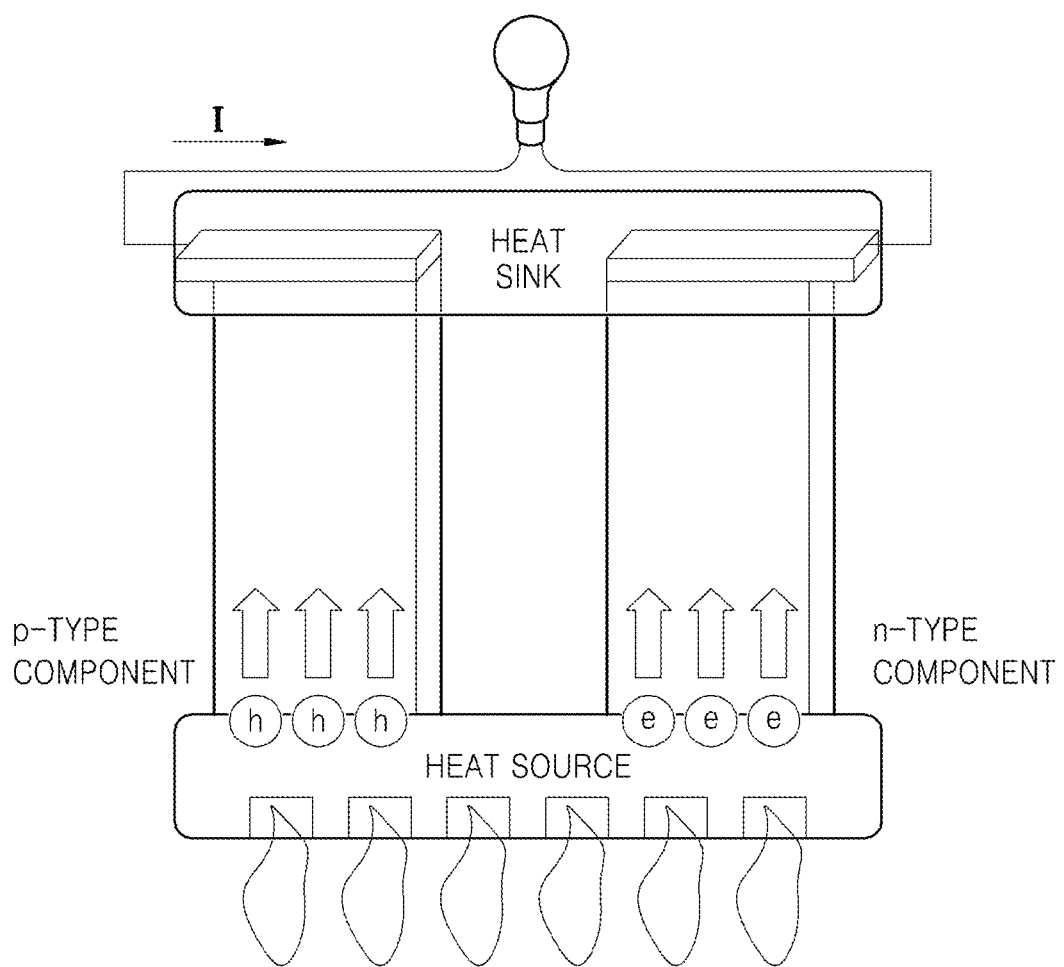
FIG. 2D is a schematic diagram illustrating an embodiment of a thermoelectric generator that uses the Seebeck effect.
Figure 2E:
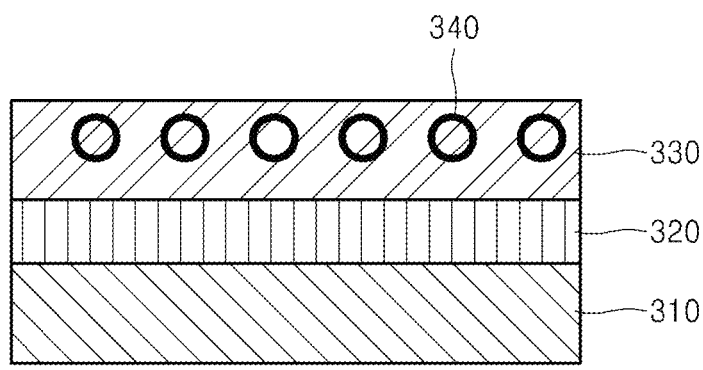
FIG. 2E illustrates a structure of an embodiment of an electrode of a biosensor.

FIG. 2E is a cross-sectional view illustrating a structure of a biosensor electrode according to an embodiment. Referring to FIG. 2E, the biosensor electrode according to an embodiment includes a substrate 310, a first layer 320 including a composite according to an embodiment or a carbon composite according to an embodiment formed on the substrate 310, and a second layer 330 formed on the first layer 20. A biomaterial 340 is carried or fixed in the second layer 330 in various manners.

The substrate 310 denotes a plate of all types on which graphene may be deposited or formed, and, in particular, the substrate 310 may be formed of a material selected from the group consisting of glass, plastic, metal, ceramic, and silicon, but a type of the substrate 310 is not limited as long as graphene may be deposited or formed thereon.

The biomaterial 340 may be at least one selected from an enzyme, an aptamer, a protein, a nucleic acid, a microorganism, a cell, a lipid, a hormone, a DNA, a PNA, and a RNA. Also, the biomaterial 340 may be one of various biomaterials that are not mentioned in the present specification.

Referring to FIG. 2E, the biomaterial 340 may be a specific enzyme, and the first layer 320 is an electrode for a biosensor that carries the specific enzyme or uses a fixed layer. Also, in FIG. 2E, the specific enzyme is shown as carried or fixed in the layer, but a location of the specific enzyme is not limited thereto, and a part of or a entirety of the specific enzyme may be protruded on the layer. In this case, since an enzyme has an excellent substrate specificity and thus has characteristics of selectively reacting with a specific molecule in a mixture, an analysis material (e.g., blood sugar) reacting with a specific enzyme may be selectively detected.

In another aspect, a semiconductor device containing the composite or the carbon composite including the composite and a carbon-based material is provided.

The composite or the carbon composite may be used as an electrode of the semiconductor device.

In another aspect, a thermoelectric material containing the composite or the carbon composite including the composite and a carbon-based material and a thermoelectric device including the thermoelectric material are provided.

The thermoelectric material has an improved thermoelectric performance due to excellent electric characteristics. The thermoelectric material may be effectively used in a thermoelectric device, a thermoelectric module, or a thermoelectric apparatus.

Performance of a thermoelectric material is defined by a dimensionless figure of merit, a ZT value of Equation 1.

$$ZT=(S^2\sigma T)/k \qquad \text{Equation 1}$$

In Equation 1, ZT is a figure of merit, S is a Seebeck coefficient, $\sigma$ is an electrical conductivity, T is an absolute temperature, and k is a thermal conductivity.

As shown in Equation 1, in order to increase a ZT value of a thermoelectric material, a Seebeck coefficient and an electrical conductivity, or a power factor ($S^2\sigma$), need to be increased and a thermal conductivity needs to be decreased.

The composite or the carbon composite according to an embodiment contains graphene, and the composite or the carbon composited is used for the thermoelectric material. As a result an electric conductivity of the thermoelectric material may be high and a thermal conductivity of the thermoelectric material may be lowered. Thus, performance of the thermoelectric material may be improved.

In the composite or the carbon composite according to an embodiment, crystallinity and an electron structure at the interface between graphene having properties of a metal and a silicon having properties of a semiconductor change, and thus a Seebeck coefficient increases, and increases in an electrical conductivity and a charge mobility may be induced as transfer of charge particles is accelerated. Also, phonon scattering at the interface of the graphene and the silicon increases, and thus a thermal conductivity of the thermoelectric material may be controlled.

As described above, the composite or the carbon composite may be effectively used as a thermoelectric material. Thus, the thermoelectric material may be molded by using a method, such as a cutting process, to manufacture a thermoelectric device. The thermoelectric device may be a p-type thermoelectric device. The thermoelectric device denotes the thermoelectric device that is modified in a predetermined shape, for example, a rectangular shape.

Also, the thermoelectric device may include compositions that bind with an electrode and have a cooling effect due to current supply or compositions that have power generating effect due to difference in the device or temperature.

FIG. 2B illustrates a thermoelectric module including the thermoelectric device. As shown in FIG. 2B, an upper electrode 212 (a first electrode) and a lower electrode 222 (a second electrode) are patterned on an upper insulating substrate 211 and a lower insulating substrate 221. Also, a p-type thermoelectric composition 215 and an n-type thermoelectric composition 216 are in contact with the upper electrode 212 and the lower electrode 222. The electrodes 212 and 222 are connected to outside of the thermoelectric device through lead electrodes 224. The p-type thermoelectric composition 215 may be the thermoelectric device. The n-type thermoelectric composition 216 may be any n-type thermoelectric composition known in the art.

The insulating substrates 211 and 221 may be gallium arsenide (GaAs), sapphire, silicon, PYREX, or a quartz substrate. A material of the electrodes 212 and 222 may be variously selected from copper, aluminum, nickel, gold, and titanium, and a size of the electrodes 212 and 222 may be variously selected. A method of patterning the electrodes 212 and 222 may be any suitable patterning method, for example, a lift off semiconductor process, a deposition method, or a photolithography method.

In an embodiment of the thermoelectric module, as shown in FIGS. 2C and 2D, one of the first electrode and the second electrode may be exposed to a heat source. In an embodiment of the thermoelectric module, one of the first electrode and the second electrode may be electrically connected to a power source or electrically connected to outside of the thermoelectric module, for example, an electric device (e.g., a battery) that consumes or stores electricity.

As an embodiment of the thermoelectric module, one of the first electrode and the second electrode may be electrically connected to a power source.

Hereinafter, the present disclosure will be described in further detail with reference to the following examples. However, these examples are for illustrative purposes only and are not intended to limit the scope.

EXAMPLES

Preparation Example 1

Preparation of Composite

Silicon nanowires (cross-sectional diameter: 50 nm, length: 400 nm) having a silicon oxide (SiOx, wherein 0<x<2) layer formed thereon at a thickness of about 0.1 nm was disposed in a reactor. A gas mixture of $CH_4$ and $N_2$ at a flow rate ratio of 30 standard cubic centimeters per minute (sccm):270 sccm ($CH_4$:$N_2$) was flowed into the reactor to form an atmosphere of the gas mixture inside the reactor. A pressure formed by the flow of the gas mixture inside the reactor was 1 atmosphere (atm). Under the gas mixture atmosphere, a temperature in the reactor was increased to about 1000° C. (at a rate of rising temperature: about 23° C./min), and the gas mixture was continuously flowed into the reactor while the temperature was maintained for 3 hours to perform heat-treatment. Subsequently, the product of the heat-treatment was allowed to cool in the reactor and in the gas mixture for 4 hours, and thus graphene nanosheet was formed on the silicon wires. Then, the supply of the gas mixture was stopped, and the reactor was cooled to room temperature (25° C.) to obtain a composite including the silicon nanowires covered with the silicon oxide (SiOx, wherein 0<x<2) layer and having the graphene nanosheet formed on the silicon oxide layer.

A content of the graphene nanosheet in the composite was about 8 parts by weight, based on 100 parts by weight of the composite.

Preparation Example 2

A composite including a graphene layer laminated on silicon wires covered with a silicon oxide (SiOx, wherein 0<x<2) layer was obtained in the same manner used in Preparation Example 1, except that a gas mixture of $CO_2$ and $CH_4$ at a flow rate ratio of 150 sccm:150 sccm ($CO_2$:$CH_4$) was used instead of the gas mixture of $CH_4$ and $N_2$ at a flow rate ratio of 30 sccm:270 sccm.

A content of the graphene layer in the composite was about 8 parts by weight, based on 100 parts by weight of the composite.

Preparation Example 3

A composite including a graphene layer laminated on silicon wires covered with a silicon oxide (SiOx, wherein 0<x<2) layer was obtained in the same manner used in Preparation Example 1, except that a gas mixture of $H_2O$, $CO_2$, and $CH_4$ at a flow rate ratio of 0.001 sccm:150 sccm:150 sccm ($H_2O$:$CO_2$:$CH_4$) was used instead of the gas mixture of $CH_4$ and $N_2$ at a flow rate ratio of 30 sccm:270 sccm.

A content of the graphene layer in the composite was about 8 parts by weight, based on 100 parts by weight of the composite.

Preparation Example 4

A composite including a graphene layer laminated on silicon wires covered with a silicon oxide (SiOx, wherein 0<x<2) layer was obtained in the same manner used in Preparation Example 1, except that a gas having CO at a flow rate 100 sccm was used instead of the gas mixture of $CH_4$ and $N_2$ at a flow rate ratio of 30 sccm:270 sccm.

A content of the graphene layer in the composite was about 8 parts by weight based on 100 parts by weight of the composite.

Preparation Example 5

A composite including a graphene layer laminated on silicon wires covered with a silicon oxide (SiOx, wherein 0<x<2) layer was obtained in the same manner used in Preparation Example 1, except that a gas having $CO_2$ at a flow rate of 100 sccm was used instead of the gas mixture of $CH_4$ and $N_2$ at an atomic ratio of 30 sccm:270 sccm.

A content of the graphene layer in the composite was about 8 parts by weight, based on 100 parts by weight of the composite.

Preparation Example 6

A composite including a graphene layer laminated on silicon wires covered with a silicon oxide (SiOx, where 0<x<2) layer was obtained in the same manner used in Preparation Example 2, except that a temperature inside the reactor was changed to 850° C. instead of 1000° C.

A content of the graphene layer in the composite was about 8 parts by weight, based on 100 parts by weight of the composite.

Preparation Example 7

A composite including a graphene layer laminated on silicon wires covered with a silicon oxide (SiOx, wherein 0<x<2) layer was obtained in the same manner used in Preparation Example 2, except that a temperature inside the reactor was changed to 700° C. instead of 1000° C.

A content of the graphene layer in the composite was about 8 parts by weight, based on 100 parts by weight of the composite.

Preparation Example 8

A composite including a graphene nanosheet laminated on silicon nanoparticles covered with a silicon oxide (SiOx, wherein 0<x<2) layer was obtained in the same manner used in Preparation Example 1, except that silicon nanoparticles (average particle diameter: about 150 nm) having a silicon oxide (SiOx, wherein 0<x<2) layer formed thereon were used instead of the silicon nanowires. Here, the thickness of the silicone oxide (SiOx, wherein 0<x<2) nanosheet was about 0.1 mm. A content of the graphene nanosheet in the composite was about 8 parts by weight, based on 100 parts by weight of the composite.

Preparation Example 9

A composite including a graphene layer laminated on silicon wires covered with a silicon oxide (SiOx, wherein 0<x<2) layer was obtained in the same manner used in Preparation Example 8, except that a gas mixture of $CO_2$ and $CH_4$ at a flow rate ratio of 150 sccm:150 sccm ($CO_2$:$CH_4$) was used instead of the gas mixture of $CH_4$ and $N_2$ at a flow rate ratio of 30 sccm:270 sccm ($CH_4$:$N_2$). A content of the graphene layer in the composite was about 8 parts by weight, based on 100 parts by weight of the composite.

Reference Example 1

A composite including a graphene layer laminated on silicon wires covered with a silicon oxide (SiOx, wherein 0<x<2) layer was obtained in the same manner used in Preparation Example 1, except that a gas having $N_2$ at a flow rate of 300 sccm was used instead of the gas mixture of $CH_4$ and $N_2$ at a flow rate ratio of 30 sccm:270 sccm.

Comparative Preparation Example 1

Silicon wires (SiNANOde available from Nanosys, Milpitas, Calif.) on which a silicon oxide (SiOx, wherein 0<x<2) natural oxide layer was formed, was used.

Comparative Preparation Example 2

The silicon nanowires were located in the reactor. Hydrogen was first flowed into the reactor at a rate of about 300 sccm, a temperature inside the reactor under the condition was increased to about 1000° C., and the temperature was maintained for about 2 hours to perform heat-treatment.

Subsequently, a gas mixture of $CH_4$ and $H_2$ at a flow rate ratio of 100 sccm:200 sccm was flowed into the reactor to form an atmosphere of the gas mixture inside the reactor. A pressure formed by the flow of the gas mixture inside the reactor was 1 atm. Under the gas mixture atmosphere, a temperature in the reactor was increased to about 1000° C., and the gas mixture was continuously flowed into the reactor while the temperature was maintained for 1 hour to perform heat-treatment.

Subsequently, nitrogen was flowed into the reactor at a rate of about 300 sccm, and the heat-treatment was performed for about 1 hour while the temperature inside the reactor was maintained at about 1000° C., and then the product of the heat treatment was allowed to cool in the reactor and in the gas mixture for 4 hours without performing the heat-treatment.

Therefore, a silicon carbide coating layer was formed on the silicon wires. Then, the supply of the gas mixture was stopped and the reactor was cooled to room temperature while nitrogen gas was flowed therein, and thus a structure including the silicon wires and a silicon carbide layer coating on a surface of the silicon wires was obtained.

Comparative Preparation Example 3

A composite was prepared in the same manner as used in Preparation Example 1, except that a gas having $H_2$ at a flow rate of 300 sccm was used instead of the gas mixture of $CH_4$ and $N_2$ at a flow rate ratio of 30 sccm:270 sccm.

According to Comparative Preparation Example 3, no coating layer was formed on the silicon wires.

Comparative Preparation Example 4

Silicon nano-sized particles (VD vision, Japan), which are covered with a silicon oxide layer, which is a natural oxide layer, was used.

Comparative Preparation Example 5

Silicon nano-sized particles (VD vision, Japan), which are covered with a silicon oxide layer, which is a natural oxide layer, was located in the reactor. Hydrogen was first flowed into the reactor at a rate of about 300 sccm, a temperature inside the reactor under the condition was increased to about 1000° C., and the temperature was maintained for about 2 hours to perform heat-treatment.

Subsequently, a gas having $H_2$ at a flow rate of 300 sccm was flowed into the reactor. A pressure formed by the flow of the gas inside the reactor was 1 atm. Under the gas atmosphere, a temperature in the reactor was increased to about 1000° C., and the gas was continuously flowed into the reactor while the temperature was maintained for 3 hour to perform heat-treatment.

Subsequently, the product of the heat treatment was allowed to cool in the reactor and in the gas for 4 hours without performing the heat-treatment to prepare silicon nano-sized particles.

According to Comparative Preparation Example 5, no coating layer was formed on the silicon nano-sized particles.

Example 1: Preparation of Negative Electrode

A slurry was prepared by mixing lithium-substituted polyacrylate (Li-PAA) with the composite prepared in Preparation Example 1. In the slurry, a solid content mixture ratio of the composite prepared in Preparation Example 1 and the Li-PAA was 88:12 weight ratio.

The slurry was coated on a Cu foil, and then a doctor blade was used to form a layer having a thickness of about 40 µm. The layer was vacuum dried at a temperature of 120° C. for 2 hours, and then the dried product was pressed to prepare a negative electrode.

Examples 2 to 7: Preparation of Negative Electrodes

Negative electrodes were prepared in the same manner used in Example 1, except that the composites prepared in Preparation Examples 2 to 9 were used instead of the composite prepared in Preparation Example 1.

Example 8: Preparation of Negative Electrode

A slurry was prepared by mixing the composite prepared in Preparation Example 8, Super P carbon (Timcal), and a lithium-substituted polyacrylate (Li-PAA) solution. In the slurry, a weight ratio of the composite prepared in Preparation Example 8, Super P carbon, and the Li-PAA was 65:15:20.

The slurry was coated on a Cu foil, and then a doctor blade was used to form a layer having a thickness of about 40 µm. The layer was vacuum dried at a temperature of 120° C. for 2 hours, and then the dried product was pressed to prepare a negative electrode.

Example 9: Preparation of Negative Electrode

A negative electrode was prepared in the same manner used in Example 8, except that the composites prepared in Preparation Example 9 was used instead of the composite prepared in Preparation Example 8.

Comparative Examples 1-4: Preparation of Negative Electrodes

Negative electrodes were prepared in the same manner used in Example 1, except that the structures prepared in Comparative Preparation Examples 1-4 were used instead of the composite prepared in Preparation Example 1.

Comparative Example 5 and 6: Preparation of Negative Electrode

A negative electrode was prepared in the same manner used in Example 8, except that the structures prepared in Comparative Preparation Examples 1 and 2 was used instead of the composite prepared in Preparation Example 8, respectively.

Comparative Example 7 and 8: Preparation of Negative Electrode

A negative electrodes were prepared in the same manner used in Example 8, except that the structures prepared in Comparative Preparation Examples 4 and 5 was used instead of the composite prepared in Preparation Example 8.

Manufacturing Example 1: Manufacture of Coin Cell

A coin cell (CR2032) was manufactured by using the negative electrode prepared in Example 1 and lithium as a counter electrode.

A separator was a polypropylene layer (Celgard 3510), and an electrolyte was 1.3 molar (M) of $LiPH_6$ ethylene carbonate:diethyl carbonate:fluoroethylene carbonate (EC: DEC:FEC) at a volume ratio of 2:6:2.

Comparative Manufacturing Examples 1-4: Manufacture of Coin Cells

Coin cells were manufactured in the same manner used in Manufacture Example 1, except that the negative electrodes prepared in Comparative Examples 1-4 were used instead of the negative electrode prepared in Example 1.

Manufacturing Examples 2 to 9: Manufacture of Coin Cells

Coin cells were manufactured in the same manner used in Manufacture Example 1, except that the negative electrodes prepared in Examples 2 to 9 were used instead of the negative electrode prepared in Example 1.

Comparative Manufacturing Examples 5 to 8: Manufacture of Coin Cell

A coin cells were manufactured in the same manner used in Manufacture Example 8, except that the negative electrodes prepared in Comparative Examples 5 to 8 were used instead of the negative electrode prepared in Example 8.

Reference Manufacture Example 1: Manufacture of Coin Cell

A coin cell was manufactured in the same manner used in Manufacturing Example 1, except that the composite negative prepared in Reference Example 1 was used instead of the composite prepared in Preparation Example 1.

Evaluation Example 1: Charging and Discharging Characteristics (1) Measurement of Initial Efficiency, Cycle Property, Coulombic Efficiency, and Discharge Capacity 1) Manufacturing Example 1 and Comparative Manufacture Examples 1 and 2

Charging/discharging characteristics of the coin cells prepared in Manufacturing Example 1 and Comparative Manufacturing Examples 1 and 2 were evaluated.

The charging/discharging evaluation was performed by charging lithium up to a voltage of 0.001 V, discharging the lithium to a voltage of 1.5 V, and repeatedly measuring up to about 100 cycles to when a specific capacity of the coin cell decreases to 92% of the performance compared to specific capacity of the coin cell at the first cycle. The current was controlled to be 50 milliamperes (mA) per 1 gram (g) of a weight of the electrode.

Also, in order to confirm charging speed characteristics, the coin cells were charged at a current of 0.5 C and discharged at a current of 0.05 C, and the results are shown in Table 1. Moreover, discharge capacity changes that were measured according to repeated cycles in the coin cells prepared in Manufacturing Example 1 and Comparative Manufacturing Examples 1 and 2 each respectively including the negative electrode prepared in Example 1 and Comparative Examples 1 and 2 are shown in FIG. 3.

TABLE 1

| Unit | 1st Cycle | | | Rate capability 0.5 C/0.05 C % | Coulombic efficiency % |
|---|---|---|---|---|---|
| | Charging mAh/g | Discharging mAh/g | Initial efficiency (%) | | |
| Manufacturing Example 1 | 647.42 | 552.9 | 85.4 | 98.35 | 99.61 |
| Comparative Manufacturing Example 1 | 652.17 | 568.7 | 87.2 | 97.19 | 99.10 |
| Comparative Manufacturing Example 2 | 610.73 | 529.5 | 86.7 | 98.35 | 99.61 |

Figure 3:
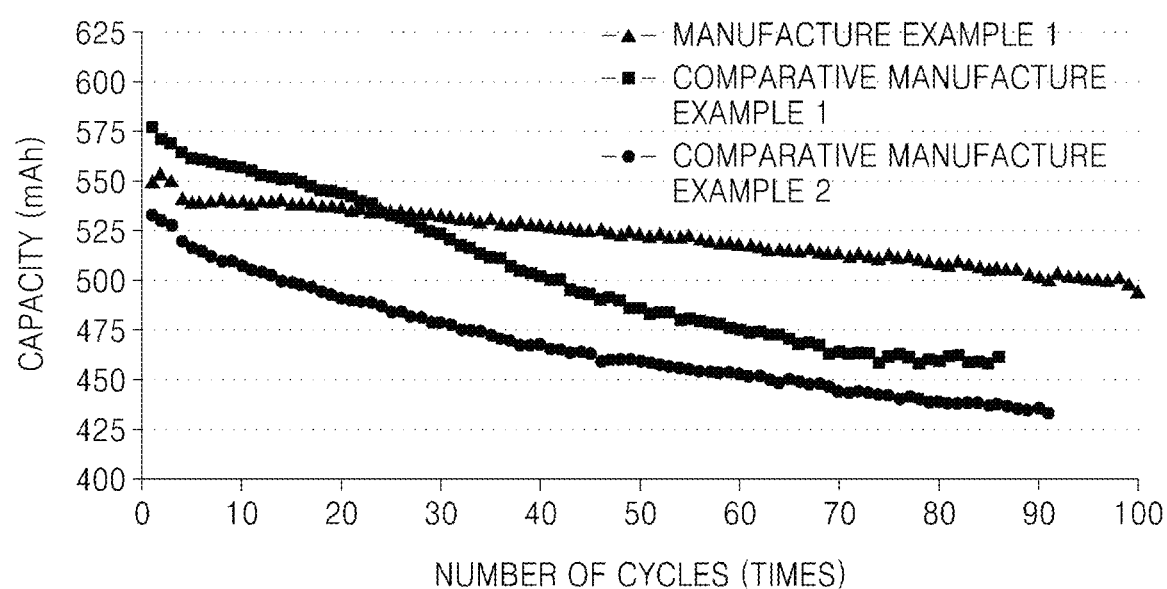
FIG. 3 is a graph of capacity (milliampere-hours, mAh) versus number of cycles which shows discharge capacity change in coin cells prepared in Manufacturing Example 1 and Comparative Manufacturing Examples 1 and 2, which included negative electrodes prepared in Example 1 and Comparative Examples 1 and 2, respectively.

Referring to FIG. 3 and Table 1, a capacity and an initial efficiency of the coin cell prepared in Manufacturing Example 1 decreased to a degree due to a graphene characteristic of having a small volume capacity compared to those of the coin cell prepared in Comparative Manufacturing Example 1. However, because a generation in the SEI layer is lowered, a coulombic efficiency improved, and thus durability of the coin cell prepared in Manufacturing Example 1 was significantly increased. Also, a rate capacity due to the increase in graphene conductivity was increased. A capacity of the coin cell prepared in Comparative Manufacturing Example 2 was reduced due to SiC formation caused by using a graphene produced by a chemical vapor deposition (CVD) method, and a durability of the coin cell prepared in Comparative Manufacturing Example 2 significantly decreased.

2) Manufacturing Examples 1 to 5, Comparative Manufacturing Examples 1 and 3, and Reference Manufacturing Example 1

Charging/discharging characteristics of the coin cells prepared in Manufacturing Examples 1 to 5, Comparative Manufacturing Examples 1 and 3, and Reference Manufacture Example 1 were evaluated.

The charging/discharging evaluation was performed by charging the coin cell up to a voltage of 0.001 V, discharging the coin cell to a voltage of 1.5 V, and repeatedly measuring up to about 100 cycles to when a specific capacity of the coin cell decreases to 92% of the performance compared to specific capacity of the coin cell at the first cycle. A current condition for the evaluation was controlled to be 50 mA per 1 g of a weight of the electrode.

Figure 4:
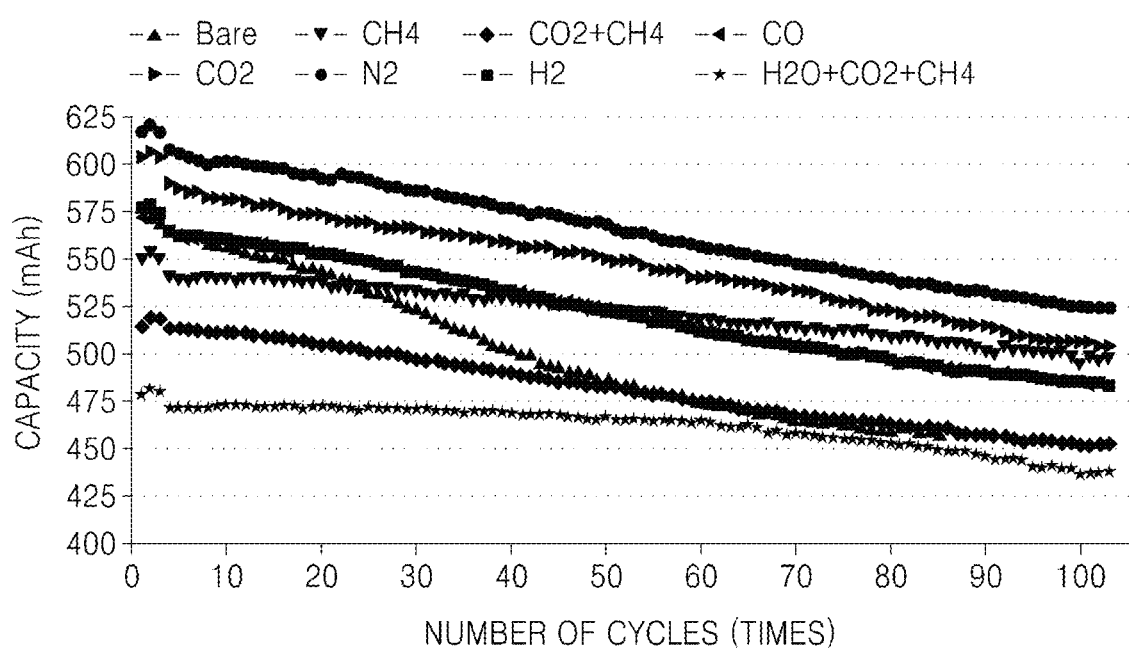
FIG. 4 is a graph of capacity (milliampere-hours, mAh) versus number of cycles which shows discharge capacity change in coin cells prepared in Manufacturing Examples 1 to 5 and Comparative Manufacturing Examples 1 and 3 and Reference Manufacture Example 1, which included negative electrodes prepared in Examples 1 to 5 and Comparative Examples 1 and 3, and the composite prepared in Reference Example 1, respectively.

Also, in order to confirm charging speed characteristics, the coin cells were charged at a current of 0.5 C and discharged at a current of 0.05 C, and the results are shown in Table 2. Moreover, discharge capacity changes that were measured according to repeated cycles in the coin cells prepared in Manufacturing Examples 1 to 5, Comparative Manufacturing Examples 1 and 3, and Reference Manufacture Example 1 each respectively including the negative electrode prepared in Examples 1 to 5, and Comparative Examples 1 and 3, and the composite prepared in Reference Example 1 are shown in Table 4. In FIG. 4, "Bare" are results for Comparative Manufacturing Example 1, $CH_4$ are results for Manufacturing Example 1, $CO2+CH4$ are results for Manufacturing Example 2, $H2O+CO2+CH4$ are results for Manufacturing Example 3, CO are results for Manufacturing Example 4, $CO2$ are results for Manufacturing Example 5, $N2$ are results for Reference Manufacture Example 1, and $H2$ are results for Comparative Manufacturing Example 3.

TABLE 2

| | 1st Cycle | | | Rate capability 0.5 C/0.05 C % | Coulombic efficiency % |
|---|---|---|---|---|---|
| | Charging to 0.05 C mAh/g | Discharging to 0.05 C mAh/g | Initial efficiency Unit (%) | | |
| Manufacturing Example 1 | 647.42 | 552.9 | 85.4 | 98.35 | 99.61 |
| Manufacturing Example 2 | 610.61 | 517.8 | 84.8 | 99.82 | 99.49 |
| Manufacturing Example 3 | 593.71 | 481.5 | 81.1 | 98.44 | 99.57 |
| Manufacturing Example 4 | 677.57 | 573.9 | 84.7 | 98.59 | 99.61 |
| Manufacturing Example 5 | 722.41 | 606.1 | 83.9 | 97.61 | 99.38 |
| Comparative Manufacturing Example 1 | 610.73 | 529.5 | 86.7 | 97.19 | 99.10 |
| Comparative Manufacturing Example 3 | 677.14 | 577.6 | 85.3 | 97.91 | 99.36 |
| Reference Manufacture Example 1 | 735.75 | 619.5 | 84.2 | 98.36 | 99.47 |

Referring to FIG. 4, it may be confirmed that a rate characteristic and a coulombic efficiency of the coin cells prepared in Manufacturing Examples 1 to 5 were improved compared to those of the coin cells prepared in Comparative Manufacturing Examples 1 and 3.

3) Manufacturing Example 8 and Comparative Manufacturing Examples 7 and 8

Charging/discharging characteristics of the coin cells prepared in Manufacturing Example 8 and Comparative Manufacturing Examples 7 and 8 were evaluated.

The charging/discharging evaluation was performed by charging the coin cell up to a voltage of 0.001 V, discharging the coin cell to a voltage of 1.5 V, and repeatedly measuring up to about 30 cycles. A current condition for the evaluation was controlled to be 50 mA per 1 g of a weight of the electrode.

Figure 4A:
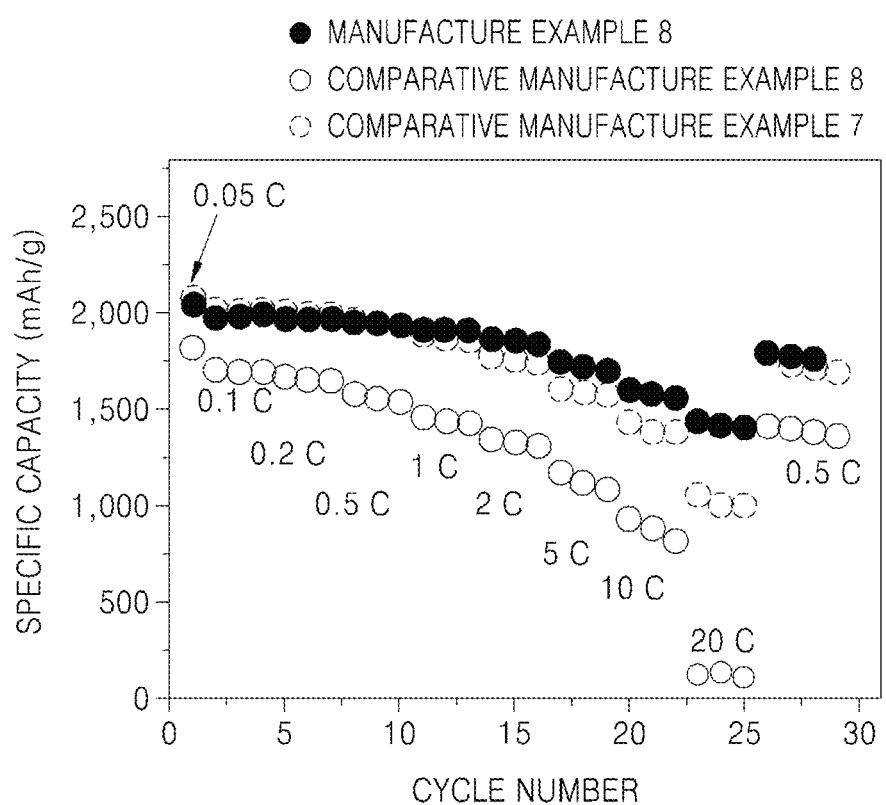
FIG. 4A is a graph of rate performance evaluation of coin cells prepared in Manufacturing Example 8 and Comparative Manufacturing Examples 7 and 8.

Rate capabilities of the coin cells prepared in Manufacturing Example 8 and Comparative Manufacturing Examples 7 and 8 were evaluated by charging/discharging the coin cells at a constant current of 0.1 C, 0.2 C, 0.5 C, 1 C, 2 C, 5 C, 10 C, or 20 C, respectively and the results are shown in FIG. 4A.

Referring to FIG. 4A, it may be known that rate performance of the coin cell prepared in Manufacturing Example 8 was significantly improved compared to those of the coin cells prepared in Comparative Manufacturing Examples 7 and 8.

This remarkable rate performance is attributed to the uniform distribution of the graphene layers over the entire electrode film facilitating efficient electron transport and Li ion diffusion (2) Battery Lifespan 1) Manufacturing Example 1 and Comparative Manufacturing Example 1 and 2

Figure 5:
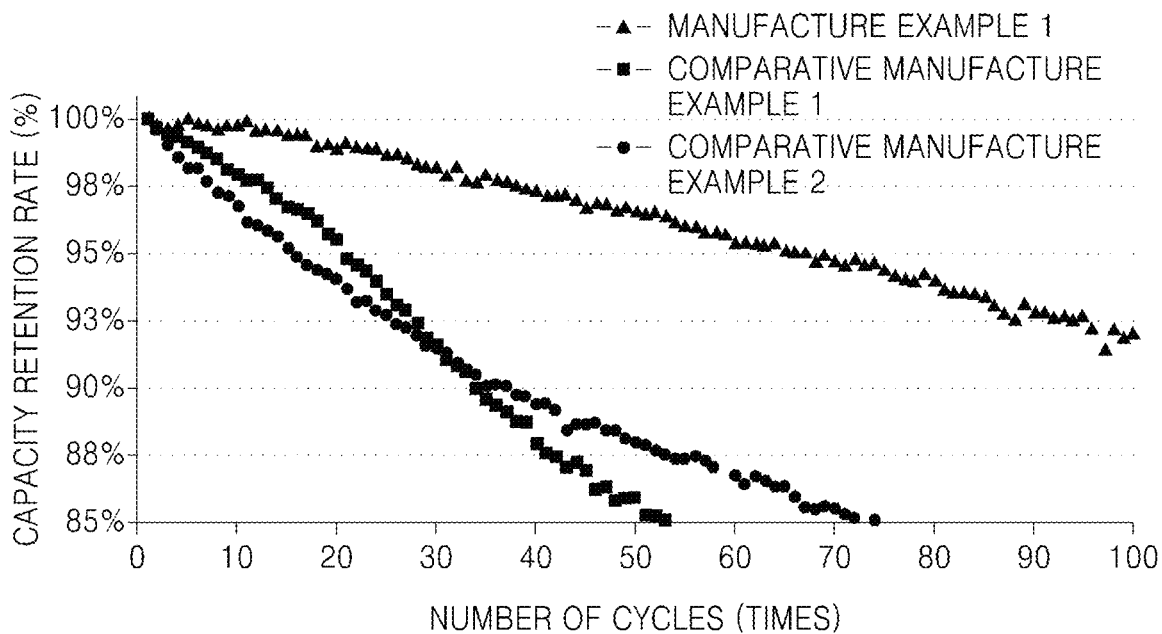
FIG. 5 is a graph of capacity retention rate (percent, %) versus number of cycles which shows a change in capacity in coin cells prepared in Manufacturing Example 1 and Comparative Manufacturing Examples 1 and 2.

Capacity change according to increase in the number of cycles with respect to the coin cells prepared in Manufacturing Example 1 and Comparative Manufacturing Example 1 and 2 was observed, and the results are shown in FIG. 5.

Referring to FIG. 5, it was confirmed that life characteristics of the coin cell prepared in Manufacturing Example 1 improved compared to those of the coin cells prepared in Comparative Manufacturing Examples 1 and 2.

Also, in order to measure cycle lifespans of the coin cells prepared in Manufacturing Example 1 and Comparative Manufacturing Example 1 and 2, the coin cells were charged at a current of 0.5 C and discharged at a current of 0.05 C, and the results are shown in Table 3. Also, discharge capacity retention rates according to the cycle repetition in the coin cells including the negative electrodes prepared in Manufacturing Example 1 and Comparative Manufacturing Example 1 and 2 were measured. The number of cycles at which capacity for each of the coin cells reduced to 92% of the initial capacity was measured, and the results are shown in Table 3.

TABLE 3

|  | The number of cycles |
| --- | --- |
| Manufacturing Example 1 | 100 |
| Comparative Manufacturing Example 1 | 34 |
| Comparative Manufacturing Example 2 | 28 |

Referring to Table 3, it was confirmed a discharge capacity retention rate and a lifespan of the coin cell prepared in Manufacturing Example 1 improved compared to those of the coin cells prepared in Comparative Manufacturing Examples 1 and 2.

3) Manufacturing Example 1-5, Comparative Manufacturing Example 1 and 3, and Reference Manufacturing Example 1

Figure 6:
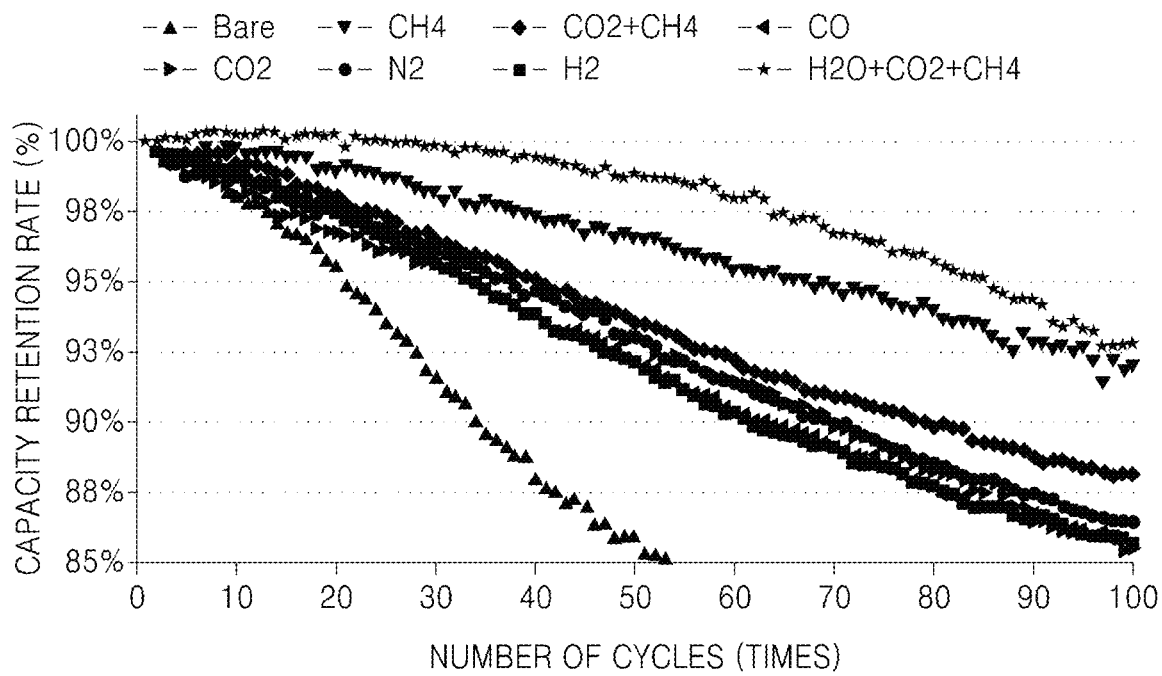
FIG. 6 is a graph of capacity retention rate (percent, %) versus number of cycles which shows change in capacity in coin cells prepared in Manufacturing Examples 1 to 5, Comparative Manufacturing Examples 1 and 3, and Reference Manufacturing Example 1.

Change in capacity according to an increase in the number of cycles of the coin cells prepared in Manufacturing Example 1-5, Comparative Manufacturing Example 1 and 3, and Reference Manufacturing Example 1 was observed, and the results are shown in FIG. 6.

Referring to FIG. 6, lifespan of the coin cells prepared in Manufacturing Examples 1 to 5 was improved compared to the coin cells prepared in Comparative Manufacturing Example 1 and Comparative Manufacturing Example 3.

Also, in order to observe lifespan of the coin cells prepared in Manufacturing Example 1 to 5, Comparative Manufacturing Example 1 and 3, and Reference Manufacturing Example 1, the coin cells were charged at a current of 0.5 C and discharged at a current of 0.05 C, and the results are shown in Table 4. Also, discharge retention rates according to 100 cycle repetition of the coin cells including the negative electrodes prepared in Manufacturing Example 1 to 5, Comparative Manufacturing Example 1 and 3, and Reference Manufacturing Example 1 were measured. The number of cycle when the initial lifespan is reduced to 92% was measured and shown in FIG. 6. In FIG. 6, "Bare" are results for Comparative Manufacturing Example 1, CH4 are results for Manufacturing Example 1, CO2+CH4 are results for Manufacturing Example 2, H2O+CO2+CH4 are results for Manufacturing Example 3, CO are results for Manufacturing Example 4, CO2 are results for Manufacturing Example 5, N2 are results for Reference Manufacture Example 1, and H2 are results for Comparative Manufacturing Example 3.

TABLE 4

|  | Discharge capacity retention rate (%) |
| --- | --- |
| Manufacturing Example 1 | 92 |
| Manufacturing Example 2 | 88.1 |
| Manufacturing Example 3 | 92.8 |
| Manufacturing Example 4 | 85.6 |
| Manufacturing Example 5 | 85.4 |
| Comparative Manufacturing Example 1 | 85 (52 cycles) |
| Comparative Manufacturing Example 3 | 85.3 |
| Reference Manufacture Example 1 | 86.4 |

Referring to Table 4, it was confirmed that the discharge capacity retention rates of the coin cells prepared in Manufacturing Examples 1 to 5 were improved compared to those of the coin cells prepared in Comparative Manufacturing Examples 1 and 3.

4) Manufacturing Examples 8 and 9 and Comparative Manufacturing Example 4

Charge/discharge characteristics evaluation was performed on the coin cells prepared in Manufacturing Examples 8 and 9 and Comparative Manufacturing Example 4.

Charge/discharge characteristics evaluation was performed on coin cells charged to 0.001 V and discharged to 1.5 V, and the charge/discharge cycle was repeated 120 times. The charging/discharging conditions were at the first cycle, the second cycle, the third cycle, and the fourth cycle, to the 120th cycle as follows.

(1) $1^{st}$ Cycle Discharge: 0.05 C, CC/CV, 0.01 V, 0.02 C/Charge: 0.05 C, CC, 1.5 V (2) $2^{nd}$ Cycle Discharge: 0.1 C, CC/CV, 0.01 V, 0.05 C/Charge: 0.1 C, CC, 1.0V (3) $3^{rd}$ Cycle Discharge: 0.2 C, CC/CV, 0.01 V, 0.05 C/Charge: 0.2, CC, 1.0 V (4) $4^{th}$ to $120^{th}$ Cycle Discharge: 0.5 C, CC/CV, 0.01 V, 0.05 C/Charge: 0.5, CC, 1.0 V

TABLE 5

| | 1st Cycle | | | Rate | | 100th |
| --- | --- | --- | --- | --- | --- | --- |
| | Charge | Discharge | Initial efficiency | capability 0.5 C/0.05 C Unit | Coulombic efficiency | Cycle capacity |
| | mAh/g | mAh/g | (%) | % | % | % |
| Comparative Manufacturing Example 4 | 2341 | 1883 | 80.44 | 77.24 | 98.1 | 62 |
| Manufacturing Example 8 | 2096 | 1652 | 78.82 | 96.2 | 99.40 | 92 |
| Manufacturing Example 9 | 1409 | 1132 | 80.31 | 96.2 | 99.11 | 98 |

Referring to Table 5, capacities and initial efficiencies of the coin cells prepared in Manufacturing Examples 8 and 9 were reduced by a relatively small volume capacity of graphene compared to those of the coin cell prepared of Comparative Manufacturing Example 4, and a generation in the SEI layer is decreased, and thus durability was significantly improved due to an increase in a coulombic efficiency. Also, a rate capability was improved due to an increase in graphene conductivity. Durability of the coin cell prepared in Comparative Manufacturing Example 4 was significantly decreased.

5) Manufacturing Example 8 and Comparative Manufacturing Examples 7 and 8

Charge/discharge characteristics evaluation was performed on the coin cells prepared in Manufacturing Example 8 and Comparative Manufacturing Examples 7 and 8.

Charge/discharge characteristics evaluation was performed on coin cells charged to 0.001 V and discharged to 1.5 V, and the charge/discharge cycle was repeated 200 times. A current condition for the evaluation was controlled to be 50 mA per 1 g of a weight of the electrode.

Figure 6A:
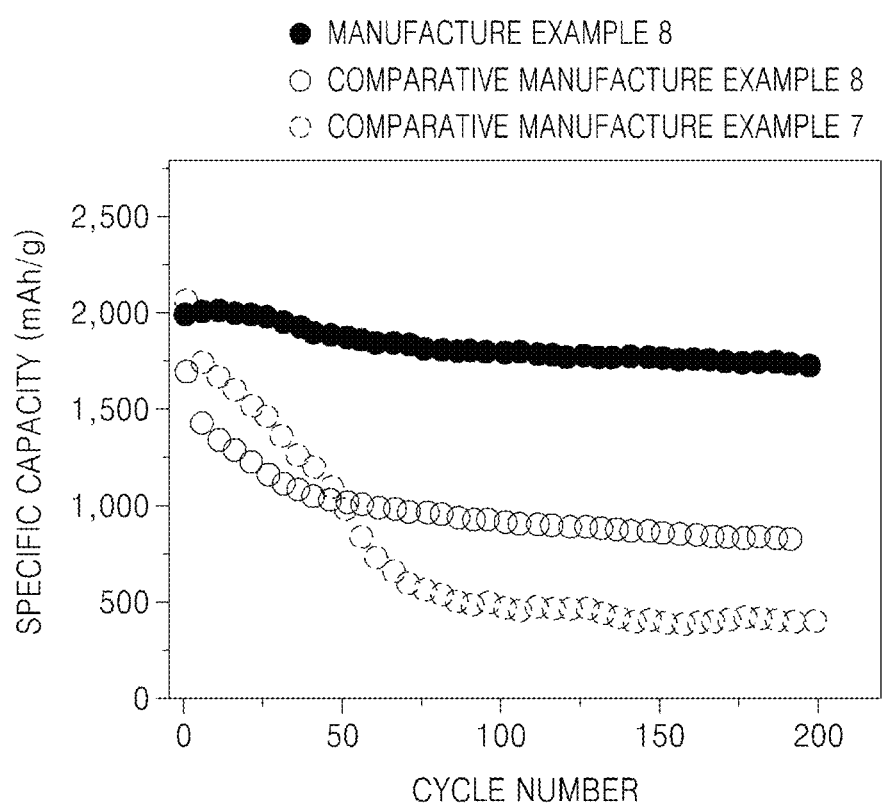
FIG. 6A is a graph showing charge and discharge characteristics of the coin cells prepared in Manufacturing Example 8 and Comparative Manufacturing Examples 7 and 8.

A discharge capacity difference according to the repeated cycles of charging/discharging in each of the coin cells prepared in Manufacturing Example 8 and Comparative Manufacturing Examples 7 and 8 was measured, and the results are shown in FIG. 6A.

Referring to FIG. 6A, it may be known that cycle lifespan of the coin cell prepared in Manufacturing Example 8 was significantly improved compared to those of the coin cells prepared in Comparative Manufacturing Examples 7 and 8.

Evaluation Example 2: Transmission Electron Microscopy (TEM) Analysis

1) Preparation Example 1, and Comparative Preparation Examples 1 and 2

Figure 7A:
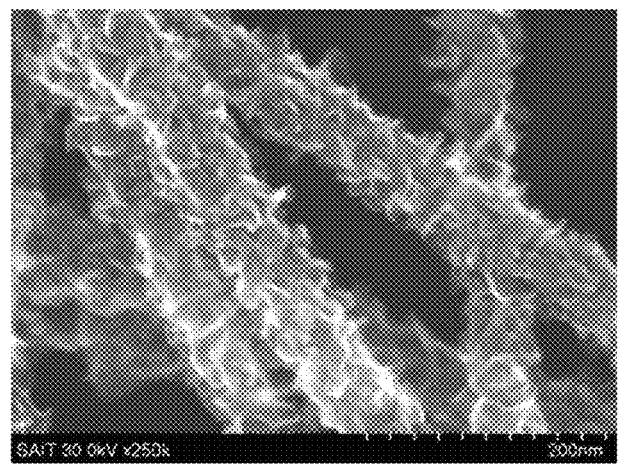
FIGS. 7A, 8A, and 9A show the results of transmission electron microscope (TEM) analysis performed on a composite prepared in Preparation Example 1 and materials prepared in Comparative Preparation Examples 1 and 2, respectively.
Figure 7B:
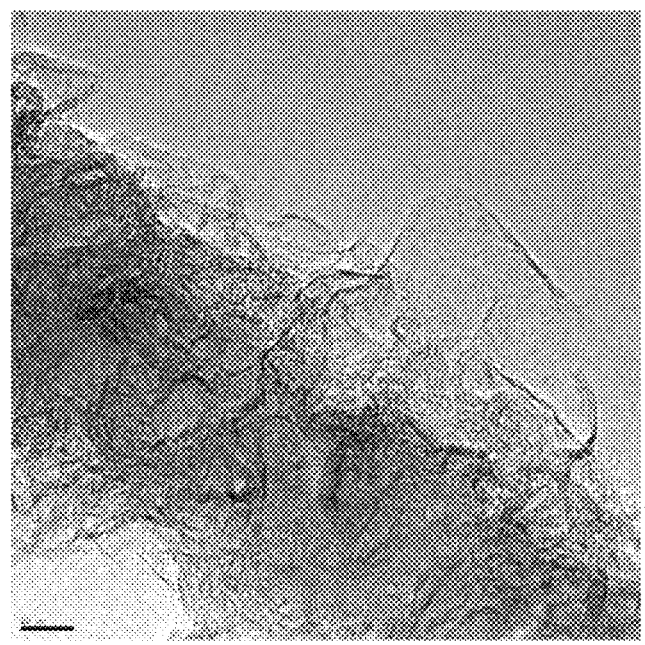
FIGS. 7B, 8B, and 9B are enlarged views of FIGS. 7A, 8A, and 9A, respectively.
Figure 8A:
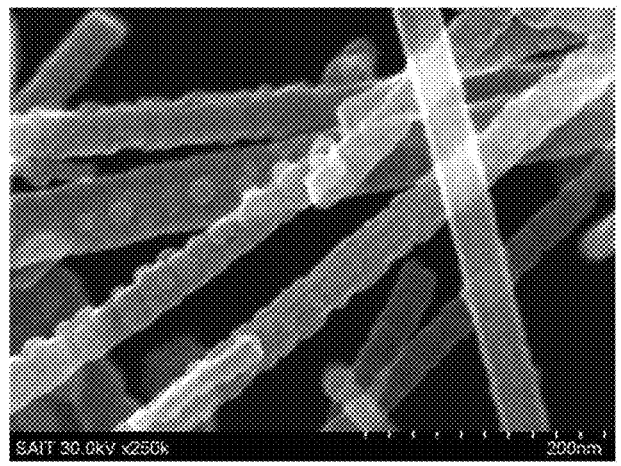
Figure 8B:
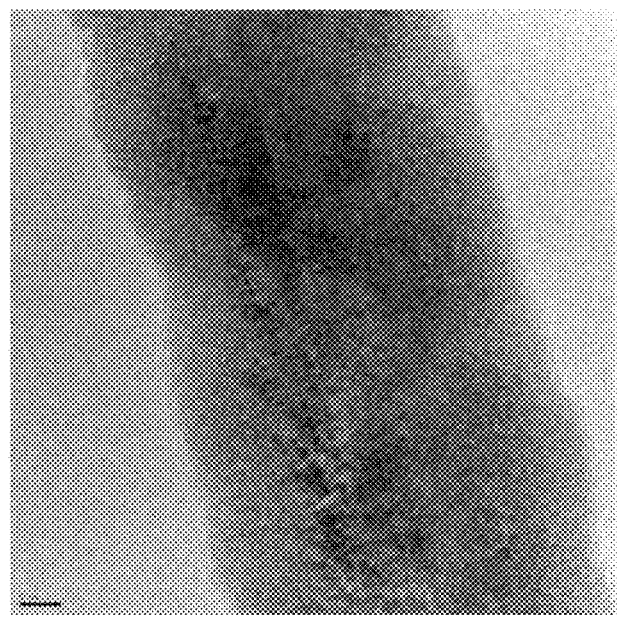
Figure 9A:
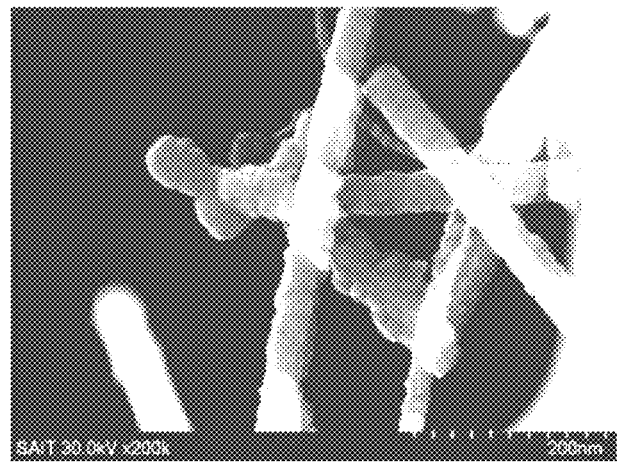
Figure 9B:
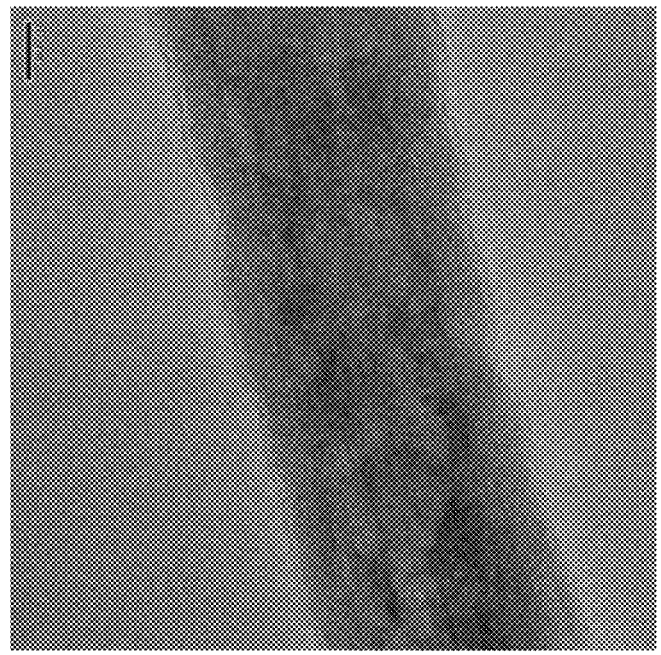

The composites prepared in Preparation Example 1 and the materials prepared in Comparative Preparation Examples 1 and 2 were analyzed by using a TEM, and the results are shown in FIGS. 7A, 7B, 8A, 8B, 9A, and 9B. FIGS. 7B, 8B, and 9B are images of FIGS. 7A, 8A, and 9A magnified at a higher resolution, respectively.

Titan cubed 60-300 (FEI) was used as an analyzer for the TEM analysis.

Referring to FIGS. 7A and 7B, it was confirmed that the composite of Preparation Example 1 has a structure of a graphene nanosheet grown on a top of silicon nanowires with a silicon oxide (SiOx) layer is formed thereon. In contrast, the composites prepared in Comparative Preparation Examples 1 and 2 did not have a graphene formed on a top of silicon nanowires shown in FIG. 8A, FIG. 8B and FIG. 9A, and FIG. 9B.

2) Preparation Examples 1 to 5, Comparative Preparation Examples 1 and 3, and Reference Example 1

The composites prepared in Preparation Examples 1 to 5, the materials prepared in Comparative Preparation Examples 1 and 3, and the material prepared in Reference Example 1 were analyzed by using the TEM, and the results are shown in FIGS. 7A and 7B. FIG. 10, FIGS. 12A to 17A and 17B. FIG. 11. FIGS. 12B to 17B are images of FIG. 10, FIGS. 12A to 17A magnified at a higher resolution, respectively.

Referring to FIGS. 7A and 7B, it was confirmed that the composite prepared in Preparation Example 1 has a structure of a graphene nanosheet grown on a top of silicon nanowires with a silicon oxide (SiOx) layer formed thereon.

Figure 10:
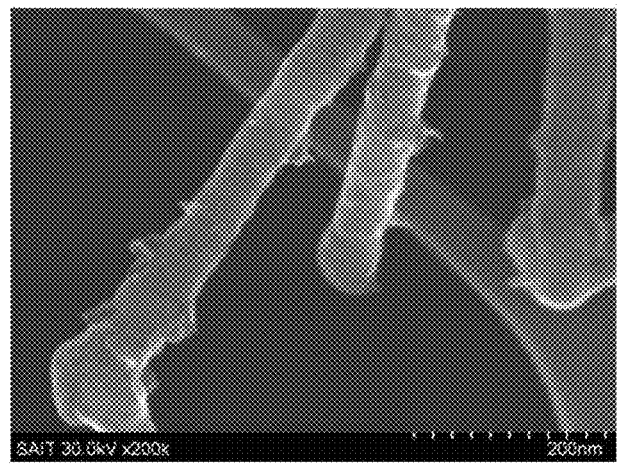
FIGS. 10 and 12A, 13A, 14A, 15A, 16A and 17A are images from TEM analysis of the composites prepared in Preparation Examples 2 to 5, the materials prepared in Comparative Preparation Examples 1 and 3, and a material prepared in Reference Example 1, respectively.
Figure 11:
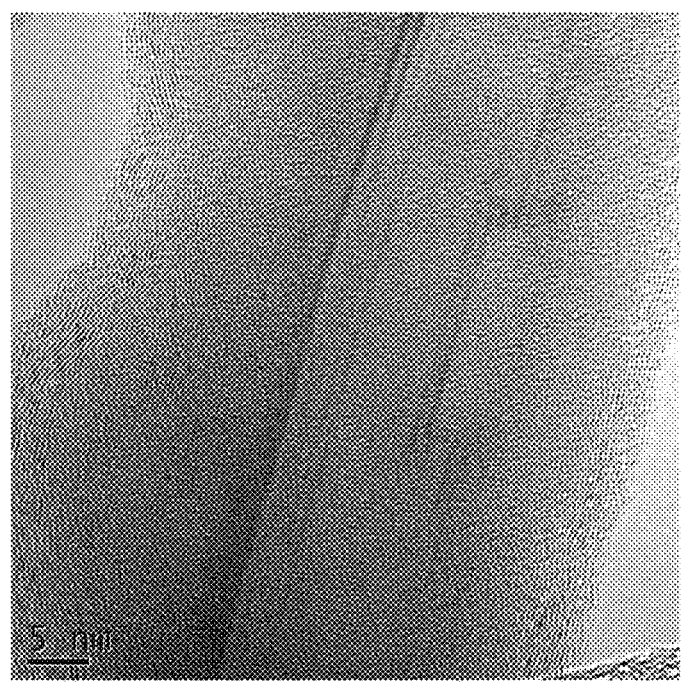
FIGS. 11 and 12B, 13B, 14B, 15B, 16B, and 17B are enlarged views of FIGS. 10 and 12A, 13A, 14A, 15A, 16A and 17A, respectively.
Figure 12A:
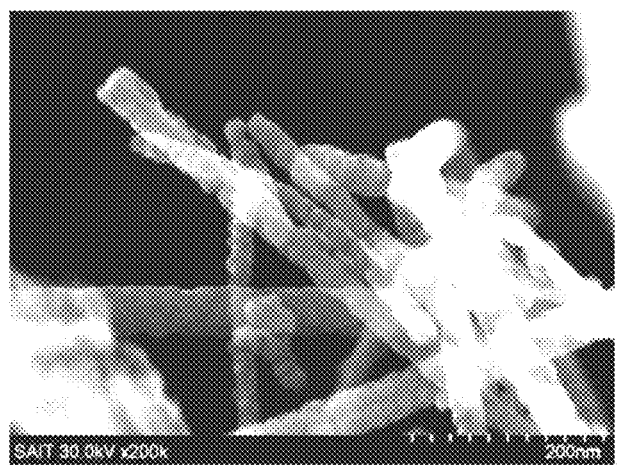
Figure 12B:
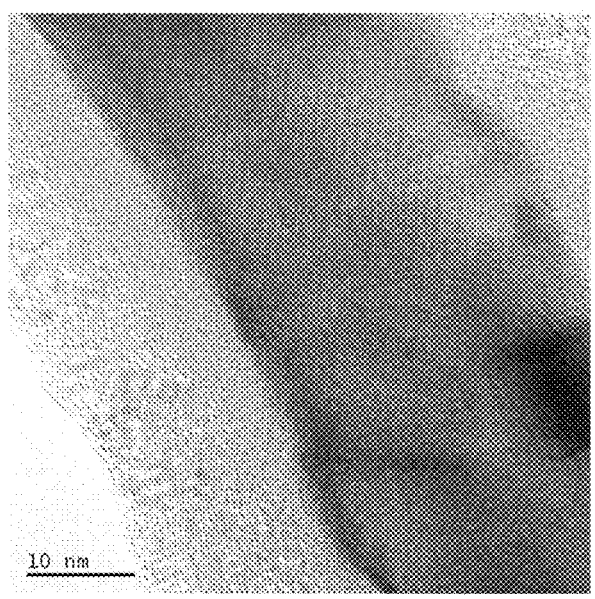
Figure 13A:
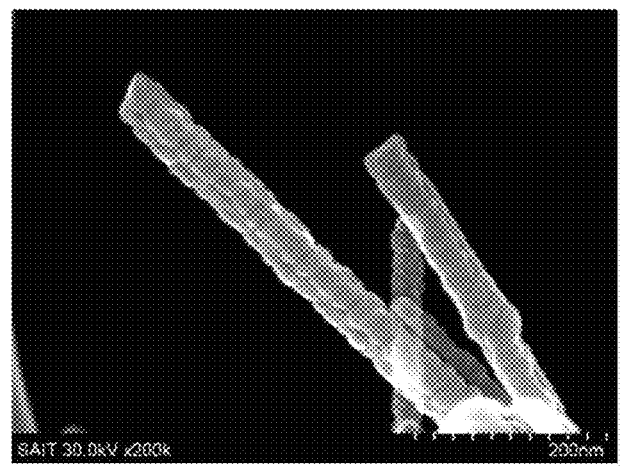
Figure 13B:
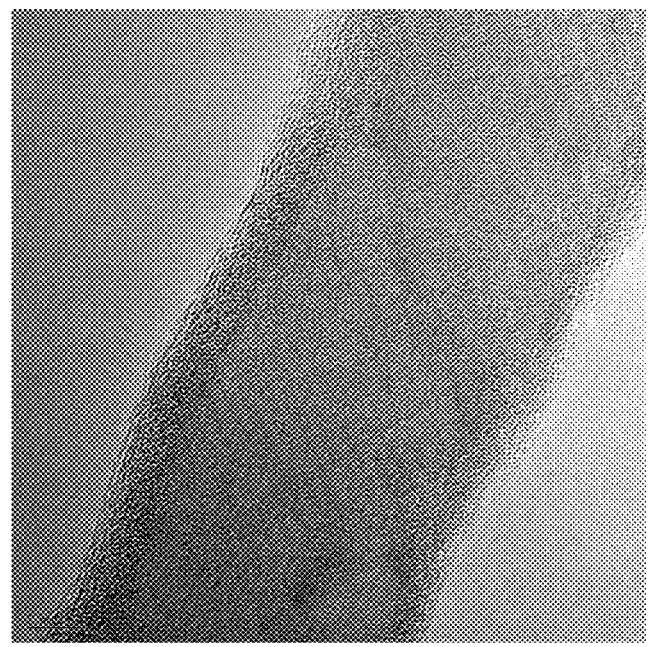

Referring to FIGS. 10 and 11, it was confirmed that the composite prepared in Preparation Example 2 has a structure of a graphene layer at a thickness of about 5 nm grown on a top of silicon nanowires with a silicon oxide (SiOx) layer formed thereon. Referring to FIGS. 12A and 12B, it was confirmed that the composite prepared in Preparation Example 3 has a structure of a graphene layer at a thickness of about 10 nm grown on a top of silicon nanowires with a silicon oxide (SiOx) layer formed thereon.

Referring to FIGS. 13A and 13B and FIGS. 17A and 17B, it was confirmed that the composite prepared in Preparation Example 4 and the material prepared in Reference Example 1 have a structure of an nonhomogeneous graphene (3 layers) grown on a top of silicon nanowires with a silicon oxide (SiOx) layer formed thereon.

Figure 14A:
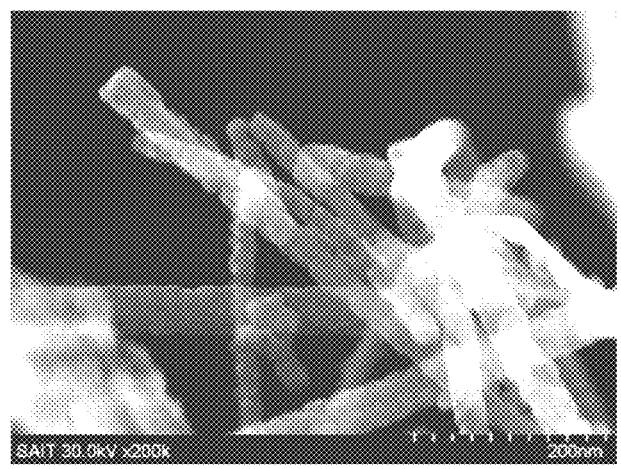
Figure 14B:
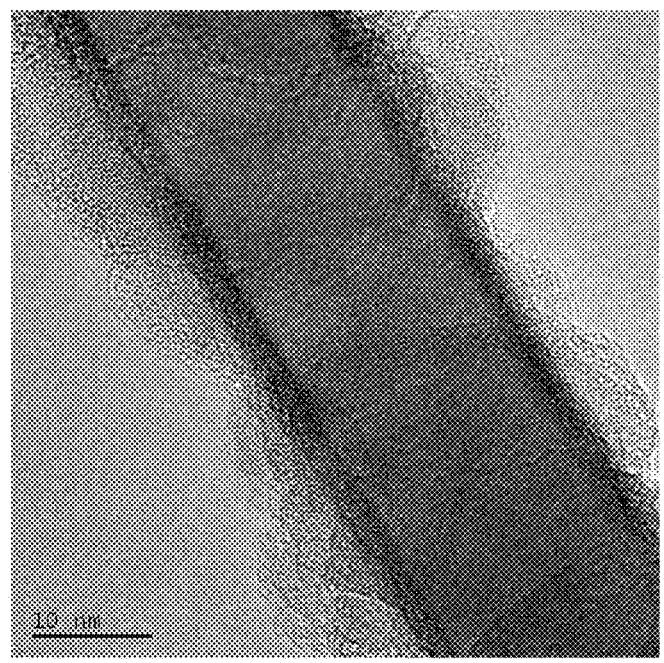

The composites prepared in Preparation Example 5 was analyzed by using a TEM, and the results are shown in FIGS. 14A and 14B.

Figure 15A:
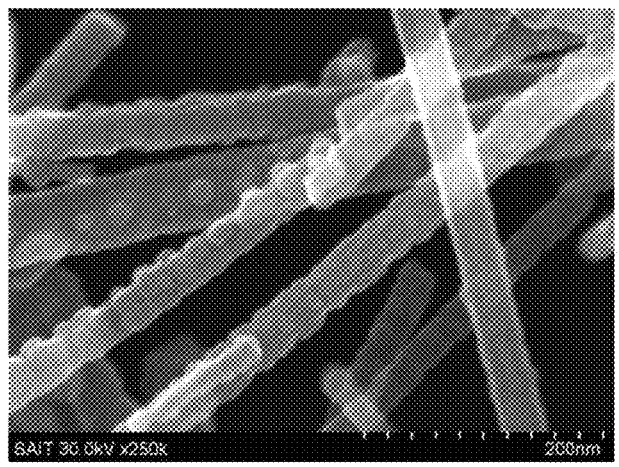
Figure 15B:
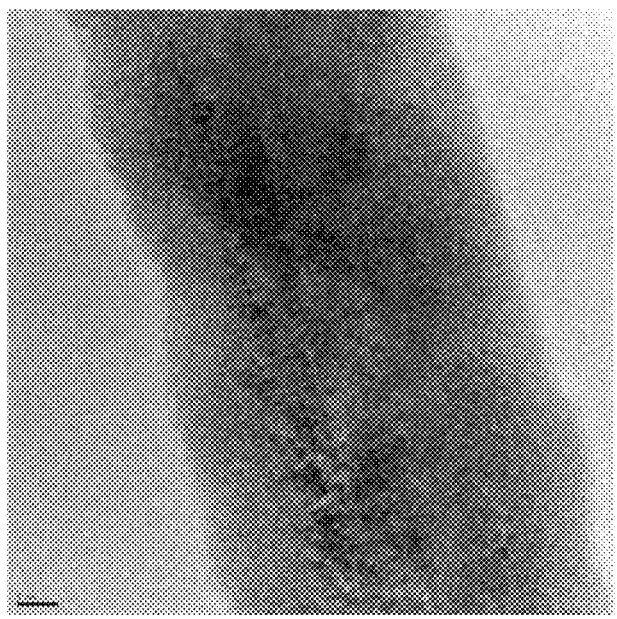
Figure 16A:
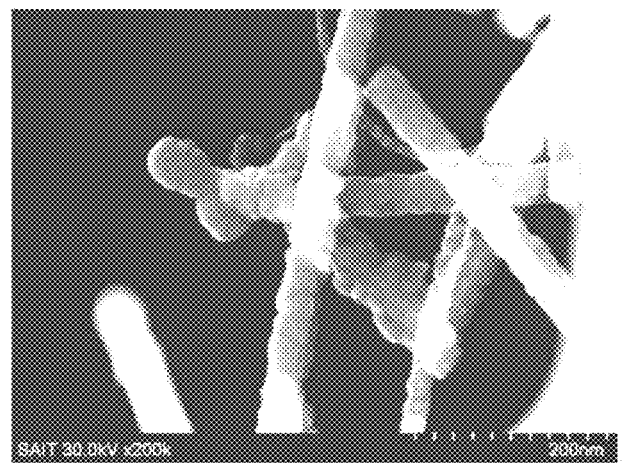
Figure 16B:
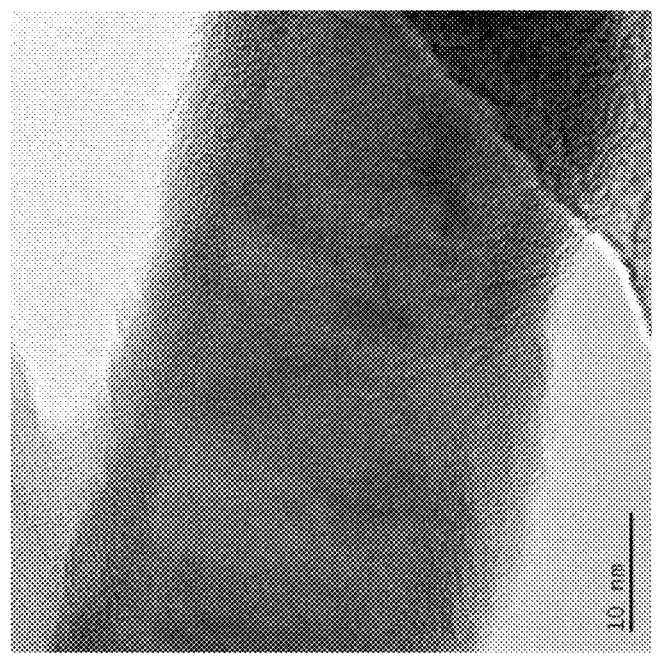
Figure 17A:
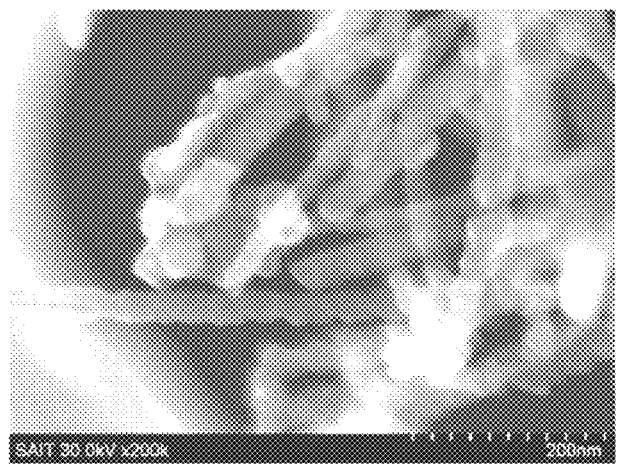
Figure 17B:
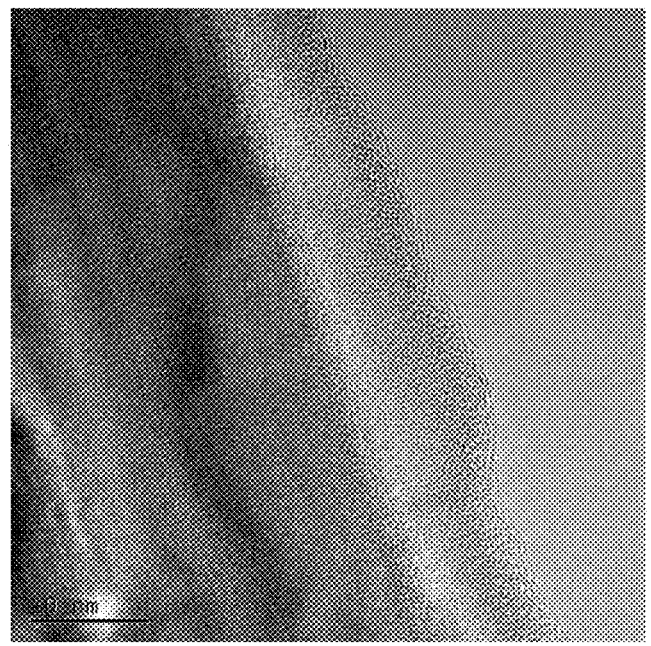

On the contrast, referring to FIGS. 15A and 15B, it was confirmed that the material prepared in Comparative Preparation Example 1 has a structure of only a silicon oxide (SiOx) present on a top of silicon nanowires. Also, referring to FIGS. 15A and 15B, it was confirmed that the material prepared in Comparative Preparation Example 3 only has silicon nanowires.

1) Thickness of Silicon Oxide Layer

A thickness of a silicon oxide (SiOx) layer, carbon source gas atmosphere, and a type of graphene formed thereon of the composites prepared in Preparation Examples 1 to 5 and a structure prepared in Comparative Preparation Examples 1 and 2 were measured by using a TEM, and the results are shown in Table 6.

TABLE 6

| | Thickness of a silicon oxide (SiOx) layer (nm) | Gas atmosphere | Type of graphene |
|---|---|---|---|
| Preparation Example 1 | 0.1 | $CH_4 + N_2$ | Graphene nanosheet |
| Preparation Example 2 | 2 | $CO_2 + CH_4$ | Graphene layer (5 nm) |
| Preparation Example 3 | 5 | $H_2O + CO_2 + CH_4$ | Graphene layer (10 nm) |
| Preparation Example 4 | 0.1 | CO | nonhomogenous graphene (1 to 2 nm) |
| Preparation Example 5 | 3-5 | $CO_2$ | — |
| Comparative Preparation Example 1 | — | — | — |
| Comparative Preparation Example 2 | — | $CH_4:H_2$ | —(SiC is present) |

4) Preparation Example 8

The composite prepared in Preparation Example 8 was analyzed by using a TEM, and the results are shown in FIGS. 8C through 8F.

Titan cubed 60-300 (available from FEI, equipped with double Cs correctors and Gatan Quantum 965) was used as an analyzer for the TEM analysis.

Figure 8C:
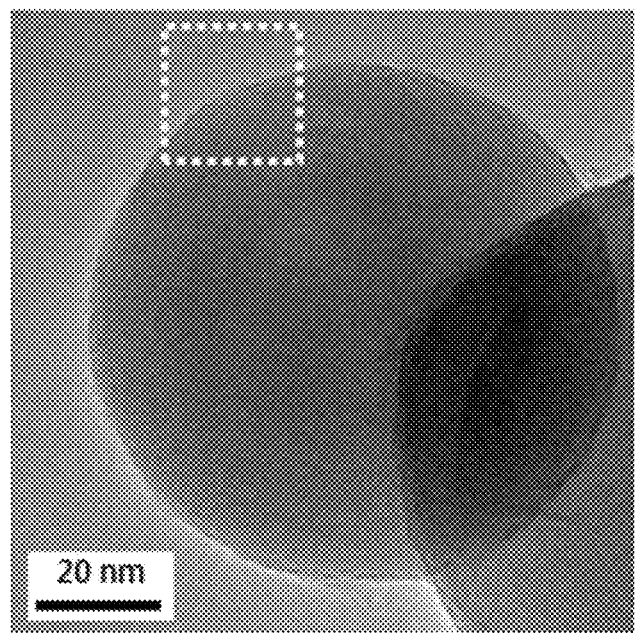
FIGS. 8C to 8E show the results of transmission electron microscope analysis of a composite prepared in Preparation Example 8.
Figure 8D:
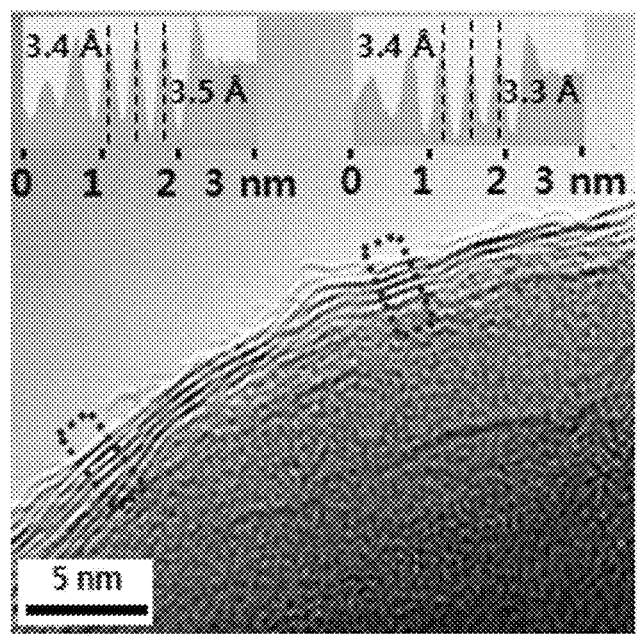

FIG. 8D is an enlarged view of a region in a white-dotted square in FIG. 8C. Referring to FIGS. 8C and 8D, it may be confirmed that graphene nanosheet is formed on a silicon oxide layer.

Figure 8E:
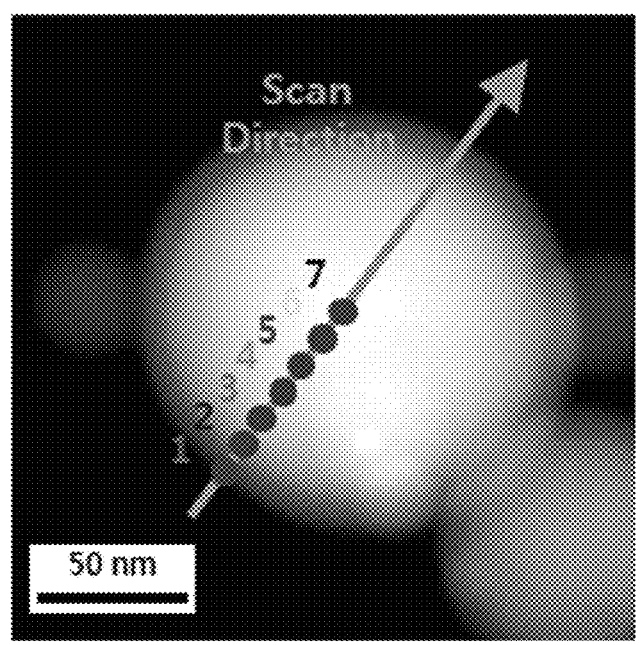
Figure 8F:
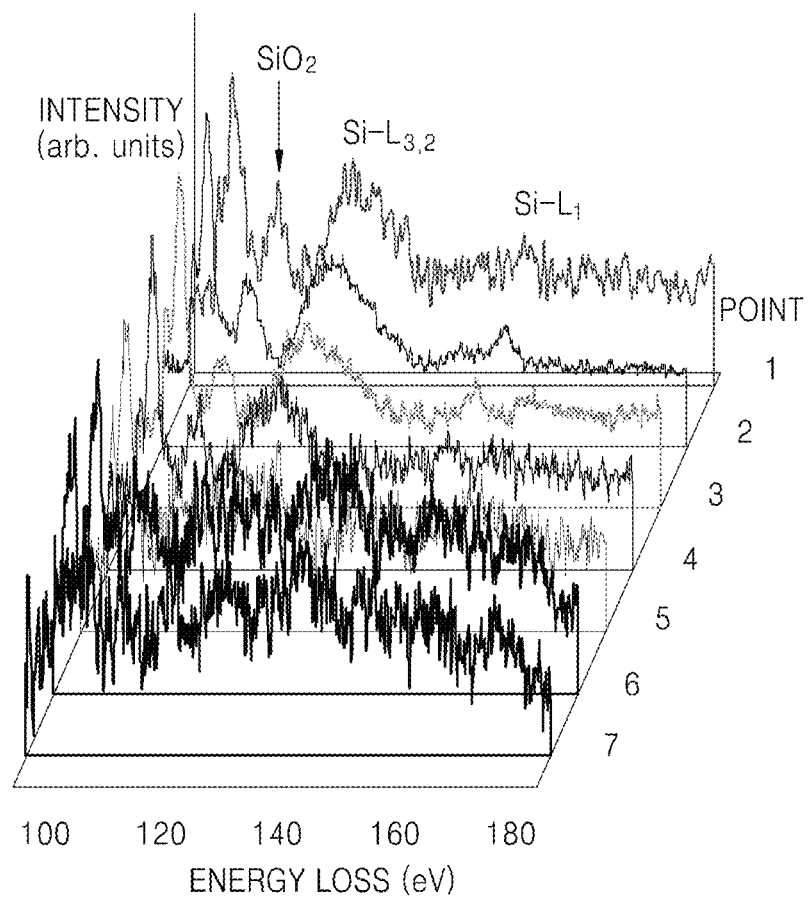
FIG. 8F is an electron energy loss spectroscopy (EELS) spectra of the composite of FIG. 8E.

FIG. 8E shows the result of analysis performed on the composite prepared in Manufacturing Example 8 by using a scanning transmission electron microscopy (STEM) analysis in a scanning manner. Also, FIG. 8F is an electron energy loss spectroscopy (EELS) spectra of the composite of FIG. 8E. From the EELS spectra, EELS line scans across the particles confirmed the presence of an oxide through an intermediate peak signature in the O1s edge at 108 eV, and intensity of the peak related to the oxide diminished toward the center of the particles.

Referring to FIGS. 8D and 8E, it may be confirmed that the composite prepared in Preparation Example 8 does not include SiC.

Evaluation Example 3: X-Ray Photoelectron Spectroscopy (XPS) Analysis

1) Preparation Example 1 and Comparative Preparation Examples 1 and 2

Figure 18A:
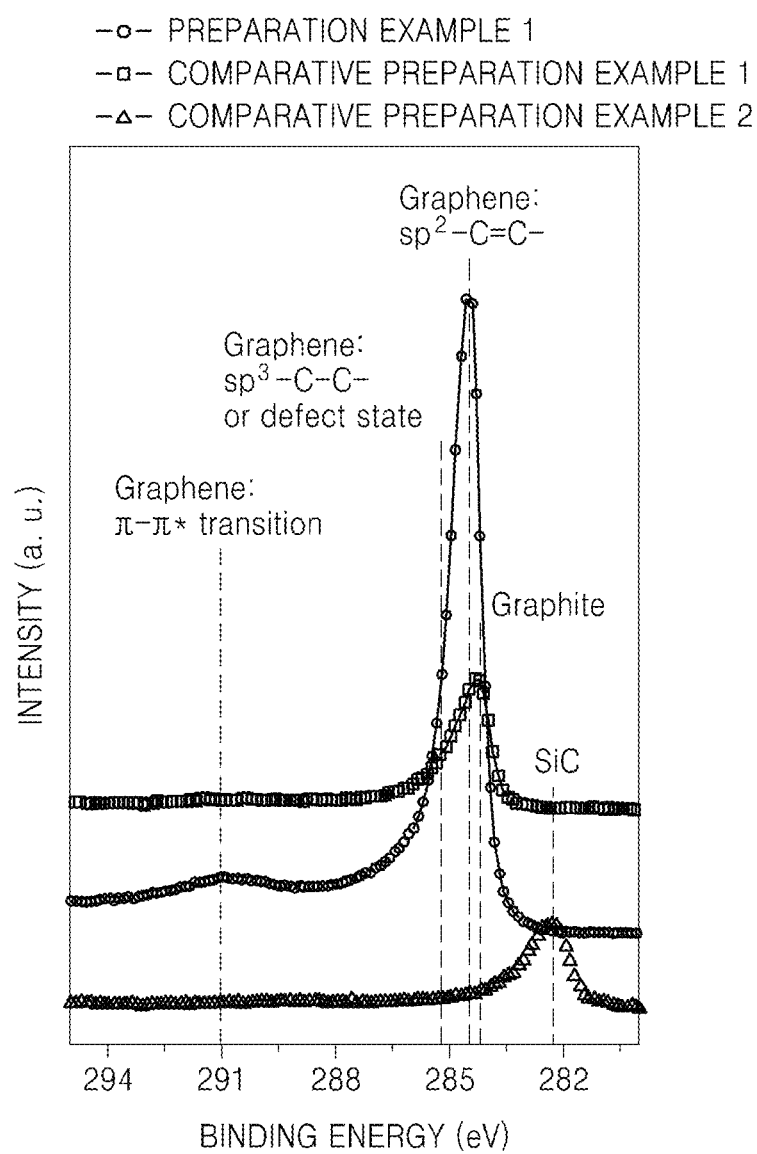
FIGS. 18A to 18C are graphs of intensity (arbitrary units, a.u.) versus binding energy (electron volts, eV) illustrating the results of X-ray photoelectron spectroscopy (XPS) analysis performed on the composite prepared in Preparation Example 1 and the materials prepared in Comparative Preparation Examples 1 and 2, respectively.
Figure 18B:
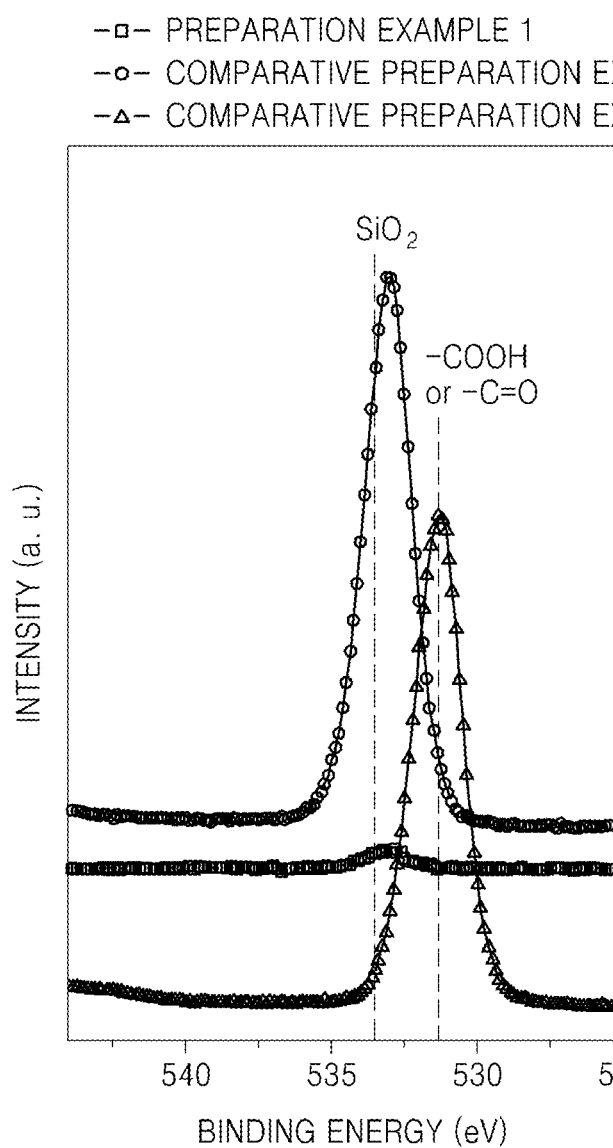
Figure 18C:
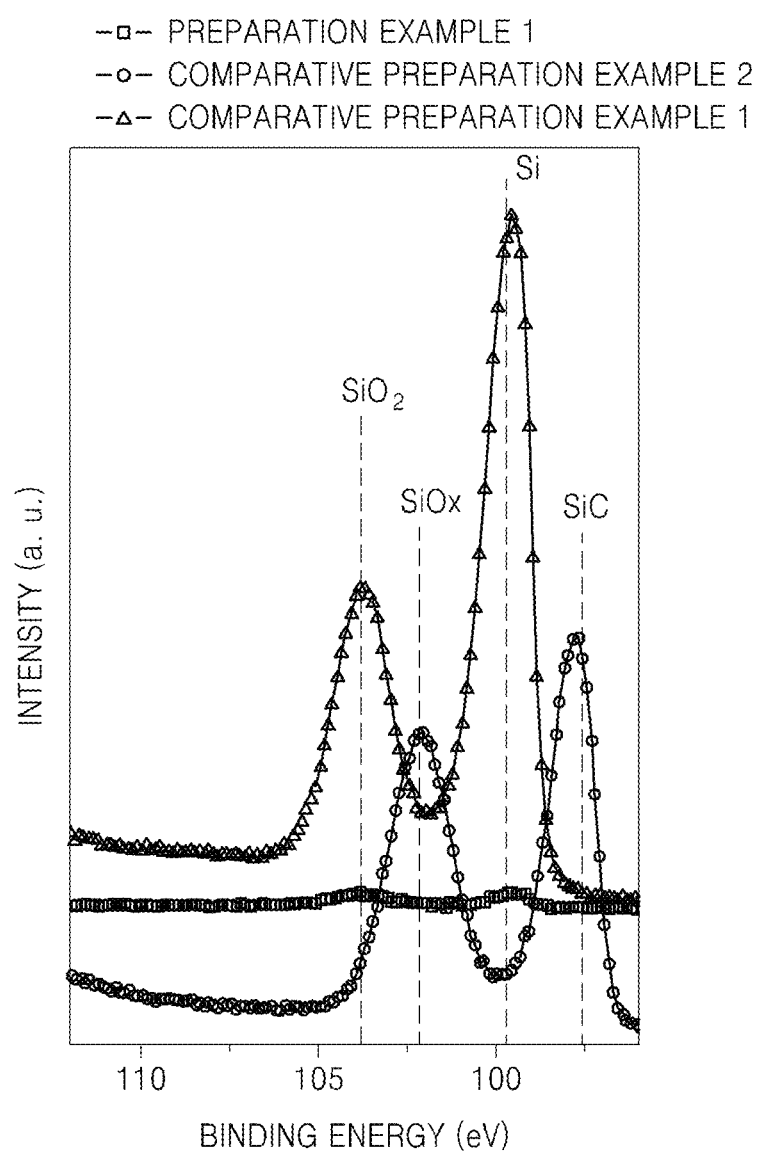

XPS tests were performed on the composite prepared in Preparation Example 1 and the materials prepared in Comparative Preparation Examples 1 and 2 by using a Quantum 2000 instrument (Physical Electronics). The XPS results of Preparation Example 1 and Comparative Preparation Examples 1 and 2 are shown in FIGS. 18A to 18C. FIG. 18A is a C1s spectrum, FIG. 18B is an O1s spectrum, and FIG. 18C is a Si2p spectrum.

XPS analysis was performed by using a Quantum 2000 (Physical Electronics. Inc.) at an acceleration voltage of 0.5 keV to 15 keV, 300 W, an energy resolution at about 1.0 eV, a minimum analysis area of 10 micrometers, and a sputter rate of 0.1 nm/min.

The results of XPS spectrum compositional analysis of the composite prepared in Preparation Example 1 and the materials prepared in Comparative Preparation Examples 1 and 2 are shown in Table 7.

TABLE 7

| | Atom % (at %) | | | |
|---|---|---|---|---|
| | C1s | O1s | Si2p | C1s/Si2p |
| Preparation Example 1 | 97.47 | 1.27 | 1.26 | 77.36 |
| Comparative Preparation Example 1 | 22.21 | 39.64 | 38.64 | 0.58 |
| Comparative Preparation Example 2 | 21.11 | 43.79 | 35.11 | 0.60 |

From the results of Table 7, the composite of Preparation Example 1 showed significant graphene characteristics at the C1s peak, and integrals of Si2p and O1s peaks informing a Si surface were low since the entire Si surface of the composite was coated with graphene.

Also, Si of the material according to the Preparation Example 2 obtained using a graphene grown by a CVD method was changed to SiC, and thus the Si surface was not coated with graphene. However, it may be confirmed that a natural oxide layer and $SiO_2$ were present on the Si surface of Comparative Preparation Example 1 (Bare sample). A SiOx layer may be maintained on the Si surface by growing graphene directly on the natural oxide layer present on the Si surface or by providing both an oxygen-containing gas and CH4 for forming a silicon oxide layer when forming graphene, and thus formation of SiC may be prevented and the graphene may be controlled by using a principle of forming graphene.

1) Preparation Examples 1 to 4, Preparation Examples 6 and 7, and Comparative Preparation Example 1

Figure 19A:
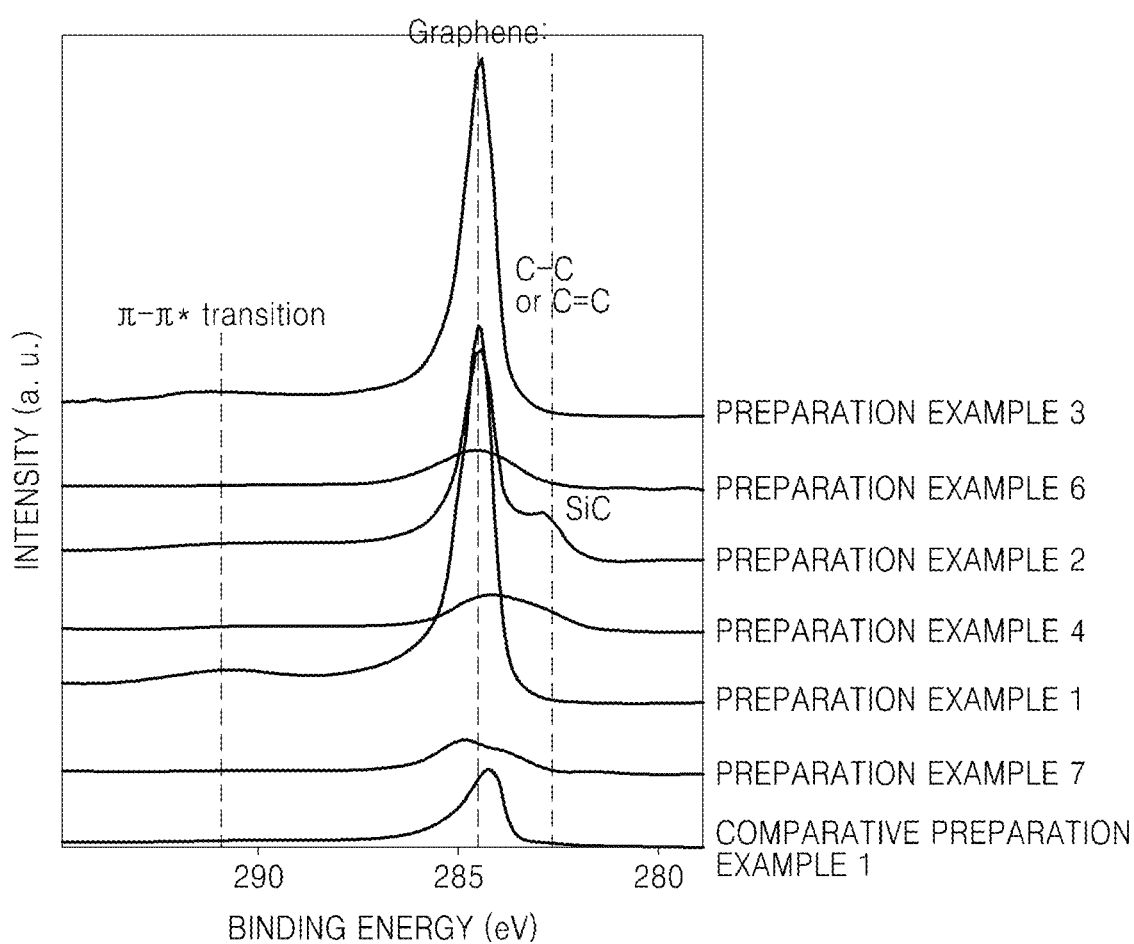
FIGS. 19A to 19C are graphs of intensity (arbitrary units, a.u.) versus binding energy (electron volts, eV) which illustrate the results of XPS analysis performed on the composites prepared in Preparation Examples 1 to 4, the materials prepared in Preparation Examples 6 and 7, and a material prepared in Comparative Preparation Example 1, respectively.
Figure 19B:
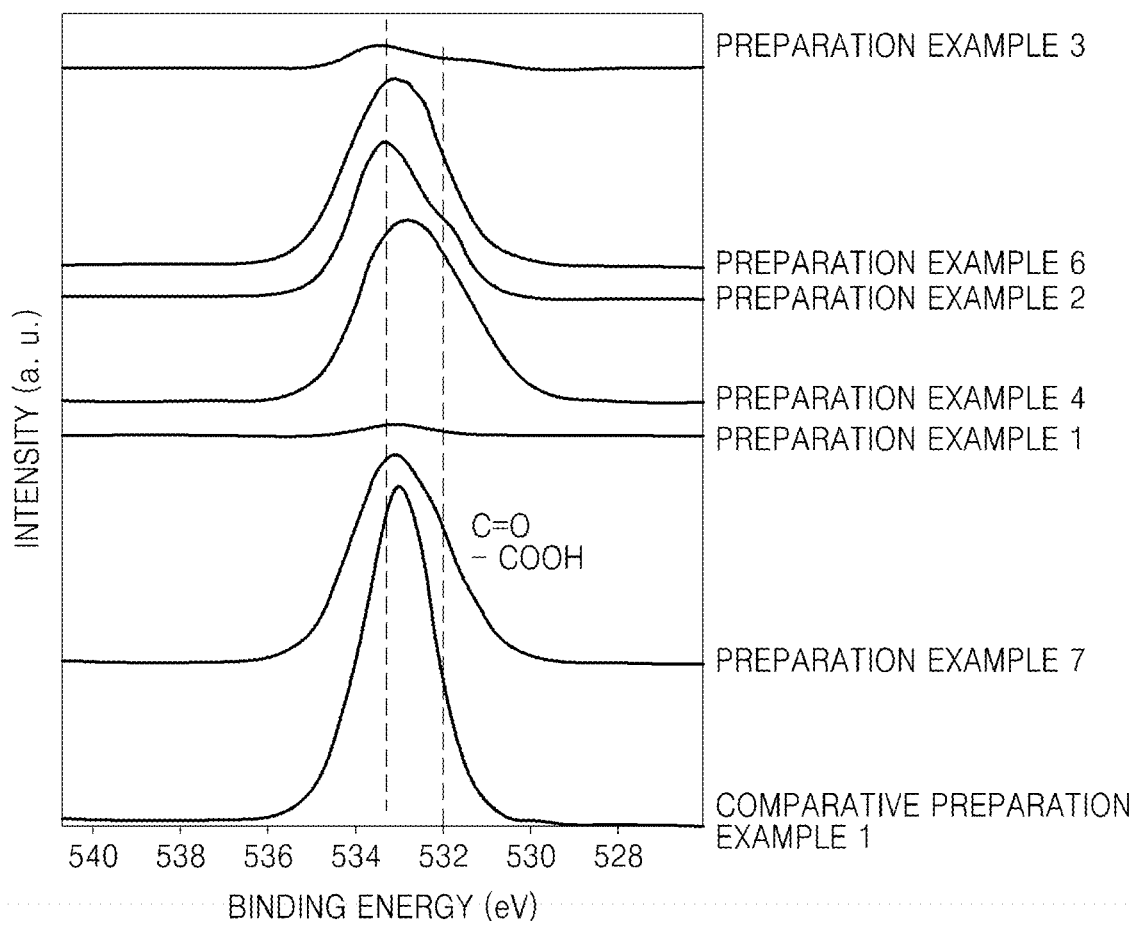
Figure 19C:
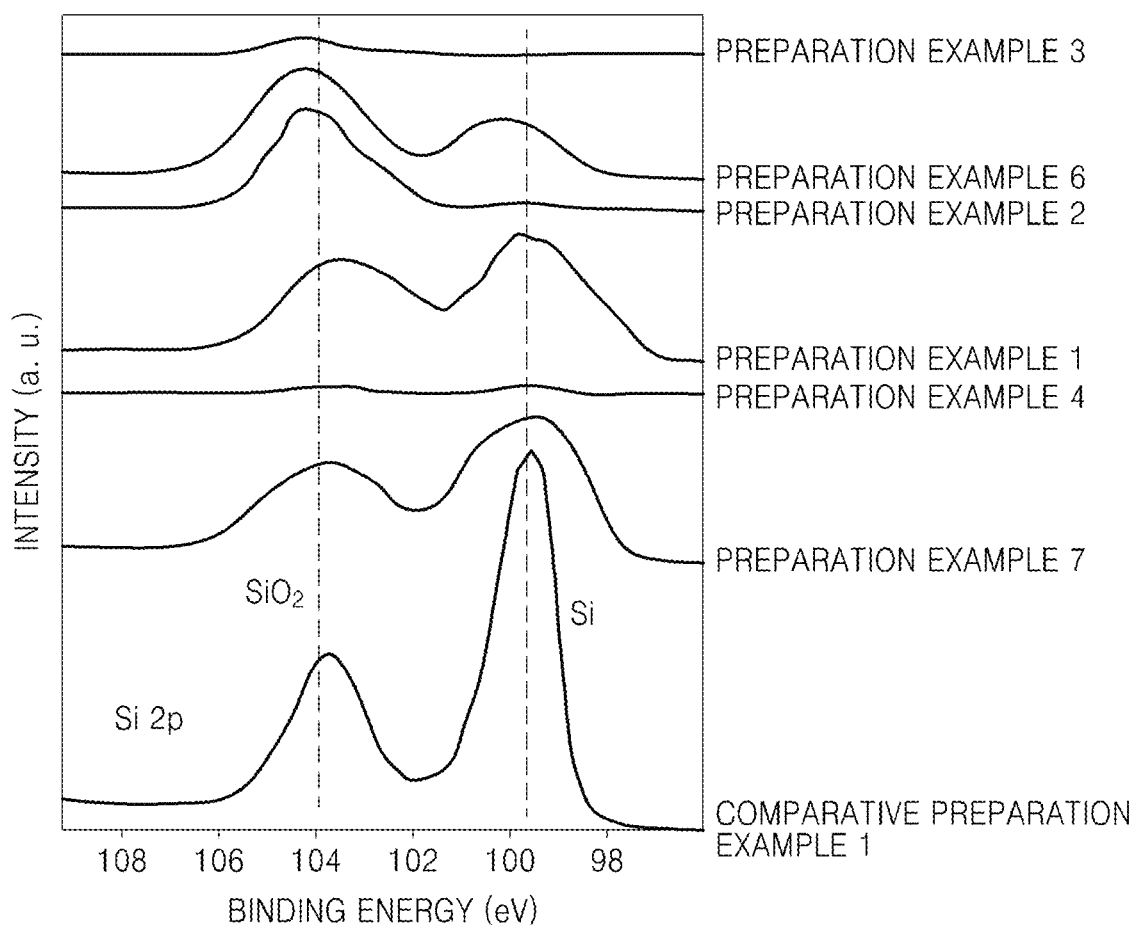

XPS tests were performed on the composites prepared in Preparation Examples 1 to 4, the materials prepared in Preparation Examples 7 and 8, and the material prepared in Comparative Preparation Example 1 by using the Quantum 2000 (Physical Electronics). The XPS results are shown in FIGS. 19A to 19C. FIG. 19A is a C1s spectrum, FIG. 19B is an O1s spectrum, and FIG. 19C is a Si2p spectrum.

Referring to FIGS. 19A to 19C, it was confirmed that the composites prepared in Preparation Examples 1 to 4, 6, and 7 had a silicon oxide (SiOx) layer formed on a top of silicon nanowires and a structure having a silicon oxide (SiOx) layer formed on the silicon nanowires due to supply of oxide layer reinforcing gas and a SiC layer and graphene formed thereon.

Evaluation Example 4: Transmission Electron Microscopy-Electron Microscopy-Energy Dispersive X-Ray (TEM-EDAX) Analysis 1) Preparation Example 1 and Comparative Preparation Examples 1 and 2

TEM-EDAX analyses were performed on the composite prepared in Preparation Example 1 and the materials prepared in Comparative Preparation Examples 1 and 2. Here, a FEI Titan 80-300 (Philips) was used to perform the TEM-EDAX analyses.

The analyses results are shown in FIGS. 20A and 20B to 22A and 22B.

Figure 20A:
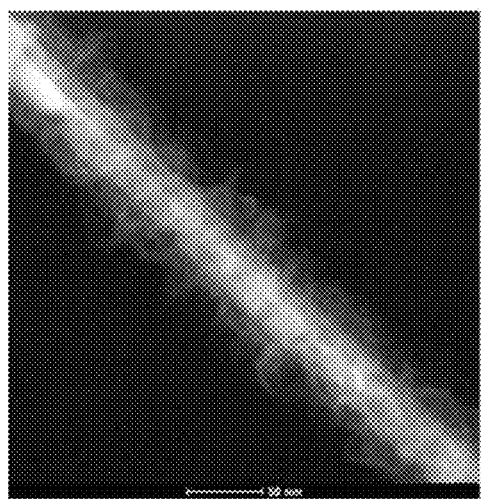
Figure 20B:
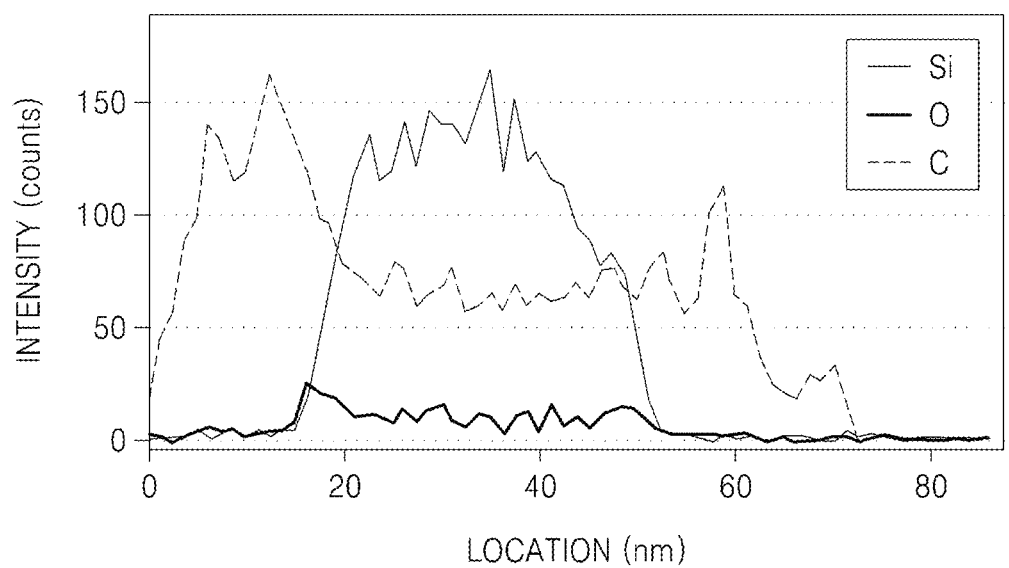
Figure 21A:
Figure 21B:
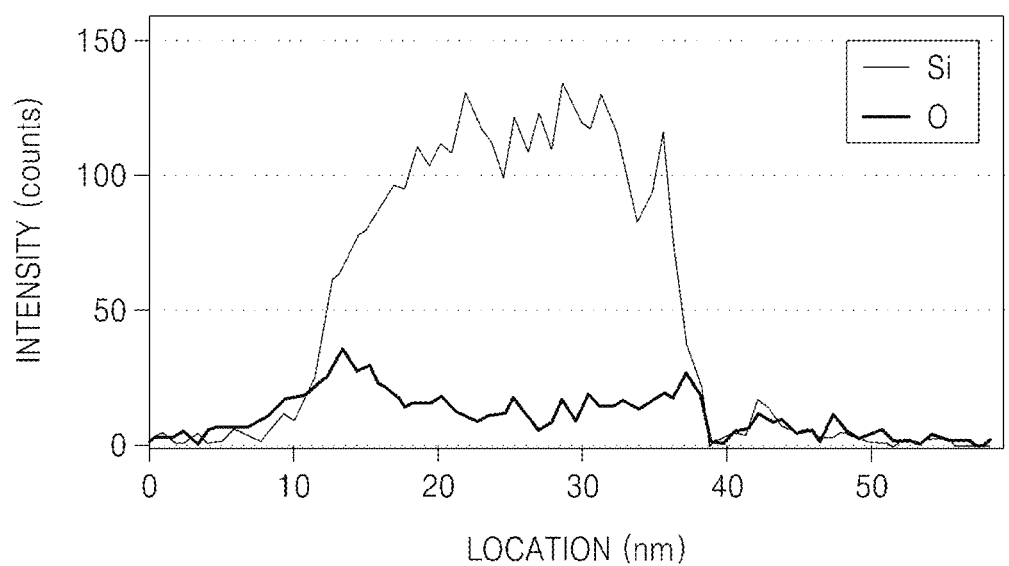
Figure 22A:
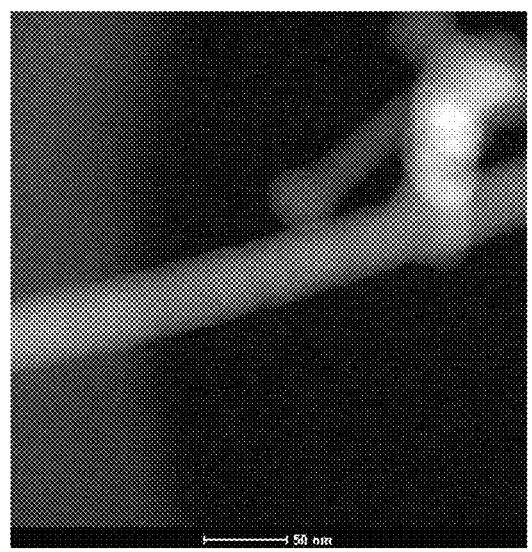
Figure 22B:
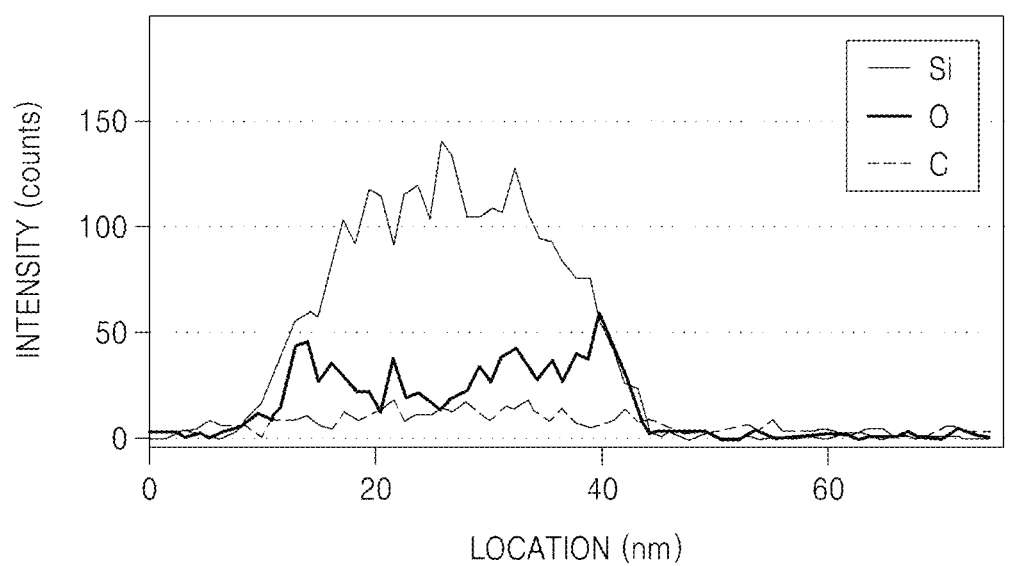

FIGS. 20A and 20B showed the TEM-EDAX analysis result of the composite prepared in Preparation Example 1, FIGS. 21A and 21B showed the TEM-EDAX analysis result of the material prepared in Comparative Preparation Example 1, and FIGS. 22A and 22B showed the TEM-EDAX analysis result of the material prepared in Comparative Preparation Example 2.

Evaluation Example 5: Thermogravimetric Analysis

Thermogravimetric analyses were performed on the composites prepared in Preparation Examples 1 to 3. TA (SDT: TGA+DSC) 2010 TGA/DSC1 (METTLER TOLEDO) was used to perform the thermogravimetric analyses within a temperature range of room temperature to 1600° C.).

Figure 23:
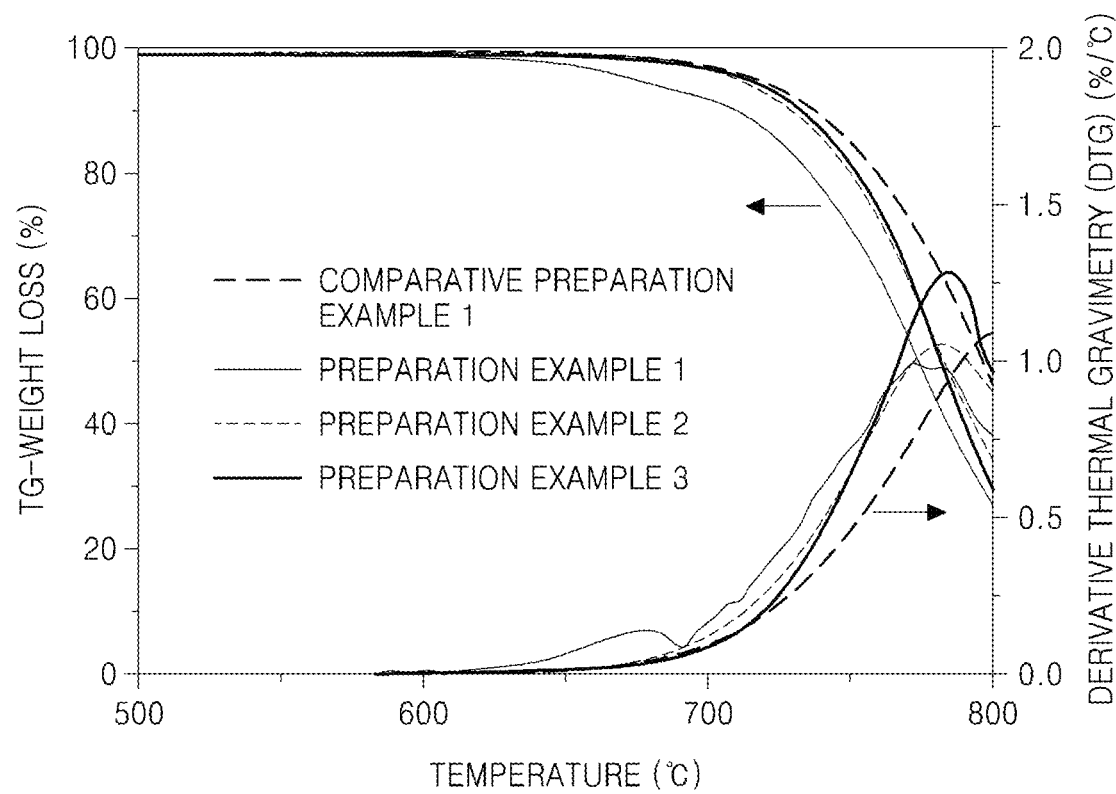
FIG. 23 is a graph of thermogravimetric weight loss (percent) and derivative thermogravimetric weight loss (percent per degree centigrade, %/° C.) versus temperature (° C.) illustrating the results of thermogravimetric analysis performed on the composites prepared in Preparation Examples 1 to 3.

The results of the thermogravimetric analyses are as shown in FIG. 23.

Referring to FIG. 23, it was confirmed that an amount of graphene included in the composites prepared in Preparation Examples 1 to 3 was about 8 wt %, based on a total weight of the composite.

Evaluation Example 6: X-Ray Diffraction Analysis

X-ray analyses using CuKa were performed on the composites prepared in Preparation Examples 1 to 3 and the material prepared in Comparative Preparation Example 1.

Figure 24:
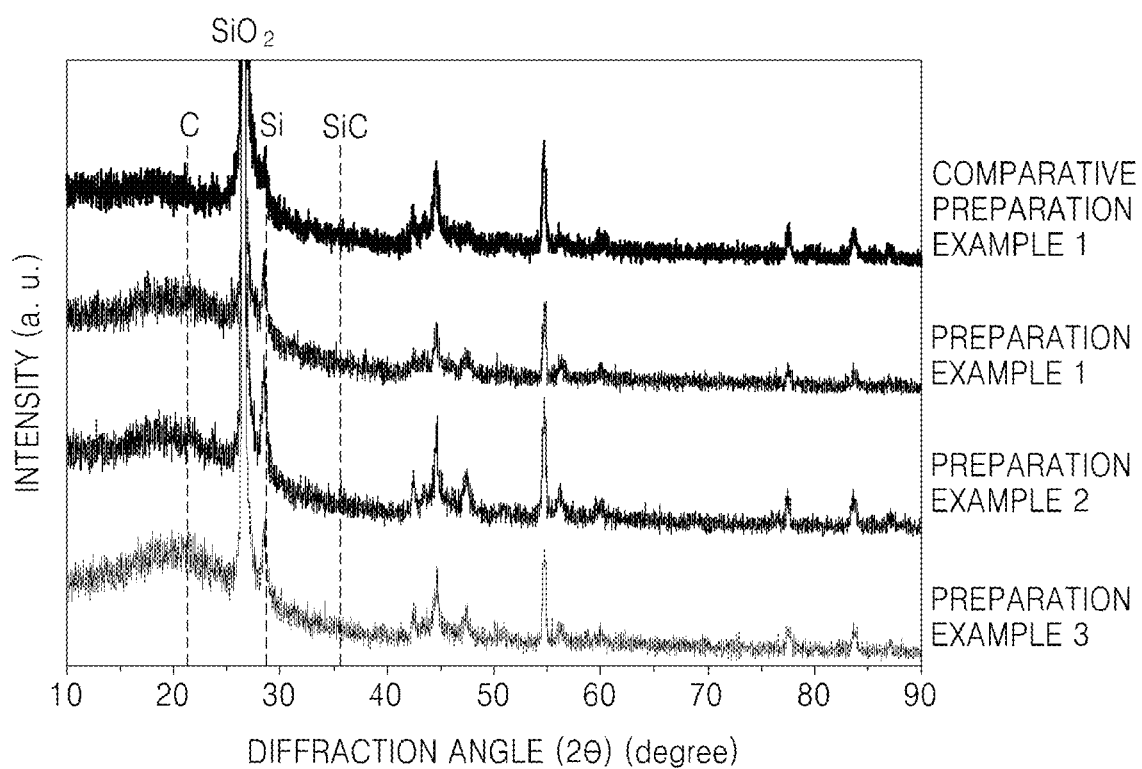
FIG. 24 is a graph of intensity (arbitrary units, a.u.) versus diffraction angle (degrees two-theta, 2θ) illustrating the results of X-ray analysis performed on the composites prepared in Preparation Examples 1 to 3 and the material prepared in Comparative Preparation Example 1.

The results of the X-ray analyses are as shown in FIG. 24.

The composites prepared in Preparation Example 1 to 3 had substantially the same peaks with the case of Comparative Preparation Example 1. Also, the composites prepared in Preparation Example 1 to 3 had the same silicon oxide peak as in the case of Comparative Preparation Example 1 but did not have a SiC peak.

Evaluation Example 7: Raman Analysis

Raman analyses were performed on the composites prepared in Preparation Examples 1 to 3 and the material prepared in Comparative Preparation Example 1. For comparison with the composites prepared in Preparation Examples 1 to 3, FIG. 25 shows the results of Raman analysis on a structure having graphene formed on a top of a silicon oxide, indicated as "G@SiO$_2$" in FIG. 25.

A 2010 Spectra instrument (NT-MDT Development Co.) with a laser system having wavelengths of 473 nm, 633 nm, and 785 nm, a lowest Raman shift up to about 50 cm$^{-1}$, and a spatial resolution of about 500 nm was used to perform the Raman analyses.

Figure 25:
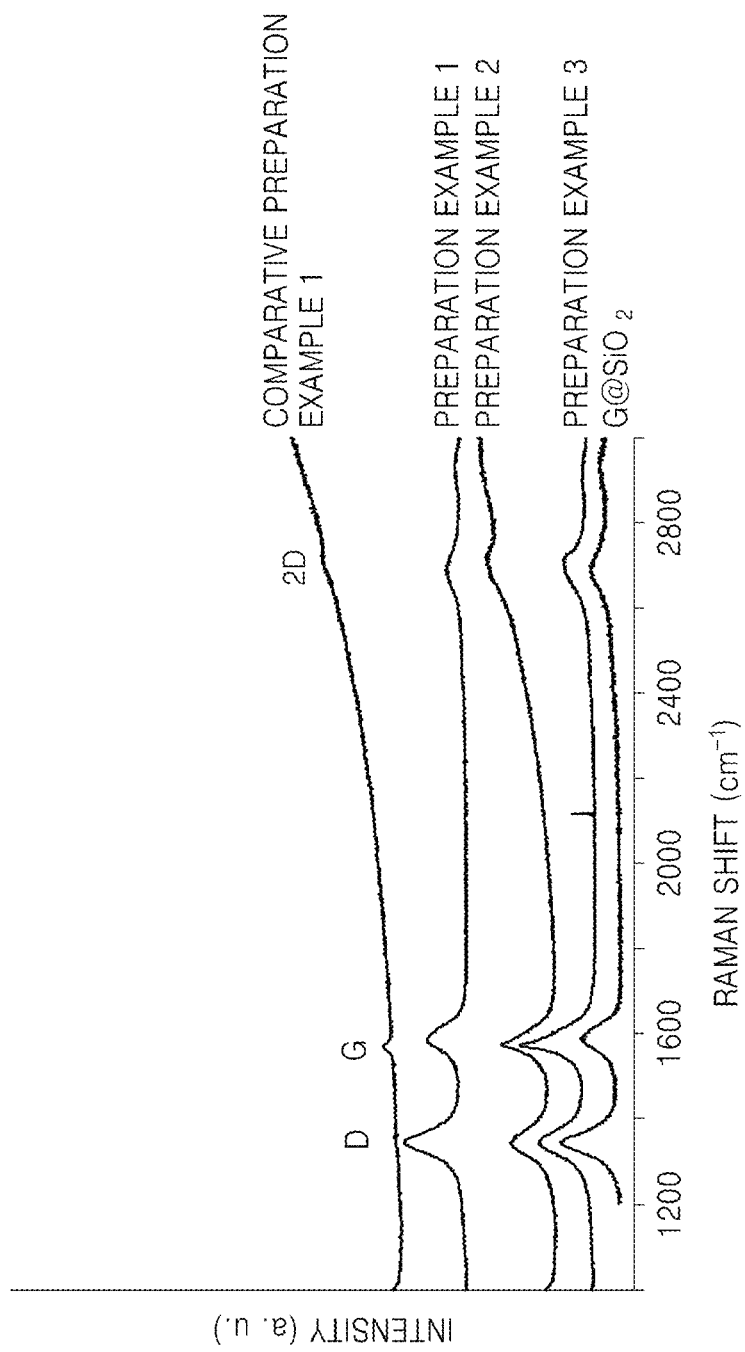
FIG. 25 is a graph of intensity (arbitrary units, a.u.) versus Raman shift (inverse centimeters, $cm^{-1}$) illustrating the results of Raman analysis performed on the composites prepared in Preparation Examples 1 to 3 and the material prepared in Comparative Preparation Example 1.

The results of the Raman analyses are as shown in FIG. 25. Also, based on the results of the FIG. 25, an intensity ratio of D peak and G peak was measured and shown in Table 8.

Graphene had peaks at 1350 cm$^{-1}$, 1580 cm$^{-1}$, 2700 cm$^{-1}$ in a Raman analytical spectrum, and the peaks provide information about a thickness, crystallinity, and a charge doping state. The peak at 1580 cm$^{-1}$ is a peak referred to as "G-mode" which is generated from a vibration mode corresponding to stretching of a carbon-carbon bond, and an energy of the G-mode is determined by a density of excess electrical charge doped by the graphene. Also, the peak at 2700 cm$^{-1}$ is a peak referred to as "2D-mode" which is useful in evaluating a thickness of the graphene. The peak at 1350 cm$^{-1}$ is a peak referred to "D-mode" which is shown when there is a defect in a SP$^2$ crystal structure. Also, a D/G intensity ratio provides information about entropy of crystals of the graphene.

TABLE 8

| | D/G intensity ratio |
|---|---|
| Preparation Example 1 | 1.126053 |
| Preparation Example 2 | 0.92245 |
| Preparation Example 3 | 0.798807 |
| G@SiO$_2$ | 1.580708 |

Referring to FIG. 25 and Table 8, it may be confirmed that crystallinity of the graphene improved as a thickness of the silicon oxide (SiOx) layer increased. Also, the structure having graphene formed on the top of the silicon oxide (SiO2), indicated as "G@SiO$_2$" had the D/G intensity that is larger than the case of Preparation Examples 1 to 3, and thus it was confirmed that crystallinity of the graphene was the lowest and had a great number of defects.

Evaluation Example 8: Scanning Electron Microscope (SEM)

The composites prepared in Preparation Examples 8 and 9 and the structure prepared in Comparative Preparation Example 4 were analyzed by using an SEM, and the results are shown in FIGS. 26A to 28B.

Figure 26A:
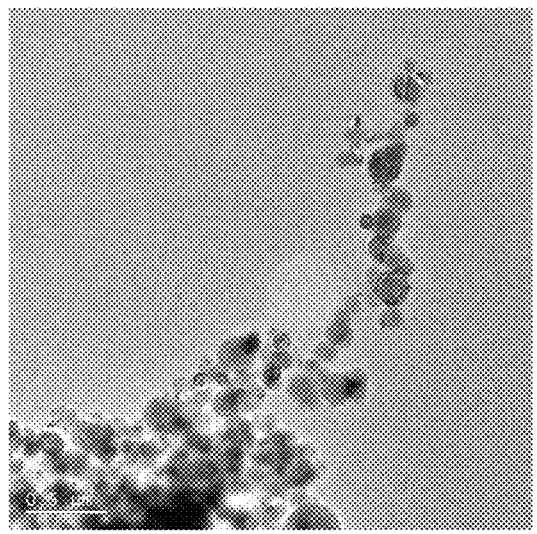
FIGS. 26A, 27A, and 28A are scanning electron microscope images of composites prepared in Preparation Examples 8 and 9 and Comparative Preparation Example 4, respectively.
Figure 26B:
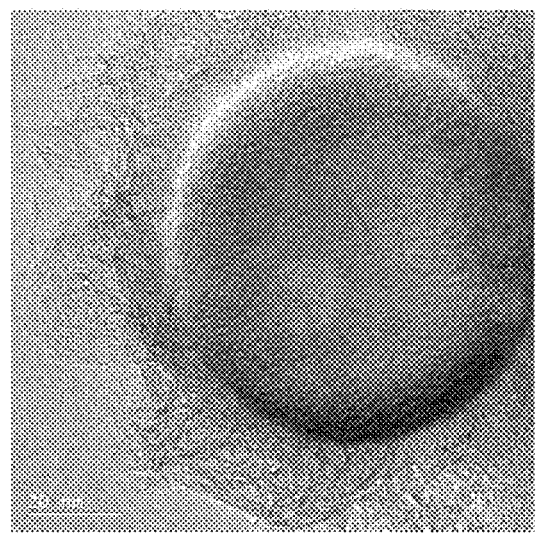
FIGS. 26B, 26C, 27B, and 28B are enlarged views of FIGS. 26A, 27A, and 28A, respectively.
Figure 26C:
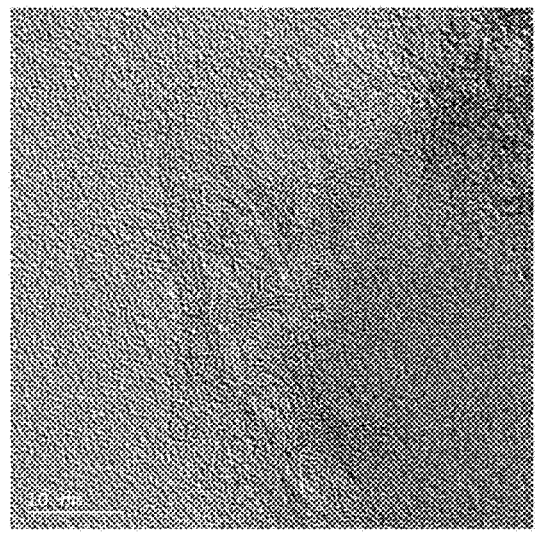
Figure 27A:
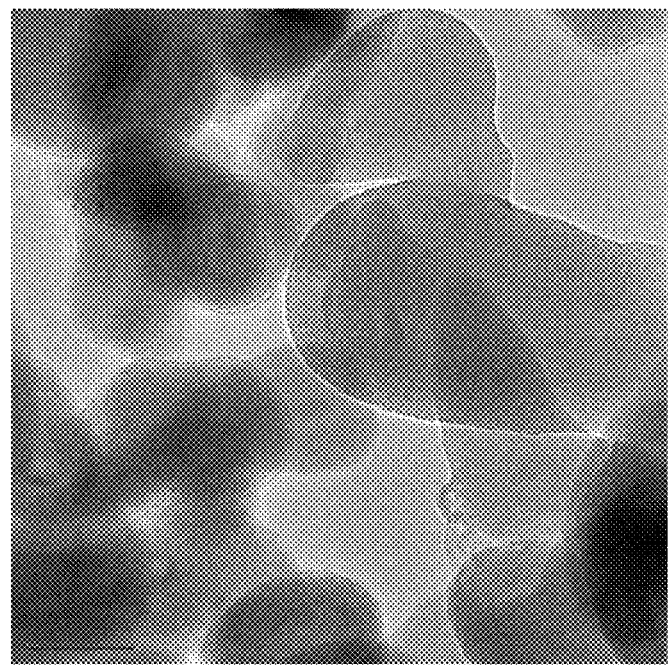
Figure 27B:
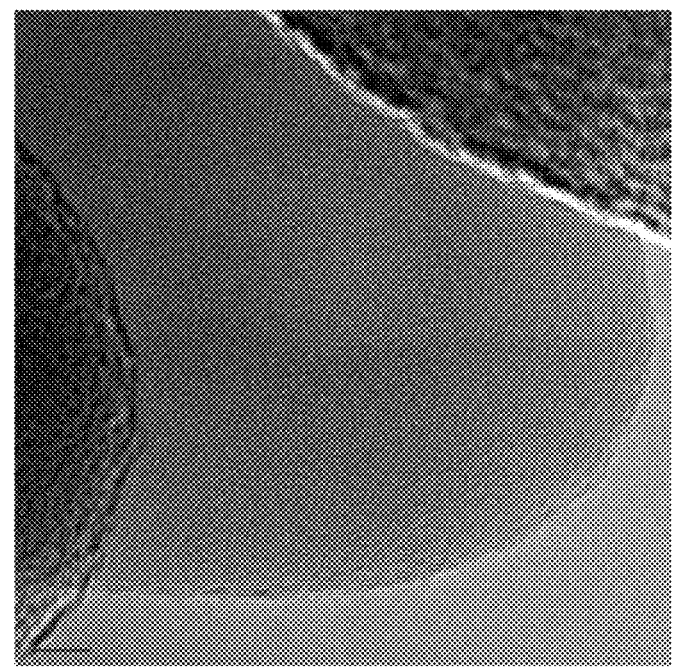
Figure 28A:
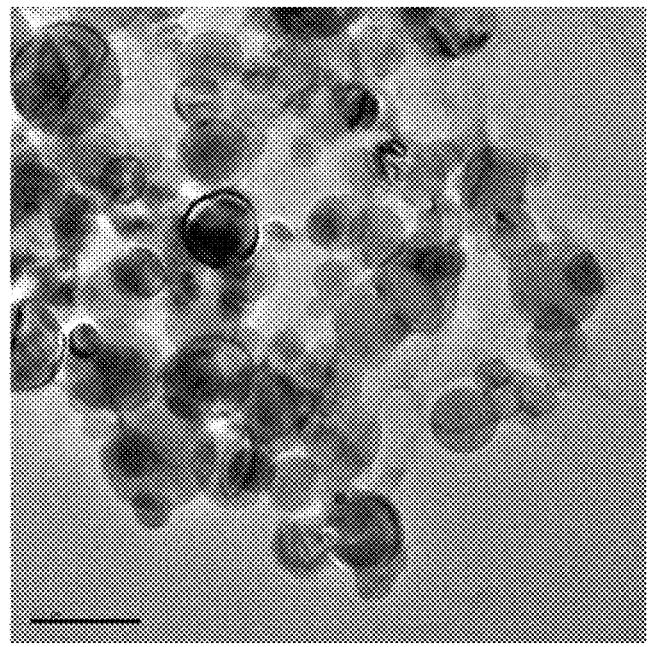
Figure 28B:
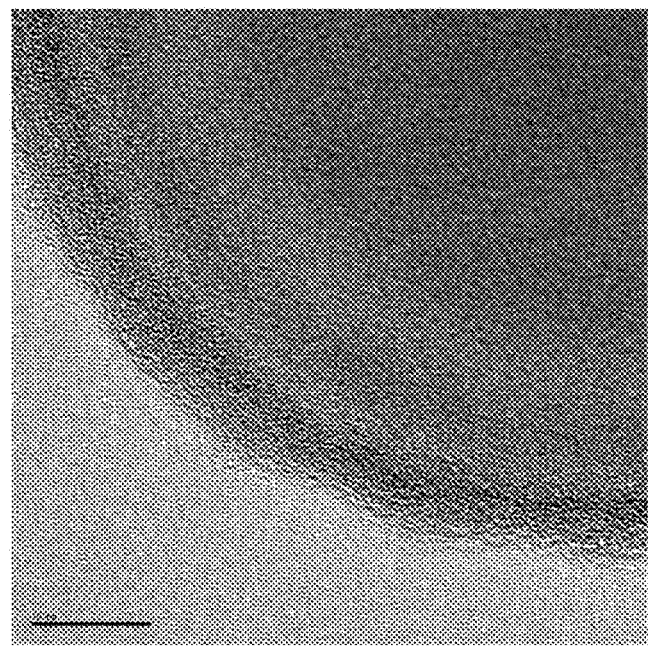

FIGS. 26A, 27A, and 28A are each respectively SEM images of the composites prepared in Preparation Example 8, Preparation Example 9, and Comparative Preparation Example 4, and FIGS. 26B, 26C, 27B, and 28B are each respectively magnified images of FIGS. 26A, 27A, and 28A.

In reference to FIGS. 26A to 28B, it may be confirmed that the composites prepared in Preparation Example 8 and 9 had a silicon oxide layer and graphene formed on silicon nanoparticles.

Evaluation Example 9: In-Situ TEM Evaluation

The in-situ TEM evaluation was performed by using Titan cubed 60-300 (FEI), in which an electrical probing TEM holder is mounted.

The composite prepared in Preparation Example 8 was attached at the end of an Au wire electrode, and a lithium metal was scratched with a cleaved Pt/Ir counter electrode. The preparation of the sample was carried out on the holder in a dry room (−55° C. dew point or less than 0.5% RH @ 25° C.) and transported to TEM room. Then, the holder was quickly inserted to TEM chamber, and the manipulation of the probe tip was precisely controlled by a piezo-electric motor in order to make a physical contact between silicon nanoparticles and lithium metal. Then, a constant bias from −0.5 to −5 V and +5 V was applied for lithiation and delithiation, respectively. The microstructure evolution during lithiation and delithiation was recorded as a movie clip. The overlook of samples were also examined using the field emission scanning electron microscopy (Nova NanoSEM 450S, FEI).

The results of the in-situ TEM analysis are shown in FIGS. 29A through 29E.

Figure 29A:
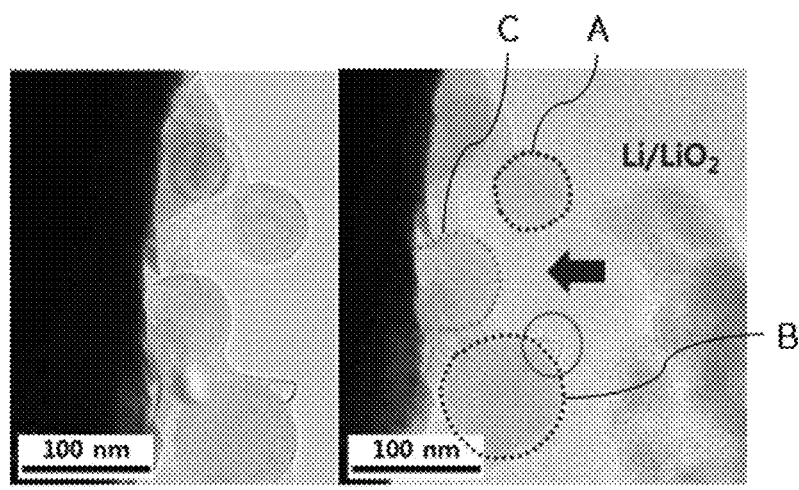
FIGS. 29A to 29E show the results of In-situ TEM analysis using the composite prepared in Preparation Example 8.
Figure 29B:
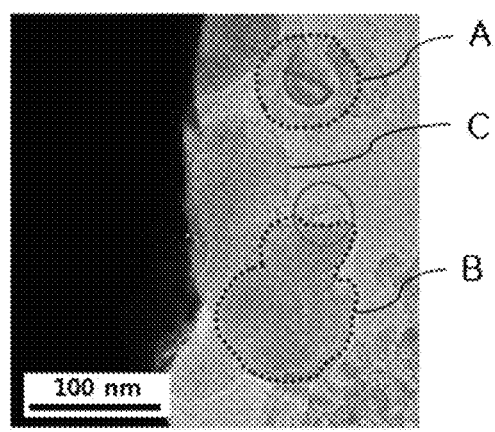
Figure 29C:
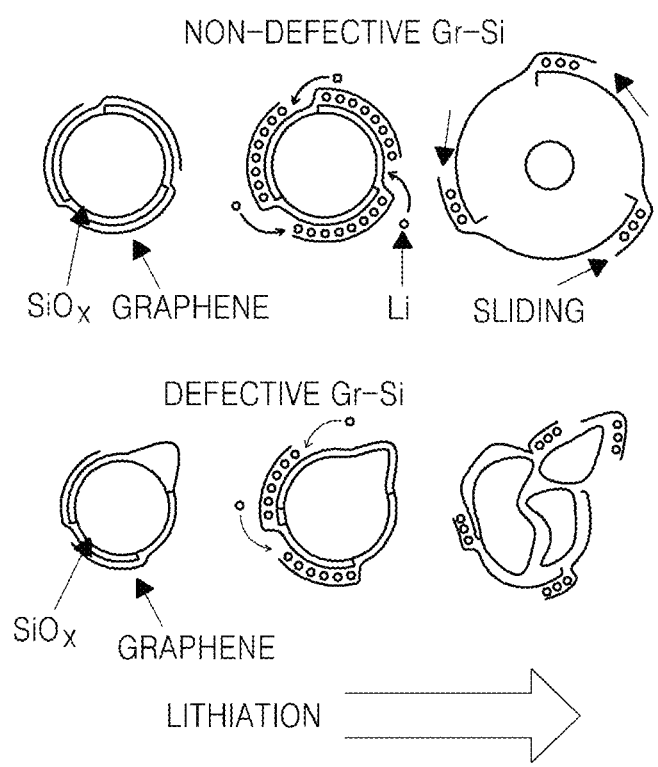

FIG. 29A is a TEM image of the composite particle bound to a surface of the Au wire and a Li/LiO$_2$ electrode, FIG. 29B is a TEM image of the composite particle after the first lithiation process, and FIG. 29C illustrates a schematic view of the lithiated composite particle.

Figure 29D:
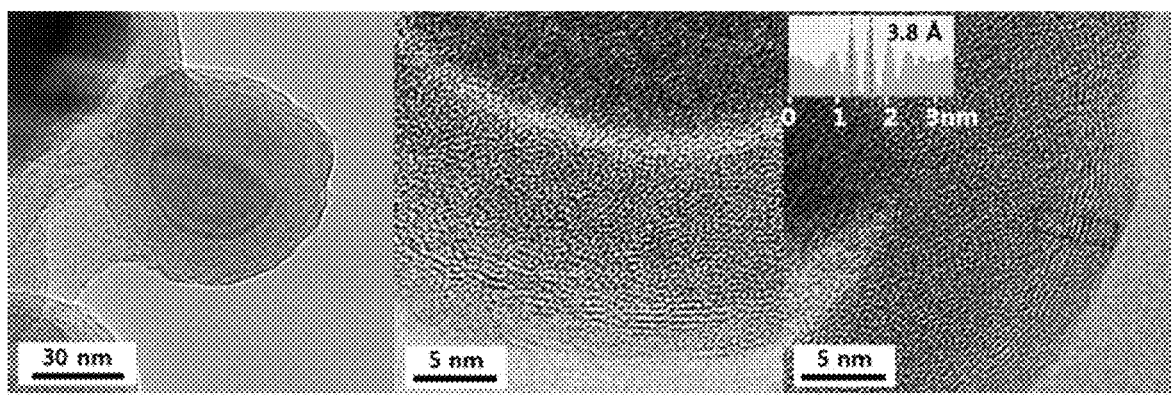
Figure 29E:
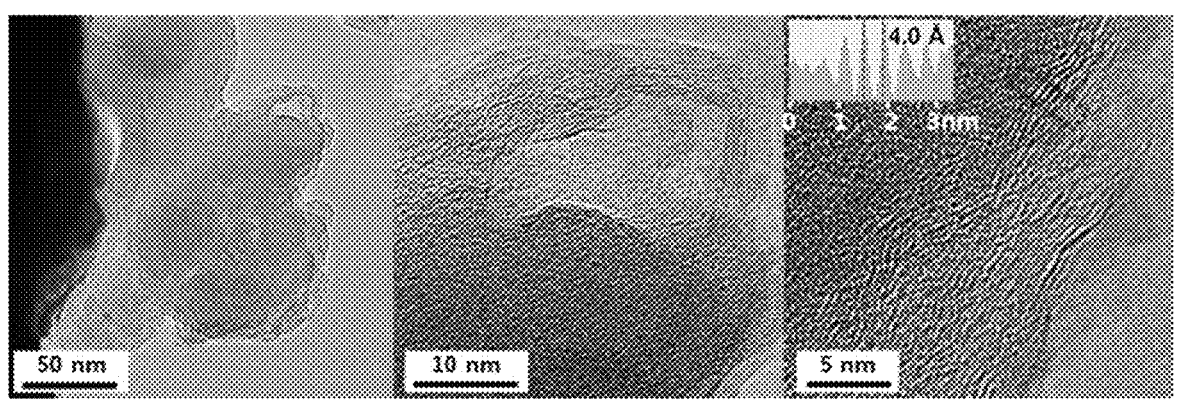

FIG. 29D is a TEM image of a non-defective particle (red-dotted region A in FIG. 29B), and FIG. 29E is a TEMP image of a defective particle (blue-dotted region B in FIG. 29B). As shown in FIG. 29B, regions A and B are directly in contact with the Li/LiO$_2$ electrode, and region C is not directly in contact with the Li/LiO$_2$ electrode.

In this regard, the volume expansion of particles was in all radial directions even through the contact point of the composite with the second electrode is highly localized. This is because fast lithium diffusion through the graphene layers allows lithium ions to diffuse in the silicon core in a homogenous manner (see FIG. 29A and regions A and B of FIG. 29B).

As shown in FIG. 29C, it may be known that volume expansion of the non-defective composite particles was in an uniform radial direction after the lithiation, but structures of the defective composite particles were modified after the lithiation, unlike the non-defective particles. In this regard, it may be known that the graphene layer has excellent preventing effect on disintegration or pulverization of silicon nanoparticles caused by volume expansion of the silicon nanoparticles during lithiation and delithation process, and that lithium may rapidly diffuse through the graphene layer to be homogenously diffused into the silicon core.

As shown in FIG. 29C, an interlayer spacing between graphene layers in the sample has increased slightly from about 3.4☐ to about 3.9☐ which is attributed to lithium intercalation in the graphene layer.

When the graphene layer described above is included in a battery, volume expansion of the battery during charging/discharging may reduce, and a clamping layer may be well maintained by using flexibility of the graphene during the volume expansion, and thus formation of an SEI layer may be effectively suppressed.

As described above, according to the one or more of the above embodiments, a composite has a high adherency between silicon and graphene, and thus a high rate performance may be improved and a volume expansion generated when charging and discharging a battery may be reduced by increasing an electric conductivity, a clamping layer may be well maintained by using flexibility of graphene in a case of volume expansion, and thus a charge/discharge durability may be improved by increasing a charge/discharge efficiency by suppressing formation of an SEI layer.

It should be understood that the exemplary embodiments described herein should be considered in a descriptive sense only and not for purposes of limitation. Descriptions of features, advantages, or aspects within each embodiment should be considered as available for other similar features, advantages, or aspects in other embodiments.

What is claimed is:

1. A composite comprising:
   silicon;
   silicon oxide of the formula SiO$_x$ on the silicon, wherein 0<x<2; and
   graphene directly on the silicon oxide,
   wherein the graphene is oriented at an angle of about 0° to about 90°, with respect to a surface of the silicon,
   wherein the graphene comprises a plurality of graphene nanosheets or a plurality of graphene layers, and wherein adjacent graphene nanosheets of the plurality of graphene nanosheets or the plurality of graphene layers form an acute angle.

2. The composite of claim 1, wherein the graphene is oriented parallel to a surface of the silicon.

3. The composite of claim 1, wherein the graphene is oriented at an angle of about 5° to about 80°, with respect to the surface of the silicon.

4. The composite of claim 3, wherein the graphene is oriented at an angle of about 10° to about 70°, with respect to the surface of the silicon.

5. The composite of claim 1, wherein the silicon oxide has a thickness of about 300 µm or less.

6. The composite of claim 1, wherein the silicon is in the form of a nanowire, a nanoparticle, a nanotube, a nanorod, a wafer, a nanoribbon, or a combination thereof.

7. The composite of claim 1, wherein the silicon has a cross-sectional diameter of less than about 500 nm.

8. The composite of claim 7, wherein the silicon has a cross-sectional diameter of about 10 nm to about 300 nm.

9. The composite of claim 1, wherein the plurality of graphene nanosheets or the plurality of graphene layers, which are non-adjacent at a surface of the silicon oxide, form an acute angle.

10. The composite of claim 1, wherein the graphene is present in an amount of about 0.001 part to about 10 parts by weight, based on 100 parts by weight of the composite.

11. The composite of claim 1, wherein a distance between the graphene and the silicon oxide is about 10 nm or less.

12. An electrode comprising the composite of claim 1.

13. The electrode of claim 12, wherein the composite further comprises a metal oxide or an aluminum fluoride, and the metal oxide is at least one selected from a magnesium oxide, a manganese oxide, an aluminum oxide, a titanium oxide, a zirconium oxide, a tantalum oxide, a tin oxide, and a hafnium oxide.

14. The electrode of claim 12, wherein the electrode further comprises at least one second carbon-containing negative electrode active material, and the at least one second carbon-containing negative electrode active material is at least one of natural graphite, artificial graphite, expansion graphite, graphene, carbon black, fullerene soot, carbon nanotube, or carbon fiber.

15. The electrode of claim 12, wherein the electrode further comprises a conducting agent, and wherein the conducting agent is at least one of acetylene black, ketjen black, natural graphite, artificial graphite, carbon black, carbon fiber, or a metal powder of at least one of copper, nickel, aluminum, or silver.

16. A lithium battery comprising the electrode of claim 12.

17. A device comprising the composite of claim 1.

18. The device of claim 17, wherein the device is an electroluminescent device, a biosensor, a semiconductor device, or a thermoelectric device.

19. A carbon composite comprising the composite of claim 1 and a carbonaceous material.

20. The carbon composite of claim 19, wherein the carbonaceous material is at least one of graphene, graphite, or carbon nanotube.

21. An electrode comprising the carbon composite of claim 19.

22. The electrode of claim 21, wherein the carbon composite further comprises a metal oxide or an aluminum fluoride , and the metal oxide is at least one selected from a magnesium oxide, a manganese oxide, an aluminum oxide, a titanium oxide, a zirconium oxide, a tantalum oxide, a tin oxide, and a hafnium oxide.

23. A method of manufacturing a composite, the method comprising:
contacting a reaction gas to a structure comprising silicon and a silicon oxide of the formula SiOx wherein 0<x<2; and
heat-treating the reaction gas and the structure to form graphene on the silicon and manufacture the composite,
wherein the reaction gas is at least one selected from a compound represented by Formula 1, a compound represented by Formula 2, and an oxygen-containing gas represented by Formula 3:

$$C_nH_{(2n+2-a)}[OH]_a \qquad \text{Formula 1}$$

wherein, in Formula 1, n is an integer of 1 to about 20, and a is an integer of 0 or 1, $$C_nH_{(2n)} \qquad \text{Formula 2}$$

wherein, in Formula 2, n is an integer of 2 to about 6, and $$C_xH_yO_z \qquad \text{Formula 3}$$

wherein, in Formula 3, x is an integer of 0 or 1 to about 20, y is 0 or an integer of 1 to about 20, and z is an integer of 1 or 2,
wherein the composite comprises
silicon;
silicon oxide of the formula $SiO_x$ on the silicon, wherein 0<x<2; and
graphene directly on the silicon oxide,
wherein the graphene is oriented at an angle of about 0° to about 90°, with respect to a surface of the silicon,
wherein the graphene comprises a plurality of graphene nanosheets or a plurality of graphene layers, and
wherein adjacent graphene nanosheets of the plurality of graphene nanosheets or the plurality of graphene layers form an acute angle.

24. The method of claim 23, wherein the reaction gas is at least one compound represented by Formula 2 and methane.

25. The method of claim 24, wherein the reaction gas is methane.

26. The method of claim 23, wherein the oxygen-containing gas comprises at least one selected from carbon dioxide, carbon monoxide, and water.

27. The method of claim 23, wherein the heat-treating is performed at a temperature in a range of about 700° C. to about 1100° C.

28. The method of claim 23, wherein the silicon is in the form of a silicon nanoparticle.

29. The method of claim 28, wherein the silicon has a cross-sectional diameter of a silicon nanowire may be less than about 500 nm.

30. The method of claim 29, wherein the silicon has a diameter of about 10 nm to about 300 nm.

31. The method of claim 23, wherein the graphene is oriented at an angle of about 10° to about 70°, with respect to the surface of the silicon nanoparticle.

32. The method of claim 31, wherein the graphene is present in an amount of about 0.001 part to about 10 parts by weight, based on 100 parts by weight of the composite.

33. The method of claim 23, wherein graphene nanosheets, which are non-adjacent at the surface of the silicon nanoparticle, form an acute angle.

34. A method of manufacturing a negative electrode active material, the method comprising:
contacting a reaction gas to a structure comprising silicon oxide of the formula SiOx wherein 0<x<2; and
heat-treating the reaction gas and the structure to form graphene on the silicon oxide and manufacture the negative electrode active material,
wherein the reaction gas is at least one selected from a compound represented by Formula 1, a compound represented by Formula 2, and an oxygen-containing gas represented by Formula 3:

$$C_nH_{(2n+2-a)}[OH]_a \qquad \text{Formula 1}$$

wherein, in Formula 1, n is an integer of 1 to about 20, and a is an integer of 0 or 1, $$C_nH_{(2n)} \qquad \text{Formula 2}$$

wherein, in Formula 2, n is an integer of 2 to about 6, and $$C_xH_yO_z \qquad \text{Formula 3}$$

wherein, in Formula 3, x is an integer of 0 or 1 to about 20, y is 0 or an integer of 1 to about 20, and z is an integer of 1 or 2,
wherein the negative active material comprises
silicon;
silicon oxide of the formula $SiO_x$ on the silicon, wherein 0<x<2; and
graphene directly on the silicon oxide,
wherein the graphene is oriented at an angle of about 0° to about 90°, with respect to a surface of the silicon,
wherein the graphene comprises a plurality of graphene nanosheets or a plurality of graphene layers, and wherein adjacent graphene nanosheets or the plurality of graphene layers of the plurality of graphene nanosheets form an acute angle.

35. The method of claim 34, wherein the silicon has a cross-sectional diameter of a silicon nanowire may be less than about 500 nm.

* * * * *